Figure 1:
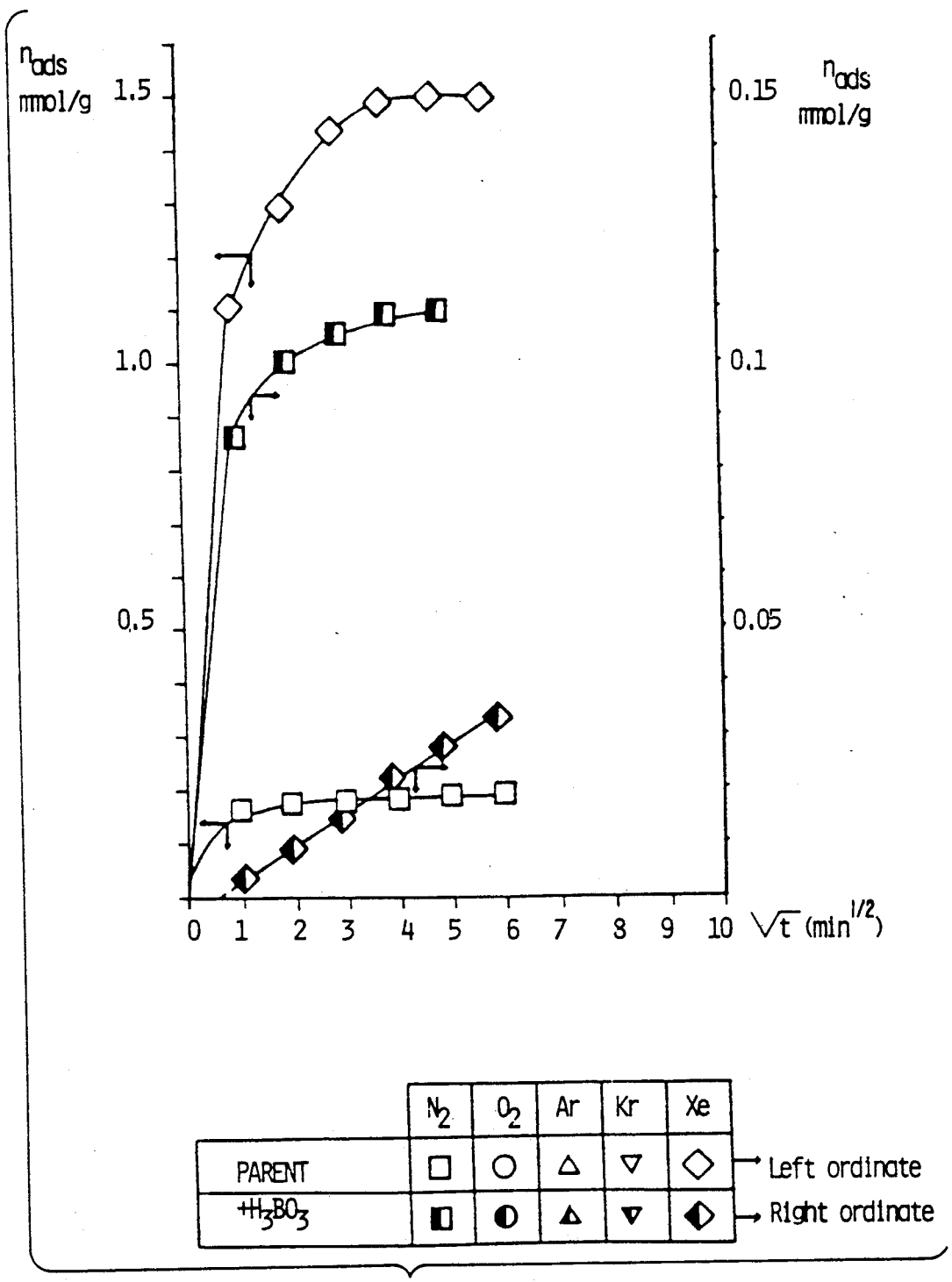

United States Patent [19]

Vansant et al.

[11] Patent Number: 5,032,152

[45] Date of Patent: Jul. 16, 1991

[54] GAS SEPARATION

[76] Inventors: Etienne Vansant, Manderleylaan 6, B-2153 Zoersel, Belgium; Serge Moreau, 22, rue du Général Exelmans, 78149 Velizy Villacoublay, France; Jan Verbiest, Emile Gebruersstraat 31, 20200 Borgerhout, Belgium; Paul de Bièvre, Duineneind 11, B-2460 Kasterlee, Belgium; Jos Philippaerts, Populierenstraat 54, B-3538 Houthalen, Belgium

[21] Appl. No.: 308,183

[22] Filed: Feb. 8, 1989

[30] Foreign Application Priority Data

Feb. 11, 1988 [EP] European Pat. Off. ............ 88200248

[51] Int. Cl.$^5$ ............................................. B01D 53/04
[52] U.S. Cl. ............................................ 55/66; 55/68; 55/75
[58] Field of Search ................ 55/66, 68, 71, 75; 502/60, 62

[56] References Cited

U.S. PATENT DOCUMENTS

| | | | |
|---|---|---|---|
| 2,930,447 | 3/1960 | Barrer | 55/68 X |
| 3,658,696 | 4/1972 | Shively et al. | 55/75 X |
| 3,683,592 | 8/1972 | Kamm et al. | 55/75 |
| 3,698,157 | 10/1972 | Allen et al. | 55/75 X |
| 3,724,170 | 4/1973 | Allen et al. | 55/75 X |
| 3,962,129 | 6/1976 | Münzner et al. | 55/75 X |
| 4,130,484 | 12/1978 | Marwil et al. | 55/75 X |
| 4,137,054 | 1/1979 | Miyake et al. | 55/68 X |
| 4,414,005 | 11/1983 | de Bièvre et al. | 55/75 |
| 4,529,416 | 7/1985 | Sircar et al. | 55/68 |
| 4,620,857 | 11/1986 | Vansant et al. | 55/75 |

FOREIGN PATENT DOCUMENTS 60-215509 10/1985 Japan ............................ 55/66

OTHER PUBLICATIONS

Ullmanns Encyklopadie der technischen Chemie; 4, neubearbeitete und erweiterte Auflage, Band 2, vol. 2 (1972); pp. 615-616 (in German).

Translation of the passage bridging pp. 615-616 from Ullmanns Encyklopadie der technischen Chemie, vol. 2 (1972) (in English).

*Primary Examiner*—Robert Spitzer
*Attorney, Agent, or Firm*—Weingarten, Schurgin, Gagnebin & Hayes

[57] ABSTRACT

The invention relates to a process for the separation of at least one gas from a mixture containing at least two gases, which process comprises contacting a pore containing molecular sieve with the mixture of gaseous components, selectively adsorbing at least one component of the mixture in the pores of the molecular sieve, separating the molecular sieve from the non-adsorbed component or components and optionally desorbing the adsorbed component or components, the molecular sieve having been modified with a modifying agent containing at least one weak acid, a salt of a weak acid, or a derivative of a weak acid of at least one element of the Groups III, IV and V of the Periodic Table of Elements.

15 Claims, 45 Drawing Sheets

GAS SEPARATION

The present invention concerns a process for the separation of at least one gas from a mixture containing at least two gases by preferentially adsorbing one or more components of the gas mixture in the pores of a molecular sieve or zeolite.

It is well known to use molecular sieves for separating one or more components from gas mixtures by preferentially or selectively adsorbing these in the pores of a molecular sieve.

A well-known process is the Pressure-Swing-adsorption process (PSA-process) whereby the adsorption is carried out at a certain, usually elevated pressure and the desorption takes place at lower pressure. Applications of this process are for example the separation of hydrocarbon-isomers and nitrogen-oxygen separation (Uhlmanns Encyklopädie der technischen Chemie, Band 2, pages 615-616 (1972)).

In U.S. Pat. specification No. 4,414,005 a modified zeolite is described for encapsulating compounds in the pores of the zeolite. The modification of the zeolite is carried out by contacting it with silanes, boranes, germanes, and halo and/or alkyl derivatives thereof. Furthermore it is described in said U.S. patent specification that the modified zeolite can also accomplish a separation in the case the mixture in contact with the modified zeolite contains components that can be adsorbed in the pores as well as components that are too large to enter said pores.

Although the modified zeolites of U.S. Pat. specification No. 4,414,005 are thus suitable for effecting a separation in a gas mixture, the modification process involves the use of gaseous reactants, such as silane or diborane, which requires very careful and complex processing, in view of the hazards involved in handling these products.

It is one object of the present invention to provide a process for gas separation wherein modified zeolites or molecular sieves are used that do not involve such complex processing.

Other objects and advantages of the invention will be apparent from the further description of the various embodiments of the invention.

The invention concerns a process for the separation of at least one gas from a mixture containing at least two gases, which process comprises contacting a pore containing molecular sieve with a mixture of gaseous components, selectively adsorbing at least one component of the mixture in the pores of the molecular sieve, separating the molecular sieve from the non-adsorbed component or components and optionally desorbing the adsorbed component or components, the molecular sieve having been modified at elevated temperature with a modifying agent containing at least one weak acid, a salt of a weak acid or a derivative of a weak acid of at least one element of the Groups III, IV and V of the Period Table of Elements. Preferably the modifying agent has the ability to polymerize at elevated temperature.

Surprisingly it has been found that a molecular sieve that has been modified with the specified modifying agents has a superior ability to separate gas mixtures.

The process of the present invention can be carried out in various ways, depending on the kind of gases to be separated.

According to one embodiment the adsorption takes place at a higher (partial) pressure than the desorption. Another embodiment relies on thermal effects, i.e. the desorption is effected by increase of temperature. It is also possible to combine these two embodiments.

The modification of the molecular sieve or zeolite at elevated temperature involves the use of different weak acids, their salts or derivatives in combination with a thermal treatment.

The molecular sieve can be brought into contact with the modifying agent in different ways, such as:
1) dry mixing molecular sieve and modifying agent;
2) dry mixing as in 1) followed by adding liquid such as water and/or organic solvent, to form a slurry or a paste and afterwards drying, and
3) contacting a solution of the modifying agent with the molecular sieve giving a slurry, followed by evaporation of the solvent, optionally after filtration.

In principle all methods of modifying yield either a one phase or a two phase system, i.e. a paste or a slurry. The difference lies mainly in the amount of liquid present in the system.

Afterwards the dry, solid mixture of molecular sieve and modifying agent undergoes a thermal treatment for several hours. A reaction between the molecular sieve and the modifying agent causes a change in the porosity and affinity of the molecular sieve.

One of the advantages of this method is the ease of manipulating both starting materials compared with the complex and dangerous silanation and/or boranation modification methods (explosion hazards). Because the process is based on a mixture of two compounds (determined by a simple gravimetric measurement) the usual upscaling problems do not occur. Also the homogenity of the modified sample can be controlled independently of the amount of treated molecular sieve. Typical of this new procedure of modifying is the ease for the industrial use and the favoured economical application without very high pretreatment and installation costs and the absence of process hazards. More in particular it has the advantage of very good reproducibility.

The chemical modifications with hydrides (diborane and silane) require OH-groups and are generally carried out only on H-form molecular sieves. With this modification however, all types of cation-form molecular sieves can also be used.

Because the molecular sieves have been contacted with a modifying agent and thermally treated, the compounds formed in the channels and cages influence the molecular sieving and the selective adsorption characteristics of the substrates. The resulting sorption behaviour depends on the nature of the introduced obstructions, their location and interaction with the molecular sieve. Therefore a mechanism has been tentatively proposed to elucidate the observed adsorption properties in the case of boric acid, which is by no means intended to limit the scope of the patent.

When a zeolite has been contacted with boric acid ($H_3BO_3$), the boric acid will polymerise during the thermal treatment to boron-oxides. By changing, for example the amount of added boric acid or the degree of polymerization, it is possible to change the adsorption behaviour of the zeolite in a controlled way. Hydroxyl groups inside the channels of a zeolite, if any, may react with boron hydroxyl groups when they are heated. By fusing boric acid one forms first gaseous metaboric acid and later boron oxides according to:

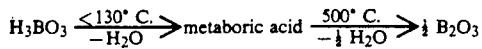

The metaboric acid undergoes several other transitions resulting in its α- or β- or γ-form.

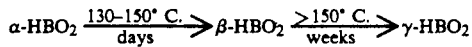

The metaboric acid will enter the zeolite and fill the pores and can dimerize

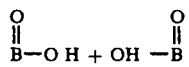

Also in the zeolite pores a reaction with hydration water is possible.

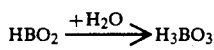

At elevated temperature, polymerization between neighbouring boron hydroxyl groups is possible with the removal of $H_2O$.

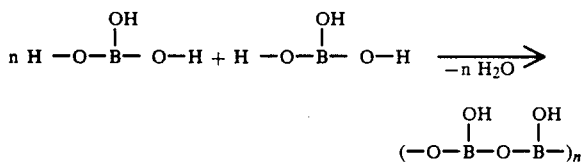

This should lead to a network of linked boron-oxygen compounds inside the pores of the zeolite. The types of formed, polymerized compounds depend on the zeolite network and on the forms characteristic for metaboric acid (namely α-, β- or γ-form).

Further dehydration results in the formation of boron-oxides, polymerized inside the structure of the zeolite. Finally, cross-linked metaborates and boron-oxides will be present in the zeolite pores, strongly affecting the molecular sieving and selective adsorption properties.

The other modifying reagents used, concerning this procedure, are believed to act in a similar way. The molecular sieves are modified by the same manipulations based on a mixing of compounds and a thermal treatment. The high temperatures induce also the formation of different polymerized compounds inside the channels of the zeolites. These implanted compounds act as obstructions and change the gas-substrate interactions compared with the original, unmodified sample.

The contact between molecular sieve and the modifying agent can preferably be carried out in a number of ways as discussed hereinbefore.

In all embodiments the molecular sieve that has been brought into contact with the modifying agent (the mixture) is subsequently subjected to a thermal treatment at a temperature of at least 250° C. In the case said mixture still contains free and/or bound solvent it is subjected to a drying and/or activating step in order to remove free and/or bound solvent, previous to the thermal treatment. This drying and/or activating step can be carried out at reduced pressure, for example to prevent decomposition of organic solvent or to facilitate the removal of solvent. It is not necessary that these steps of drying and/or activating on the one hand and thermal treatment on the other, are clearly distinguishable from each other, for example by intermediate cooling.

An important aspect is that there is free liquid present in the mixture, the temperature is raised above the boiling point of the used solvent at the pressure used, with an upper limit of 200° C. In the case of water it is preferred to dry the mixture at a temperature between 50° and 110° C., until all water has been evaporated.

Thereafter the temperature is increased to a value above 250° C. for a period of time sufficient to obtain the required polymerization of the modifying agent. The time for this ranges from 0.5 to 24 hours or more, whereas the temperature can be between 250° C. and 750° C. Shorter times or lower temperatures tend to give insufficient results, whereas longer times do not give additional advantages. The same applies to higher temperatures, whereby one should be careful to avoid that too much modifying agent becomes gaseous, or that the molecular sieve structure collapses.

The molecular sieves or zeolites to be modified for use in this invention, can be any natural or synthetic molecular sieve or zeolite. Zeolites and molecular sieves are known in the art and can suitably be defined as produced with a crystallized microporous structure, such as crystalline alumino silicates with an Si/Al molar ratio of 1 to 100, preferably 1 to 20. Examples of suitable products are mordenite SP and LP, zeolite A, X and Y, ZSM-5, clinoptilolite, ferrieriete, silicalite, erionite and chabasite, in H-, and/or cation form. It is also possible to use a product that contains metal species.

The modifying agent must be capable of forming polymerized structures in the pores and is of inorganic nature. These requirements are fullfilled by weak acids of the elements of Group III, IV and V of the Periodic Table, as well as the salts or derivatives thereof. These weak acids usually have the structure $H_a E_b O_c$, wherein H and O stand for hydrogen and oxygen respectively, and E is the Group III, IV, or V element. Subscripts a, b and c are such that the structure is neutral. Salts thereof, such as with Na, K, Ca, Al, $NH_3$, etc. can also be used. Suitably the modifying agent is chosen from the group of boric acid, silicic acid, acids of phosphorus and salt thereof, more in particular it is $H_3BO_3$, $NaH_2PO_2$, $Na_4P_2O_7.10H_2O$, $K_3PO_4$, $(NH_4)_2HPO_2$, $Na_2B_4O_7.10H_2O$ and $Si(OH)_4$. Derivatives include the acid halides, such as acid chloride.

The amount of modifying agent can vary within wide ranges and is mainly determined by the degree of modification that is required. Preferred ranges of the weight ratio of molecular sieve to modifying agent are between 100 : 1 and 1 : 1, more in particular 10 : 1 to 3 : 1. These ratio applies to the amount of zeolite and the amount of dry modifying agent, not taking into account any liquid that can be used in the process. The amount of liquid is of influence on the results obtained.

Generally the weight ratio of liquid (if used) to modifying agent ranges from 400 : 1 to 1 : 20.

The process of the present invention can be used for separation of all kinds of gas mixtures. More in particular it is suitable for separations involving inter alia air gases ($N_2$, $O_2$) including rare gases such as He, Ne, Ar, Kr, Xe and Rn, halogens such as $Cl_2$, $Br_2$, and $I_2$, CO, $CO_2$, hydrogen and its isotopes such as HD, $H_2$, $D_2$, $CH_4$, silanes, phosphines, arsines, hydrogen halides such as HCl, HBr and HI, nitrogen oxides such as $N_2O$.

These separations can involve the separation of a more or less complex mixture in its component, to the removal of one valuable component from a mixture, or the purification of a gas or gas mixture, i.e. the removal of very small quantities of an impurity.

In case where one of the gases to be separated is an active gas ($SiH_4$: chemical adsorption; HCl: destruction of the zeolite), the zeolite is preferably chosen to catch the other component of the gaseous mixture.

It is also within the scope of the invention to adsorb one or more gases in a molecular sieve as defined herein and store these molecular sieves with adsorbed gases for a prolonged period of time, or use these for controlled release of the adsorbed component(s).

The separation of gases is carried out in the ways known in the art. An example thereof is the PSA-process.

The adsorption is usually performed by nonisobaric treatment:
- adsorption of superatmospheric (3-8 bar) pressure followed by desorption at atmospheric pressure, or
- adsorption at atmospheric pressure followed by desorption at subatmospheric pressure (0.1-0.5 bar), or
- adsorption at superatmospheric pressure (3-8 bar) followed by desorption at subatmospheric pressure (0.2-0.5 bar).

The present invention is now elucidated on the basis of the following examples.

EXAMPLE 1

A batch of 300 g $NH_4$-mordenite small port (SP) from Societe Chimique de la Grande Faroisse (E129NH4 M47) was outgassed for 4 days in a flow of $N_2$ at 425° C. 2 g of this batch was taken and outgassed in high vacuum ($<10^{-3}$ Torr) for 1 night at 451° C. FIG. 1 shows the adsorption kinetics of $N_2$ and Xe at 0° C. The initial pressure of the gas (at t=0) is always 300 mm Hg. For both gases the equilibrium is reached within 25 minutes.

From the original batch of 300 g a sample of 5 g (particle size $>800/\mu m$) was mixed with a 25 ml of 4% boric acid solution. The mixture was heated to 90° C. to evaporate the water. The solid sample was then heated for 2 hours at 500° C. in air. 2 g of this sample were outgassed overnight in vacuum in order to test the adsorption behaviour for $N_2$ and Xe (FIG. 1). The data show a decrease in the adsorption capacity of $N_2$ and a very slow adsorption, controlled by diffusion, for Xe due to the pore blocking boron-oxygen compounds.

EXAMPLE 2

Figure 2:
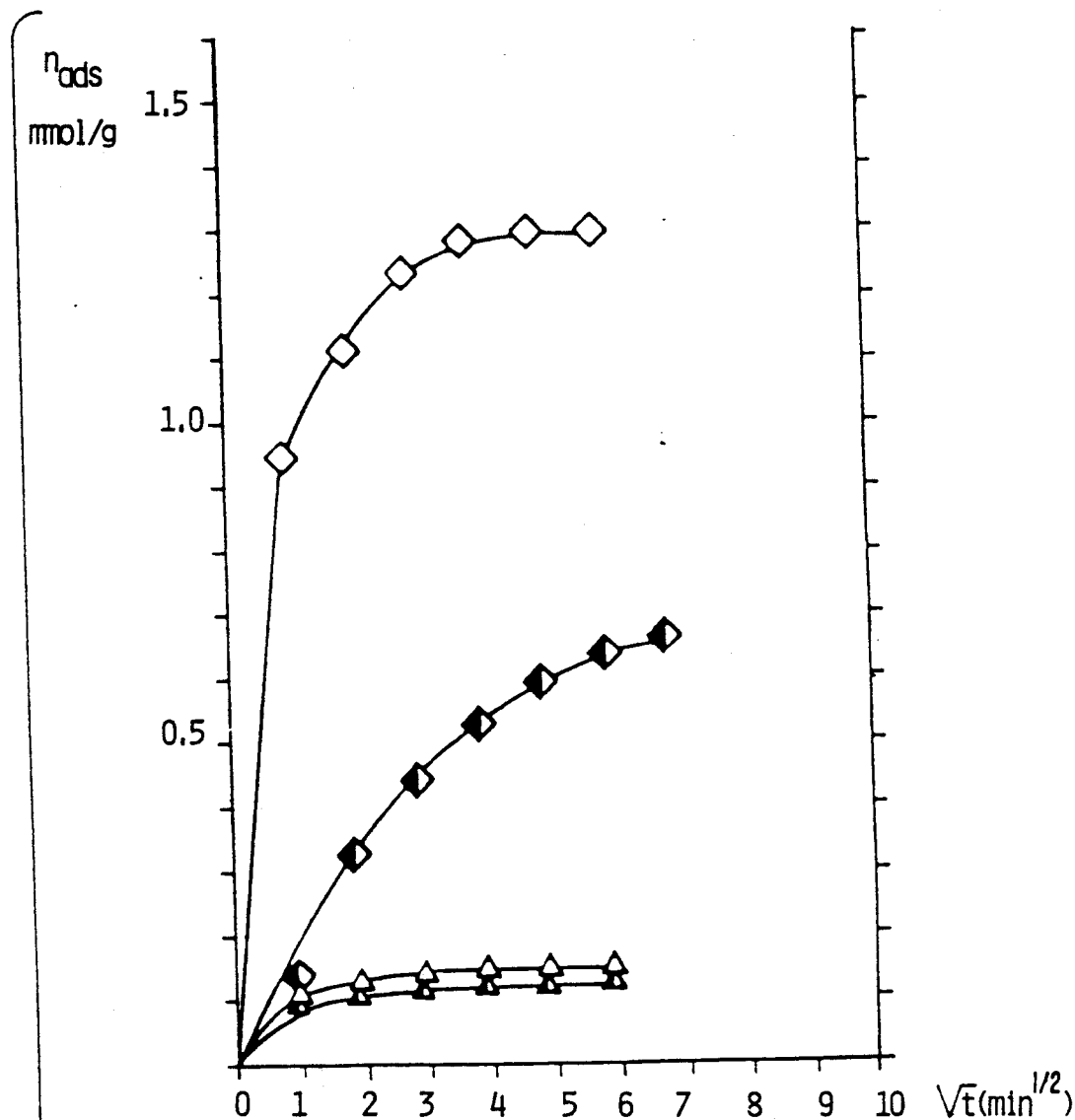

3 g of the parent sample, H-mordenite Zeolon 900 Norton, were outgassed overnight at 415° C. and tested with Ar and Xe at 0° C. The kinetics in FIG. 2 show fast adsorption rates for both test gases.

3.3 g of the parent sample (particle size $>800/\mu m$) were heated with 20 ml of a 2% boric acid solution at boiling temperature for 1 hour, cooled and decanted. The sample was dried overnight at room temperature in air and dehydrated at 450° C. The kinetics of Ar and Xe at 0° C., shown in FIG. 2, demonstrate a decrease of the adsorption capacity for Ar and a slow, diffusion-controlled adsorption of Xe which is caused by pore-narrowing effects of the implanted boron-oxygen compounds.

EXAMPLE 3

Figure 3:
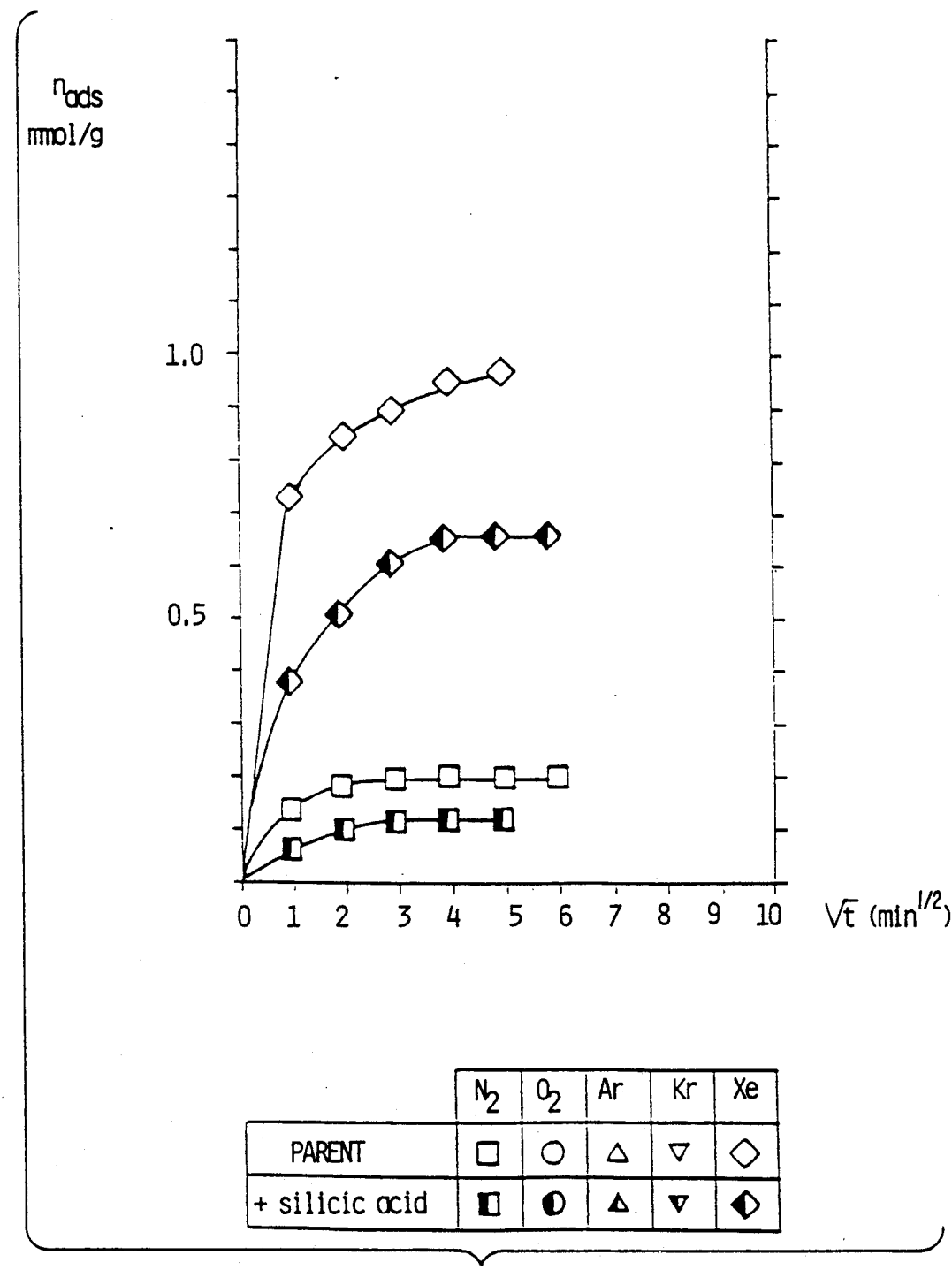

3 g of the parent sample, NaY (LZY-52) from Union Carbide, were outgassed overnight at 395° C. in vacuum and tested. FIG. 3 shows the adsorption kinetics of Xe and $N_2$ at 0° C. A relatively high adsorption is observed for Xe. 3 g of the parent sample (particle size $<150/\mu m$) were mixed with 10 ml of a colloidal solution of silicic acid in methanol. The slurry was dried at 100° C. and heated for 3 hours at 400° C. in air. The sample was dehydrated and tested with the test gases. FIG. 3 shows a decrease of the adsorption capacities for both $N_2$ and Xe at 0° C. due to the implanted obstructions inside the cages of the Y-type zeolite.

Figure 4A:
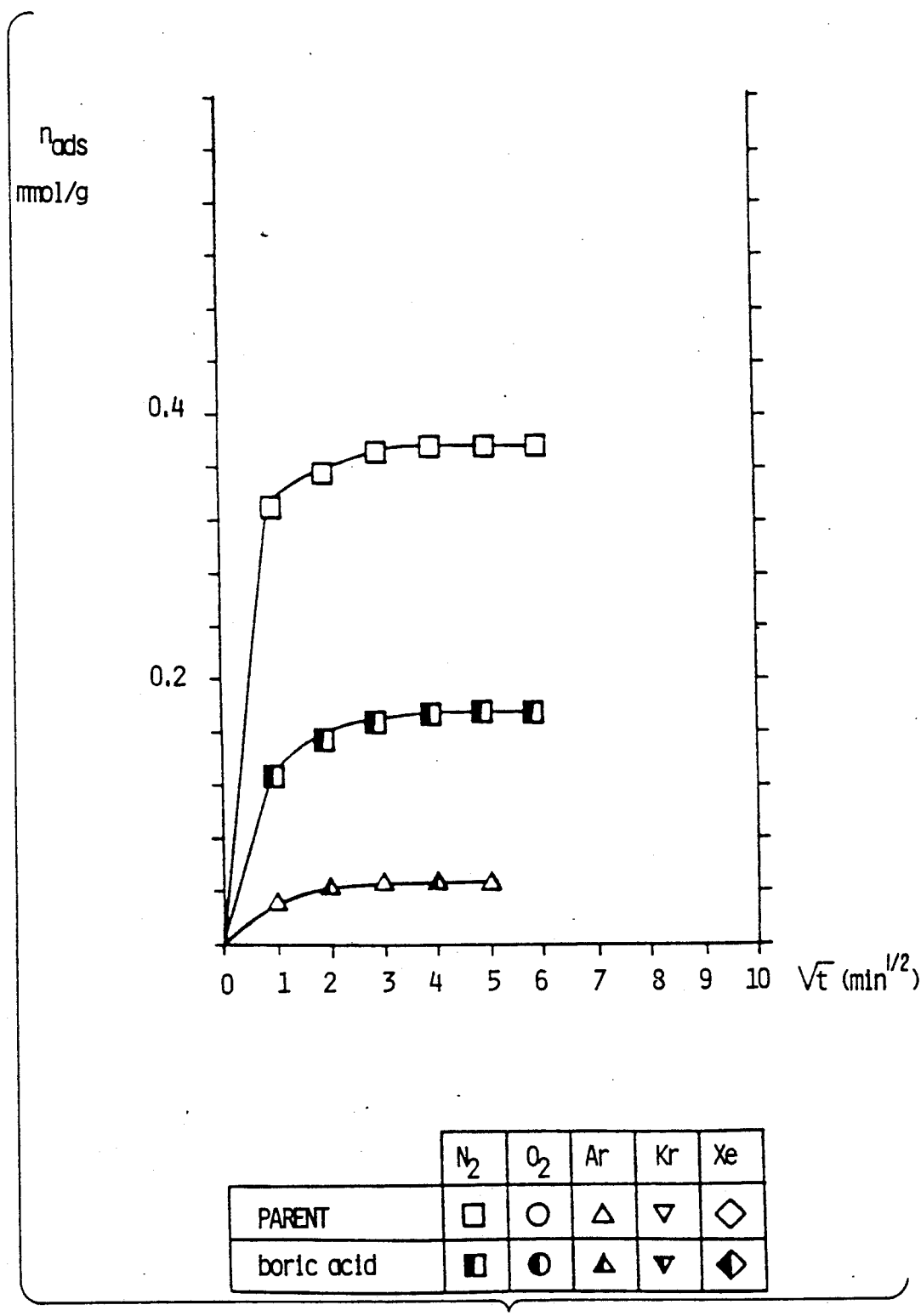

EXAMPLE 4a 3 g of the parent sample, Ca A from Ethyl Company, were outgassed at 360° C. overnight in vacuum and the adsorption behaviour was tested as shown in FIG. 4a for $N_2$ and Ar at 0° C. These kinetics show a fast uptake for both test gases. 5 g of the parent sample (particle size $<150/\mu m$) were taken and modified with 30 ml of a 4% boric acid solution. The water of the slurry was evaporated at 70° C. and the dried sample was heated at 400° C. for 1 hour and 15 min and at 340° C. overnight to dehydrate in vacuum. The kinetic runs are shown in FIG. 4a for $N_2$ and Ar at 0° C. These kinetics show a neglectable decrease of the adsorption capacity for Ar but the capacity for $N_2$ is decreased to 50% of the capacity of the original sample. This demonstrates the change of the adsorption behaviour caused by the modification with boric acid.

EXAMPLE 4b 3 g of the parent sample, Ca A from Ethyl Company, were dehydrated at 370° C. in vacuum overnight. The adsorption kinetics of Xe and $CH_4$ were investigated at 0° C. (FIG. 4b). 3 g of this parent sample (particle size $<150/\mu m$) were mixed with 0.15 g boric acid powder. After adding 3 ml of water the mixture was stirred during a few minutes, dried at 105° C. in air for 1 hour and heated for 2 hours at 400° C. in air.

Figure 4B:
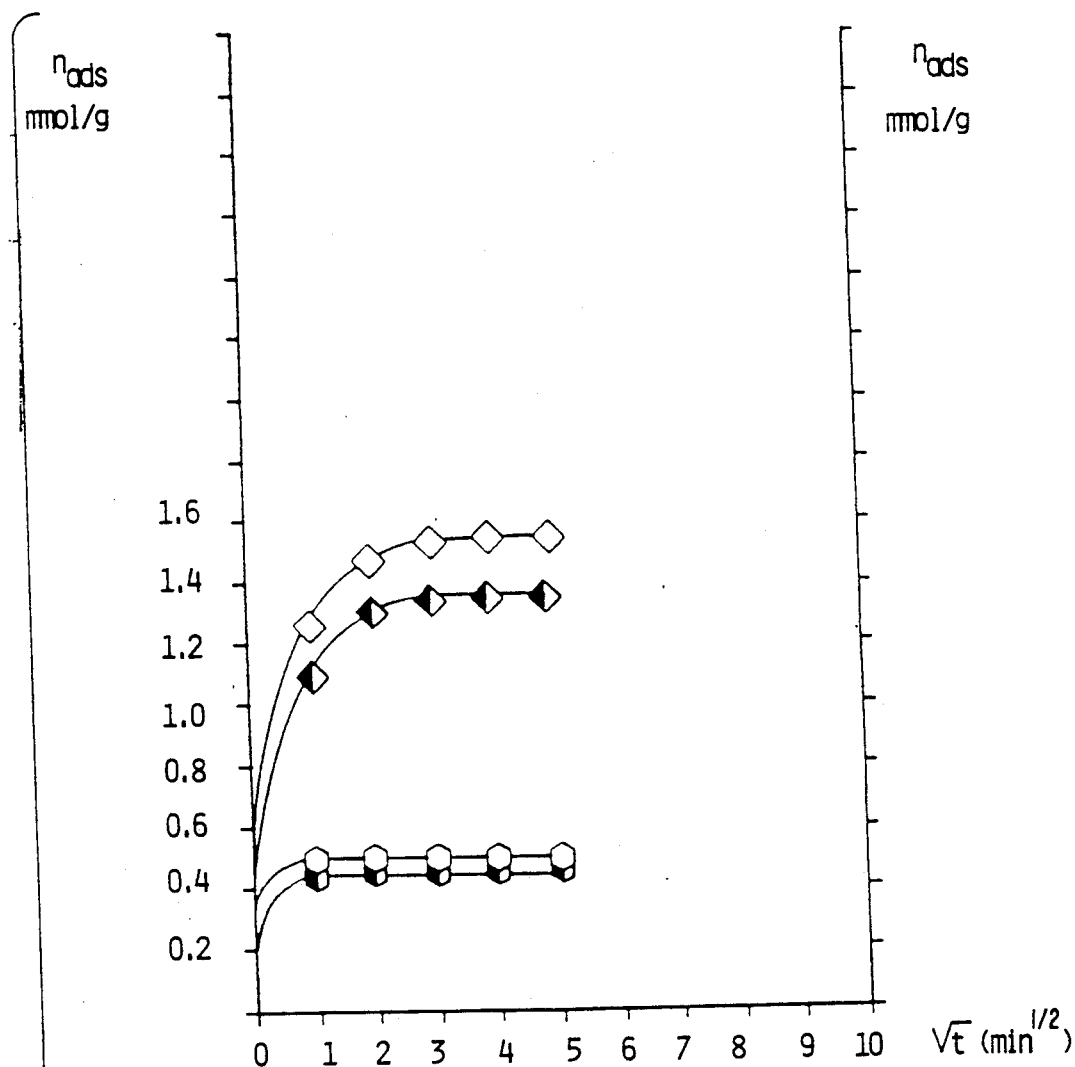

2 g of this modified sample were dehydrated overnight in vacuum at 368° C. As shown in FIG. 4b one observes a decrease in the adsorption capacity for both gases Xe and $CH_4$ at 0° C.

EXAMPLE 5

Figure 5A:
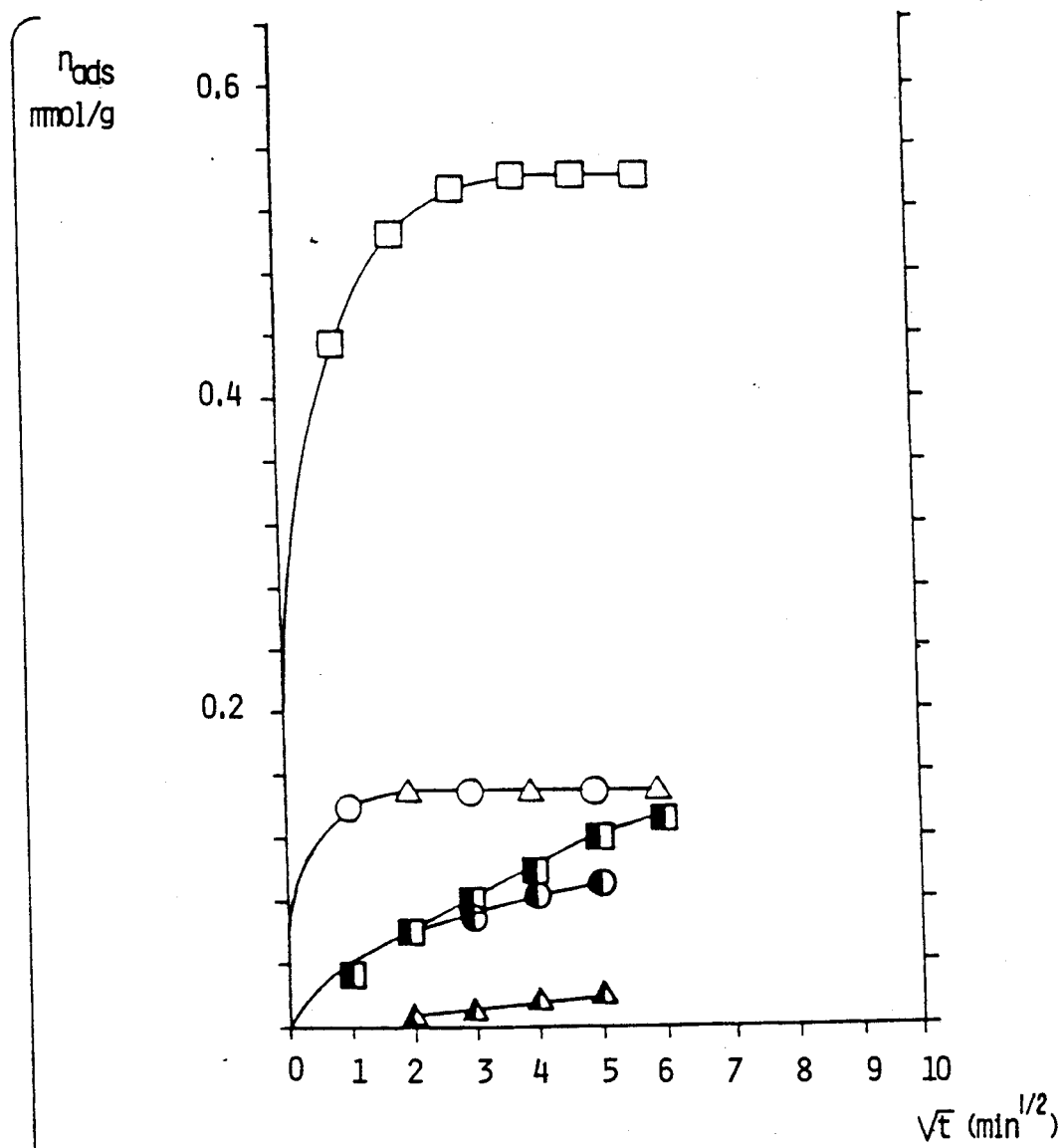

A 2 g of Na-mordenite SP (E127NaM 543:SCGP) were outgassed overnight at 420° C. in high vacuum and tested for its absorption behaviour. FIG. 5a shows the adsorption kinetics of $O_2$, $N_2$ and Ar at 0° C. indicating fast adsorption rates for the three test gases.

To 5 g of the parent sample (fraction $<150/\mu m$) 25 ml of a 4% boric acid solution were added and the water was evaporated at 80° C. Then 2.25 g of this sample were heated at 500° C. in air for 2 hours. The resulting substrate was brought in a volumetric adsorption apparatus and tested for the adsorption behaviour with $N_2$, $O_2$ and Ar at 0° C. The kinetics, shown in FIG. 5a indicate an adsorption controlled by diffusion for all the test gases. During the first minute, Ar is not adsorbed. After 36 min the capacities for $N_2$, $O_2$ and Ar are respectively 0.02; 0.09 and 0.13 mmol/g.

Figure 5B:
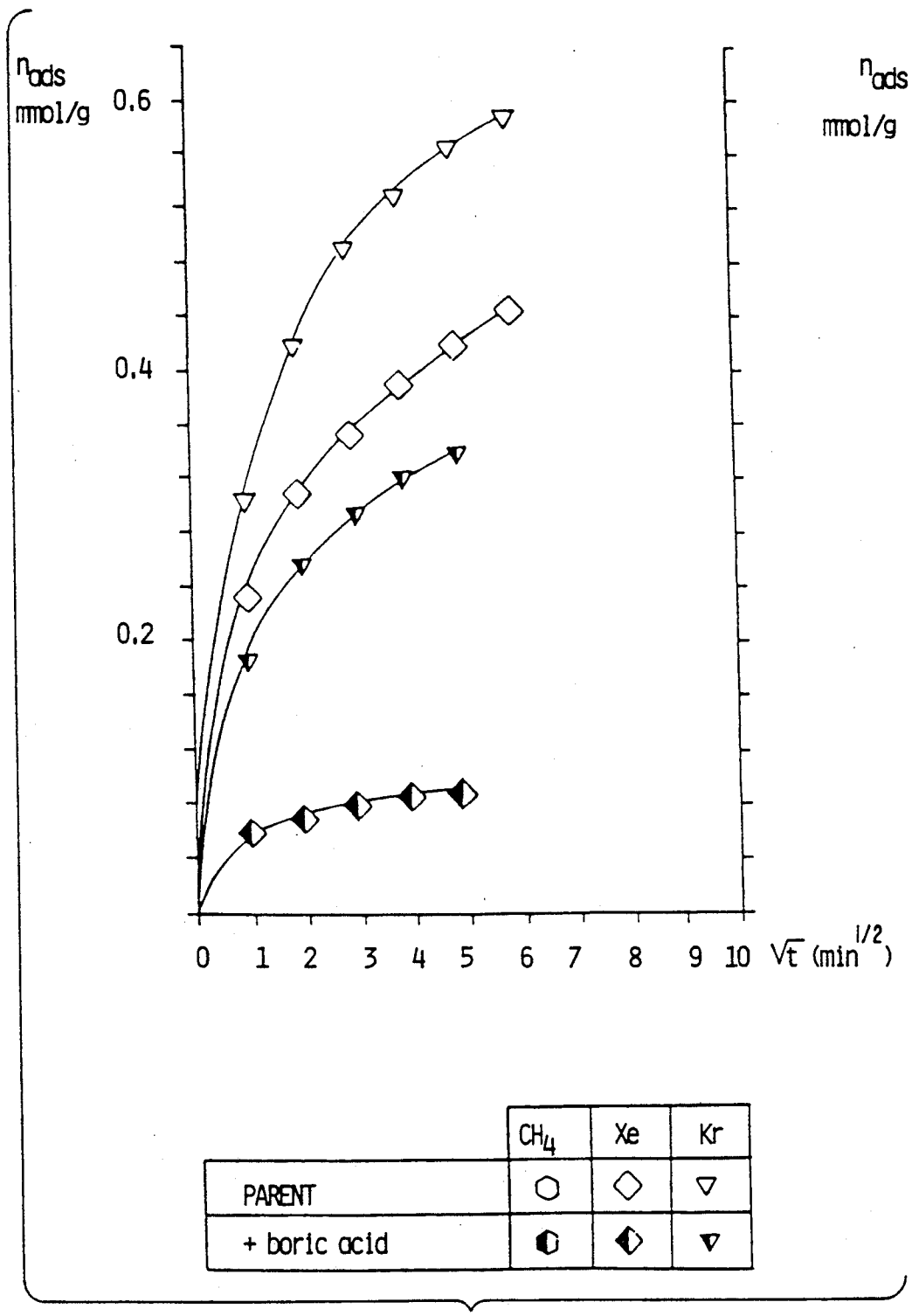

B The parent sample used in this example is the same substrate as in A. The sorption characteristics for Xe and Kr at 0° C. are shown in FIG. 5b.

3 g of the parent sample (fraction <150/μm) were mixed with 0.15 g powdered boric acid and stirred with 3 ml H₂O for a few minutes at room temperature. Then the sample was thermally treated for 1 hour at 100° C. and for 2 hours at 400° C., both in air.

2 g of this modified sample were dehydrated at 450° C. overnight in vacuum to investigate the sorption behaviour for Xe and Kr. FIG. 5b shows a capacity decrease for both gases.

EXAMPLE 6

A 50 g of E 127NaM 543 from SCGP were exchanged for $Ca^{2+}$ with 110 g of $CaCl_2$ into 500 ml $H_2O$ at room temperature for 1 night.

Figure 6A:
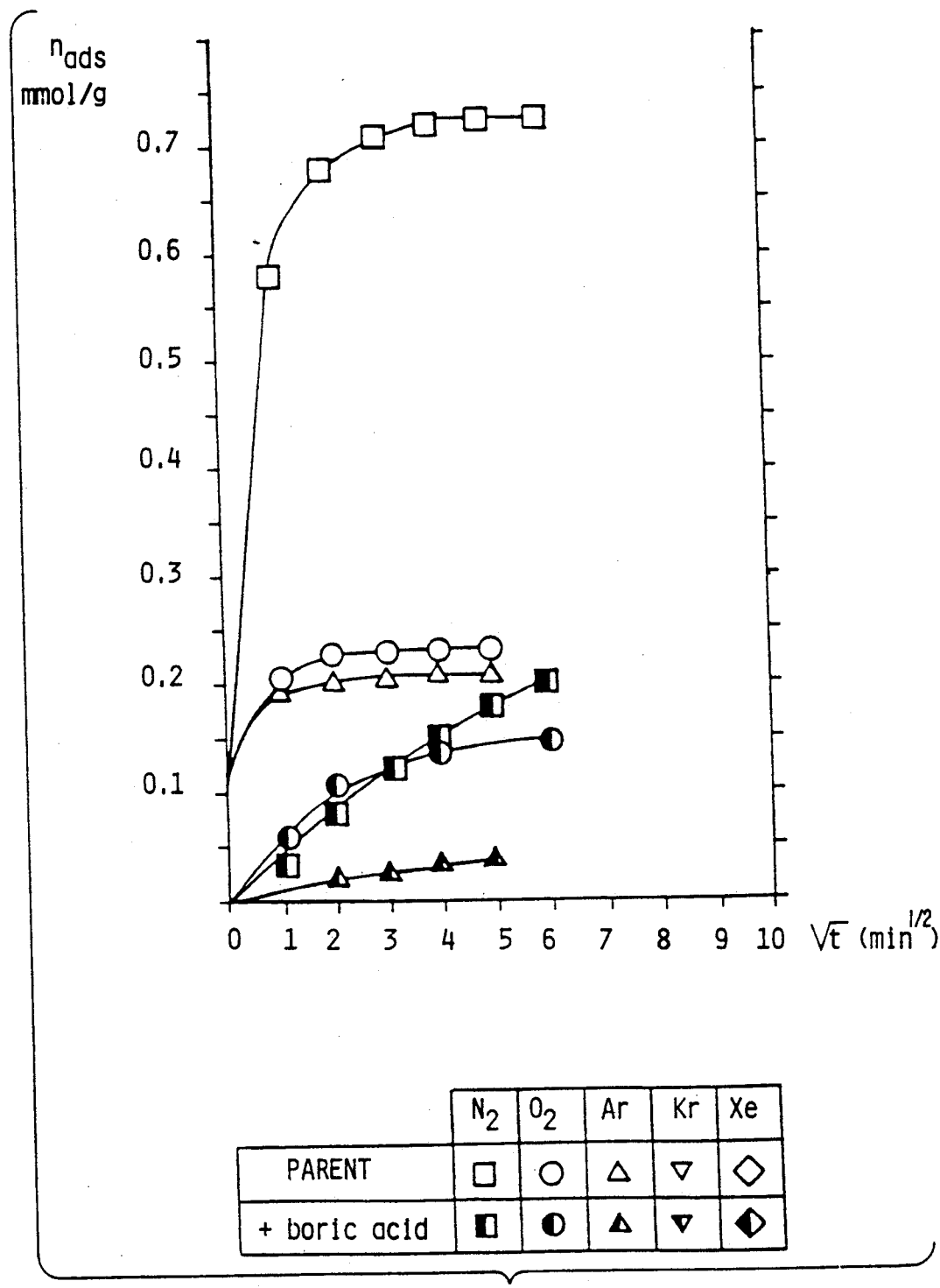

2 g of this batch were outgassed in vacuum overnight at 440° C. and tested for its adsorption behaviour with $N_2$, $O_2$ and Ar at 0° C. (FIG. 6a). The kinetics show fast adsorption rates for the three test gases.

5 g of the parent sample (fraction <150/μm) were treated with 25 ml of a 4% boric acid solution. The water was evaporated at 80° C. and then the sample was heated for 2 hours in air at 500° C. 2 g of this sample were brought in the volumetric apparatus and outgassed overnight at 458° C. The adsorption behaviour, tested with $O_2$, $N_2$ and Ar at 0° C. shows a low adsorption capacity for Ar (0.03 mmol/g after 36 min) while the $N_2$ and $O_2$ capacities are respectively 0.2 and 0.15 mmol/g after 36 min (FIG. 6a). The boric acid modification has decreased the accessibility of the sample for these gases.

Figure 6B:
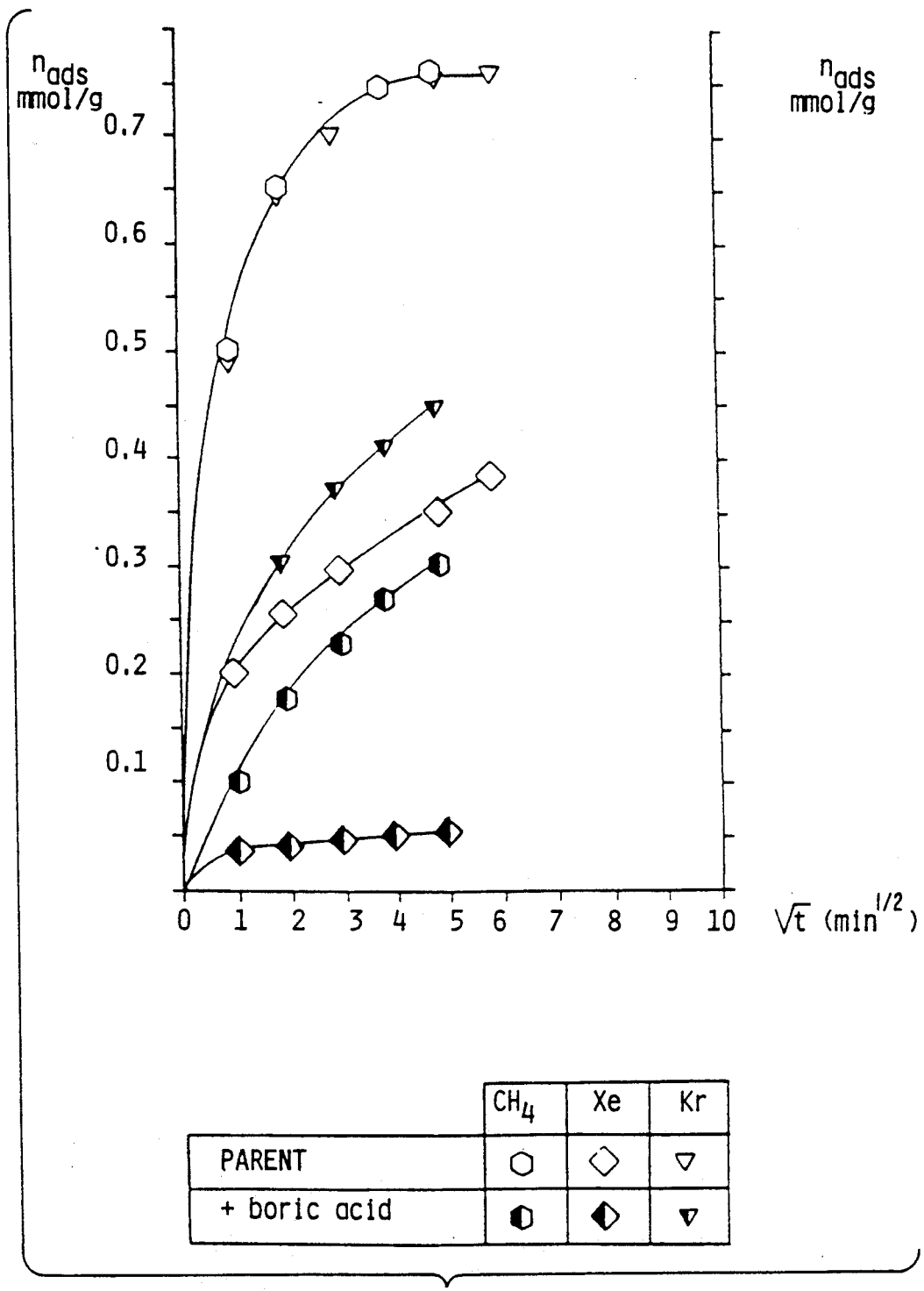

B 2 g of the parent sample, CaM CM782 (SCGP, extrudates), were dehydrated in vacuum overnight at 450° C. FIG. 6b shows the observed sorption characteristics for Xe, Kr and $CH_4$ at 0° C. No equilibrium was observed after 25 min for the mentioned gases.

3 g of the parent sample (fraction <150/μm) were mixed with 0.15 g boric acid powder and stirred with 3 ml $H_2O$ at room temperature.

Afterwards, the sample was thermally treated for 1 hour at 105° C. and for 2 hours at 400° C., both in air.

2 g of this sample were dehydrated overnight at 454° C. in vacuum to study the adsorption kinetics of Xe, Kr and $CH_4$. FIG. 6b shows a capacity decrease for the three gases. Comparing with $CH_4$ and Kr the decrease of the adsorption capacity for Xe is larger compared to the smaller $CH_4$ and Kr gas molecules.

EXAMPLE 7

Figure 7A:
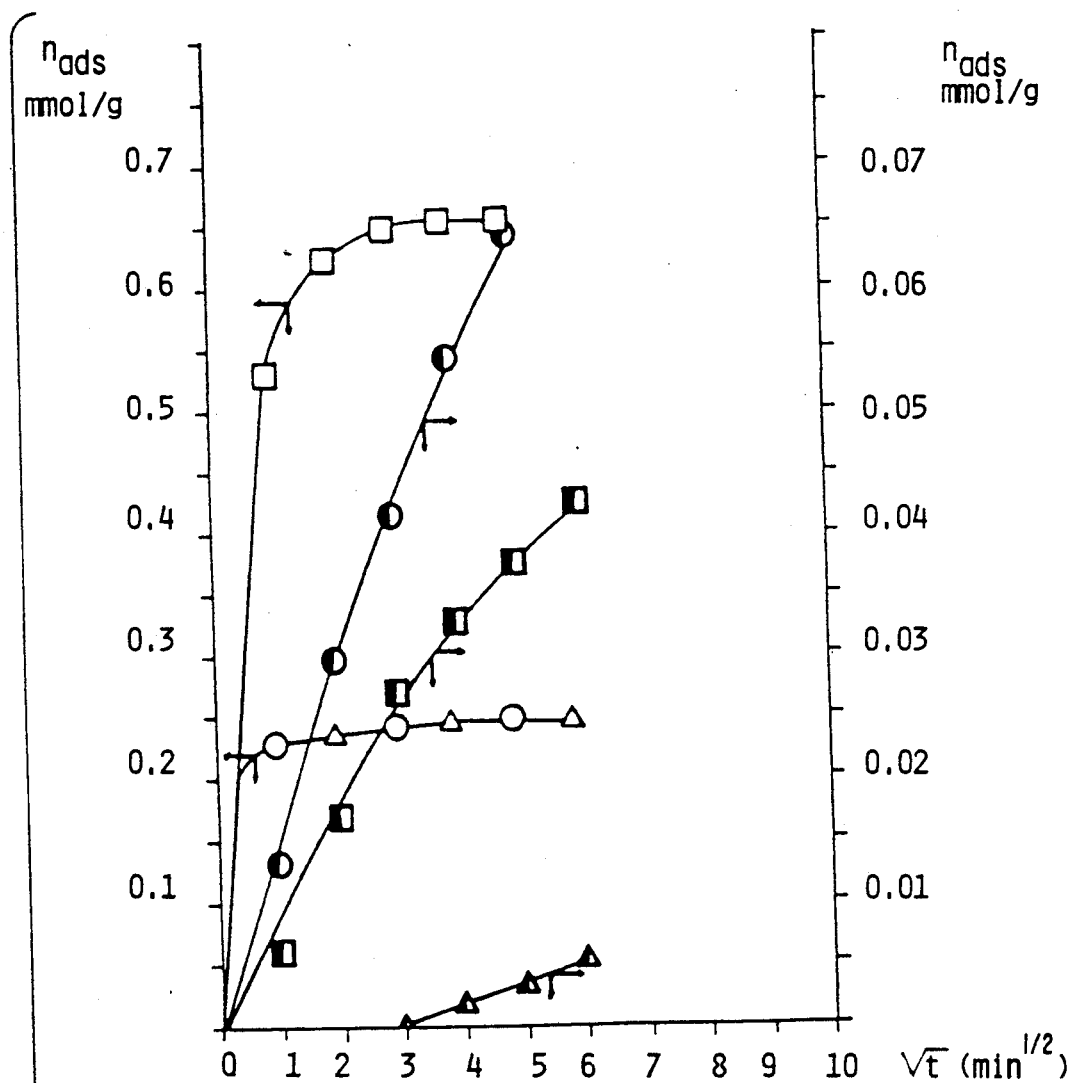

A 50 g of E127NaM 543 from SCGP were exchanged for $Ba^{2+}$ with 65 g of $Ba(NO_3)_2$ into 1 liter of water at room temperature during 1 night. 2 g of this batch were outgassed overnight in vacuum at 450° C. and tested for its adsorption behaviour with $N_2$, $O_2$ and Ar at 0° C. (FIG. 7a). The kinetics show fast adsorption rates for the three test gases.

5 g of the parent sample (particle size <150/μm) were treated with 25 ml of a boric acid solution and the water was evaporated at 70° C. The dried sample was heated for 2 hours at 500° C. in air. 2 g of this sample were outgassed overnight at 428° C. The adsorption kinetics (FIG. 7a) show an exclusion for Ar during the first 9 min. The uptake for $O_2$ is higher than for $N_2$ and the capacities after 36 min are respectively 0.077; 0.043 and 0.006 mmol/g for $O_2$, $N_2$ and Ar.

Figure 7B:
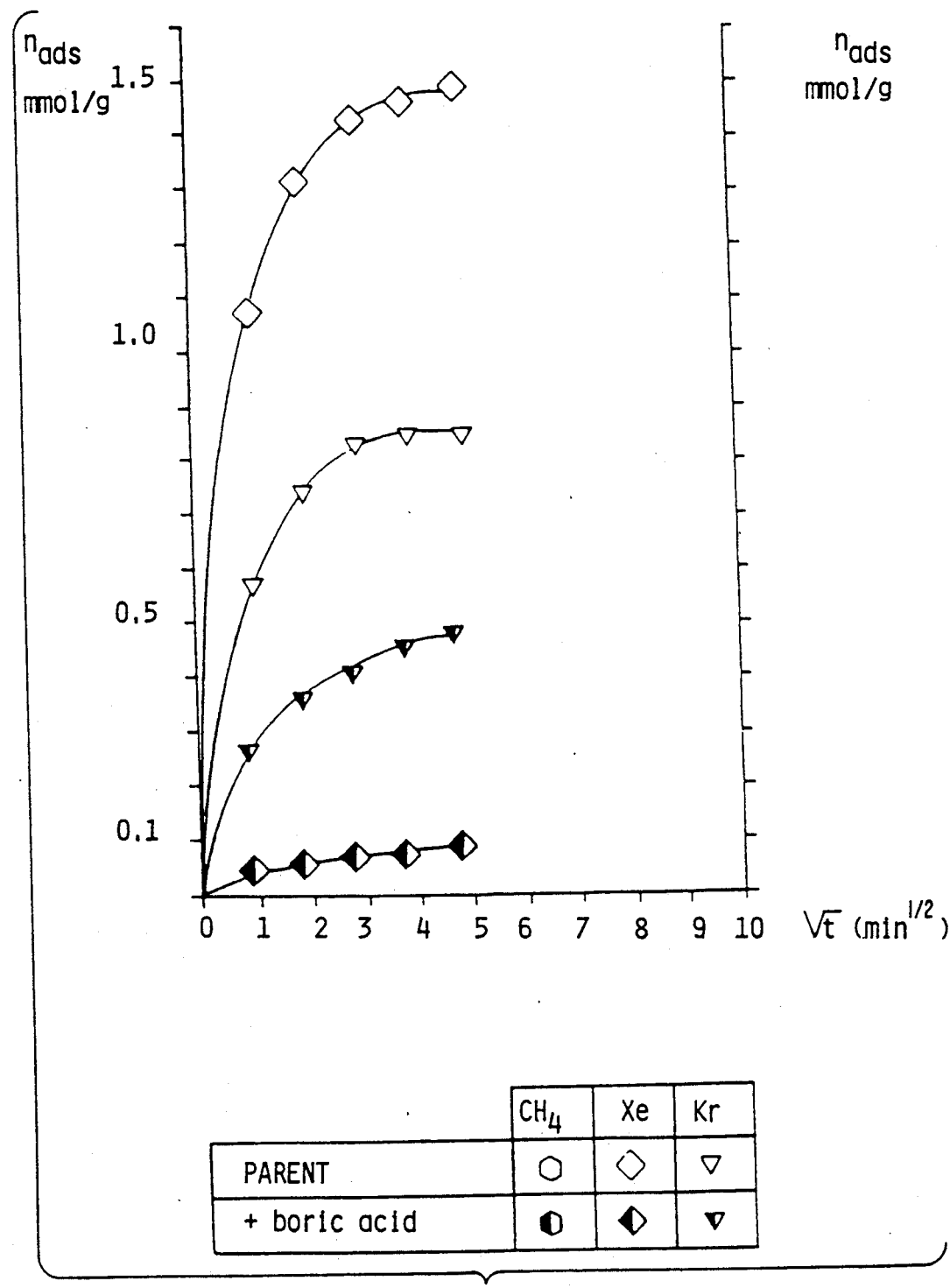

B The kinetic runs of Xe and Kr at 0° C. are investigated on the same parent sample used in FIG. 7a. FIG. 7b shows the adsorption kinetics of these gases. The adsorption of Xe after 25 min is 1.473 mmol/g.

3 g of the parent sample were mixed with 0.15 g powdered boric acid and stirred with 3 ml $H_2O$ at room temperature. Afterwards the sample was heated for 1 hour at 110° C. and for 2 hours at 400° C., both in air.

2 g of this treated sample were dehydrated at 450° C. overnight in vacuum. As shown in FIG. 7b the decrease in adsorption capacity for Xe was more important compared to that for Kr. The sorption value of Xe after 25 min is only 0.079 mmol/g.

EXAMPLE 8

Figure 8:
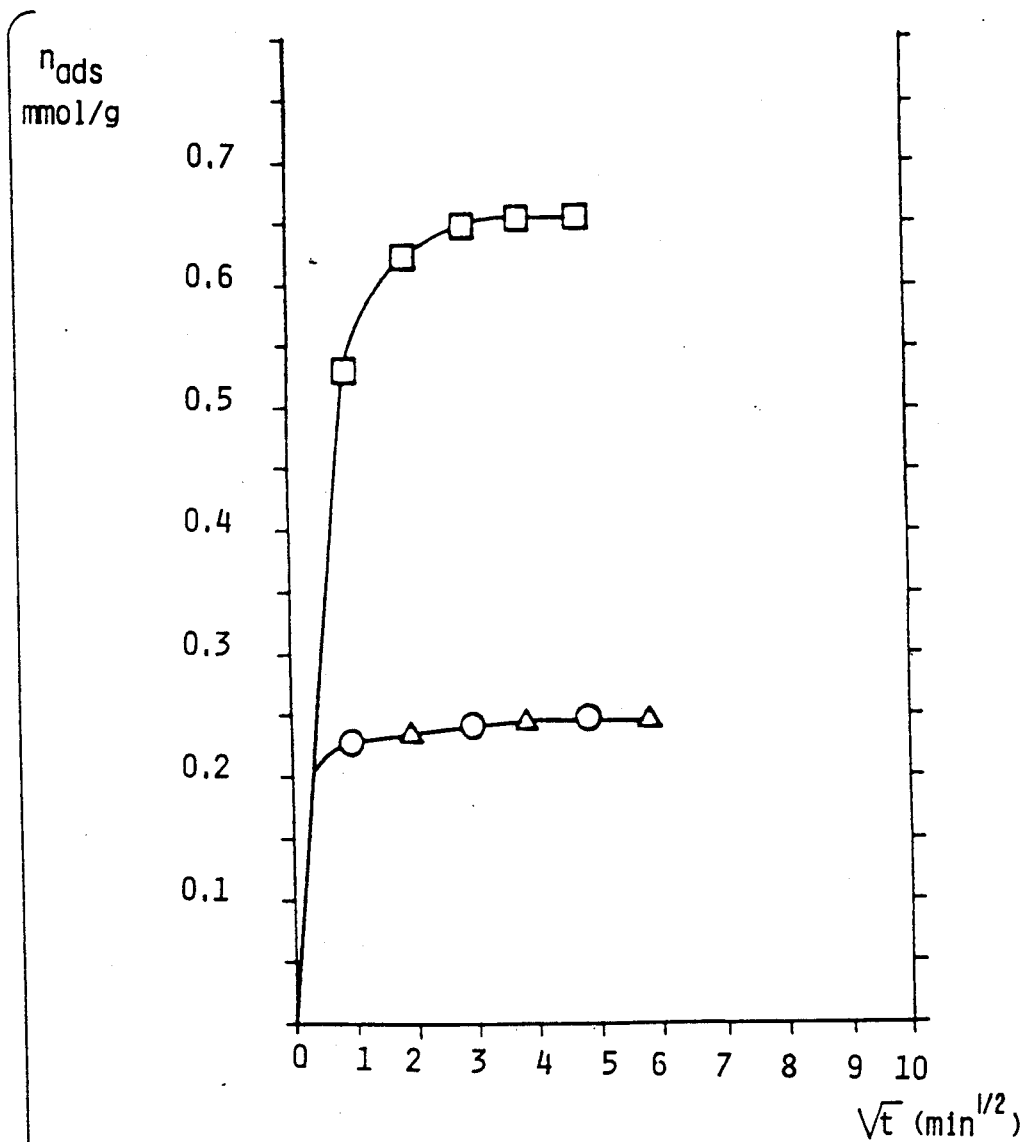

50 g of E127NaM 543 from SCGP were exchanged overnight at room temperature with 65 g $Ba(NO_3)_2$ in 1 liter of water. 2.1 g of this batch were outgassed overnight in vacuum. FIG. 8 shows the adsorption kinetics of $N_2$, $O_2$ and Ar at 0° C. indicating fast adsorption rates for all the test gases.

Figure 9:
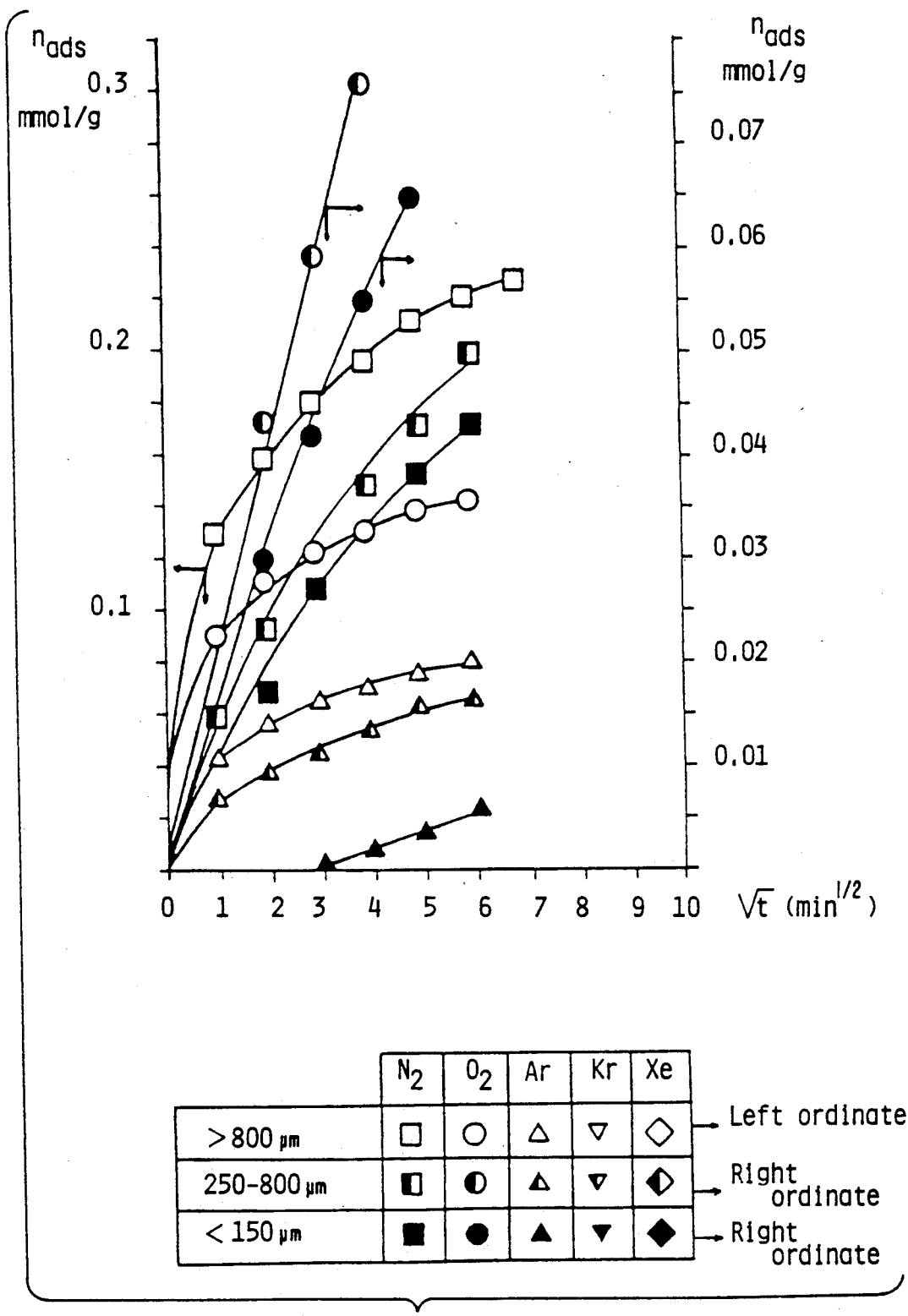

A 4 g of the parent sample (particle size >800/μm) were treated with 20 ml of a 4% boric acid solution and the water was evaporated at 70° C. The dried sample was heated for 2 hours at 500° C. in air. 2 g of a this sample were outgassed overnight at 450° C. The adsorption kinetics shown on FIG. 9 indicate slow diffusion-controlled adsorptions for $N_2$, Ar and $O_2$. The test gases Ar and $O_2$, having the same adsorption rate and capacity on the parent sample, are now separated.

B 2 g of the parent (particle size 250-800/μm) were treated with 10 ml of a 4% boric acid solution and the water was evaporated at 70° C. The dried sample was heated for 2 hours at 500° C. in air. This sample was outgassed overnight at 453° C. The adsorption kinetics, shown in FIG. 9, indicate diffusion-controlled adsorptions for the three test gases $N_2$, $O_2$ and Ar at 0° C. The capacity of $O_2$ is higher than of $N_2$ while the capacity of Ar is very low.

C. 5 g of the parent sample (particle size <150/μm) were treated with 25 ml of a 4% boric acid solution and the water was evaporated at 70° C. The dried sample was heated for 2 hours at 500° C. in air. 2 g of this sample were outgassed overnight at 428° C. The adsorption kinetics, shown in FIG. 9, indicate an exclusion for Ar during the first 9 min. Comparing the kinetics of $N_2$ and $O_2$ with example 9 the uptake for $O_2$ and $N_2$ is decreased.

From these data it is clear that a higher modification can be obtained when the particle size is small.

EXAMPLE 9

Figure 10:
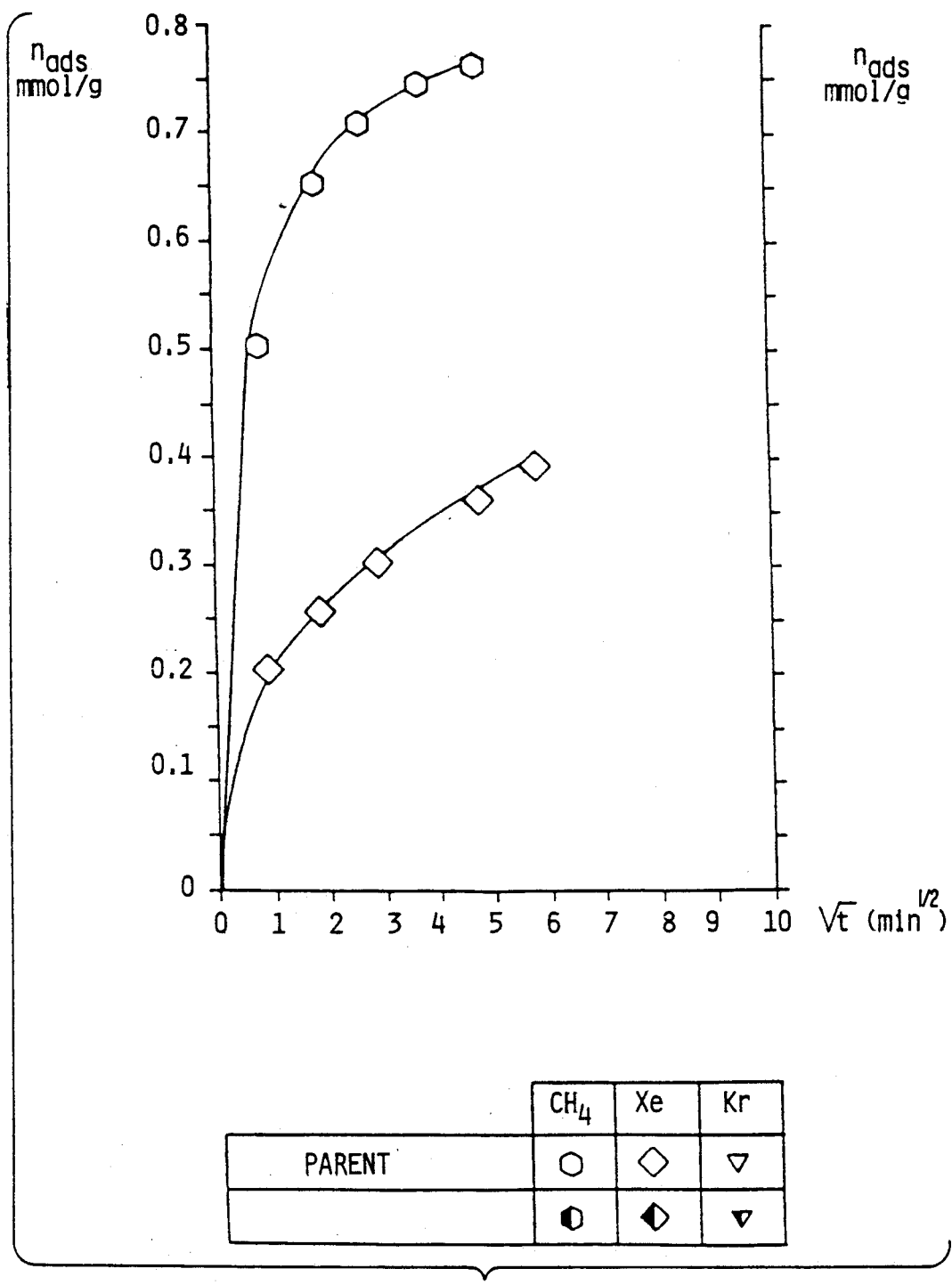

2 g of the parent sample, CaM CM782 (SCGP, extrudates) were dehydrated in vacuum overnight at 450° C. The adsorption behaviour of this sample was tested for Xe and $CH_4$ at 0° C. (FIG. 10).

A. Particle size >800/μm 3 g of the parent sample (fraction >800/μm) were mixed with 0.15 g $H_3BO_3$-powder. After adding 3 ml of $H_2O$, the slurry was mixed and dried during 1 hour at 105° C. in air. The dried sample was heated at 400° C. for 2 hours in air.

Figure 11:
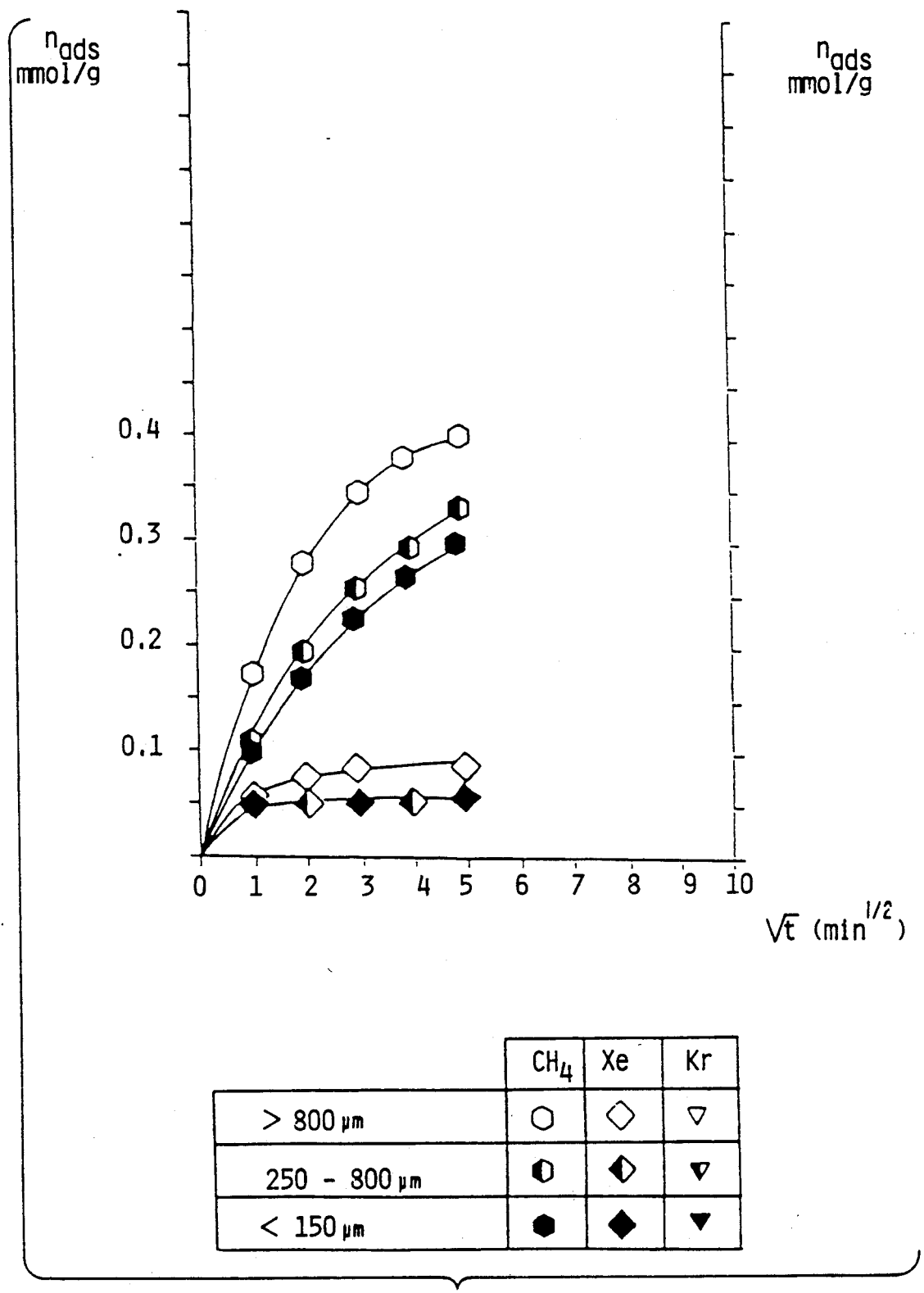

2 g of this modified sample were dehydrated at 463° C. overnight in vacuum. FIG. 11 shows the kinetic runs of Xe and $CH_4$ at 0° C. For both gases one observes a decrease in the sorption capacity.

B. Particle size 250-800μm 3 g of the parent sample (fraction 250-800/μm) were mixed with 0.15 g $H_3BO_3$-powder. Afterwards 3 ml of H₂O was added and the slurry was mixed and dried during 1 hour at 105° C. in air. The dried sample was heated at 400° C. for 2 hours in air. 2 g of this modified sample were dehydrated at 450° C. overnight in vacuum.

The adsorption kinetics of Xe and $CH_4$ are shown in FIG. 11. Compared to the modification with a fraction $>800/\mu m$, one observes a lower sorption capacity for both gases.

C. Particle size $<150/\mu m$ 3 g of the parent sample (fraction $<150/\mu m$) were mixed with 0.15 g $H_3BO_3$-powder. After adding 3 ml of H₂O, the slurry was mixed and dried during 1 hour at 105° C. in air. The dried sample was heated at 400oC for 2 hours in air.

2 g of this sample were dehydrated at 454° C. overnight in vacuum. FIG. 11 shows the kinetic runs of Xe and $CH_4$ at 0° C.

In general it can be concluded that the particle size of the parent sample has an influence on the finally obtained degree of modification. This is illustrated by the resulting adsorption behaviour for different gases. (see Example 8). Comparing Example 9 with Example 8, it is clear that with lower modification degrees the importance of the particle size of the parent sample decreases.

EXAMPLE 10

Figure 12:
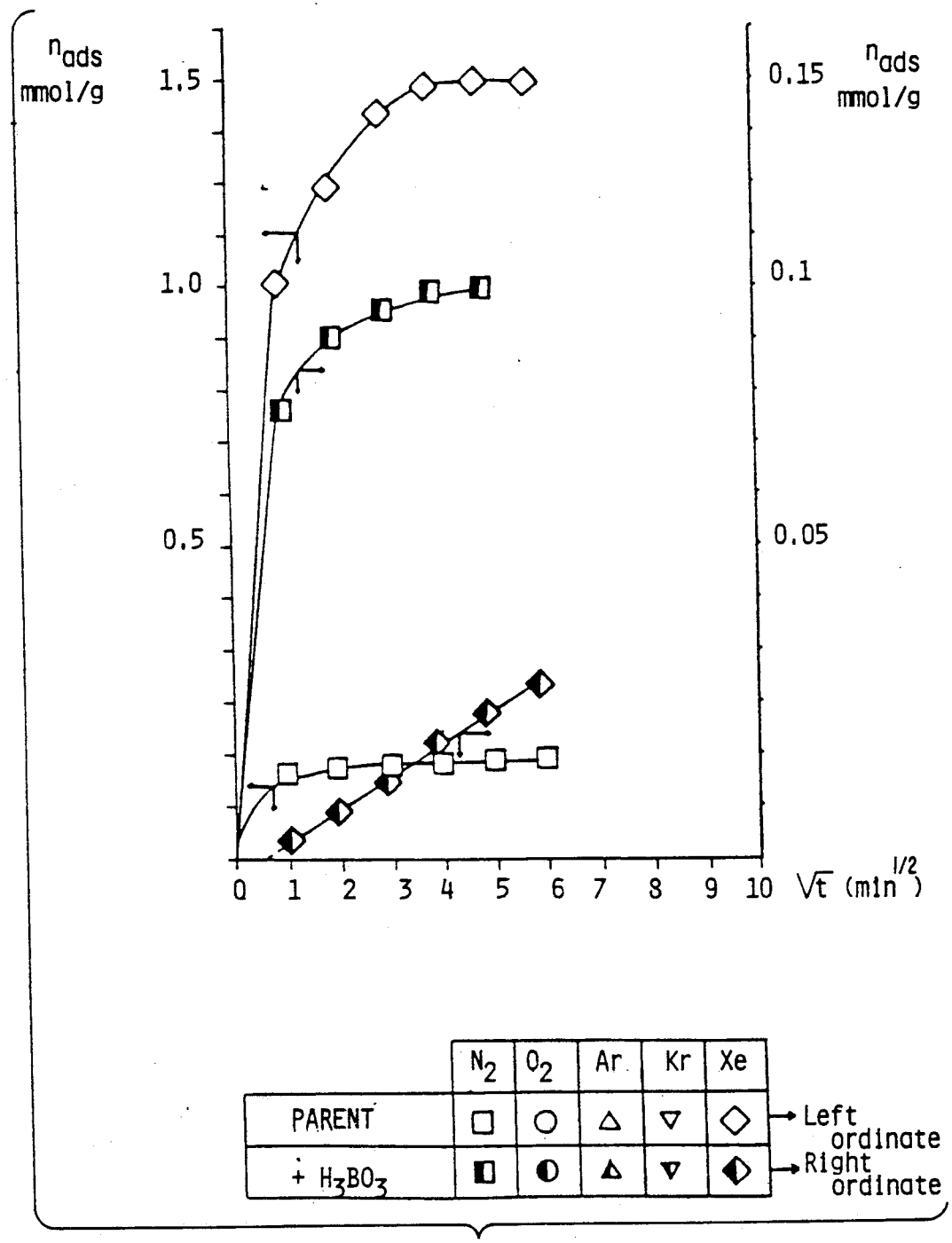

2 g of the parent sample (see Example 1) were dehydrated overnight at 451° C. in vacuum. The adsorption behaviour of this sample was tested for Xe and $N_2$ at 0° C. FIG. 12 shows the kinetic runs of these gases at the referred experimental conditions.

5 g of this parent sample were treated with 25 ml of 4% boric acid ($H_3BO_3$) solution. The system was heated 90° C. to evaporate the water. Afterwards the dry substrate was allowed to equilibrate in air during one night. The sample was heated for 2 hours at 500° C. in air. 2 g of this modified sample were dehydrated overnight in vacuum at 400° C. to study the influence of the boric acid treatment on the adsorption characteristics. FIG. 12 shows the decrease of the sorption capacity for $N_2$ at 0° C. The adsorption of Xe is not only decreased in capacity but one observes also a diffusion-controlled adsorption caused by the boron-oxygen compounds blocking the zeolite pores.

EXAMPLE 11

Figure 13:
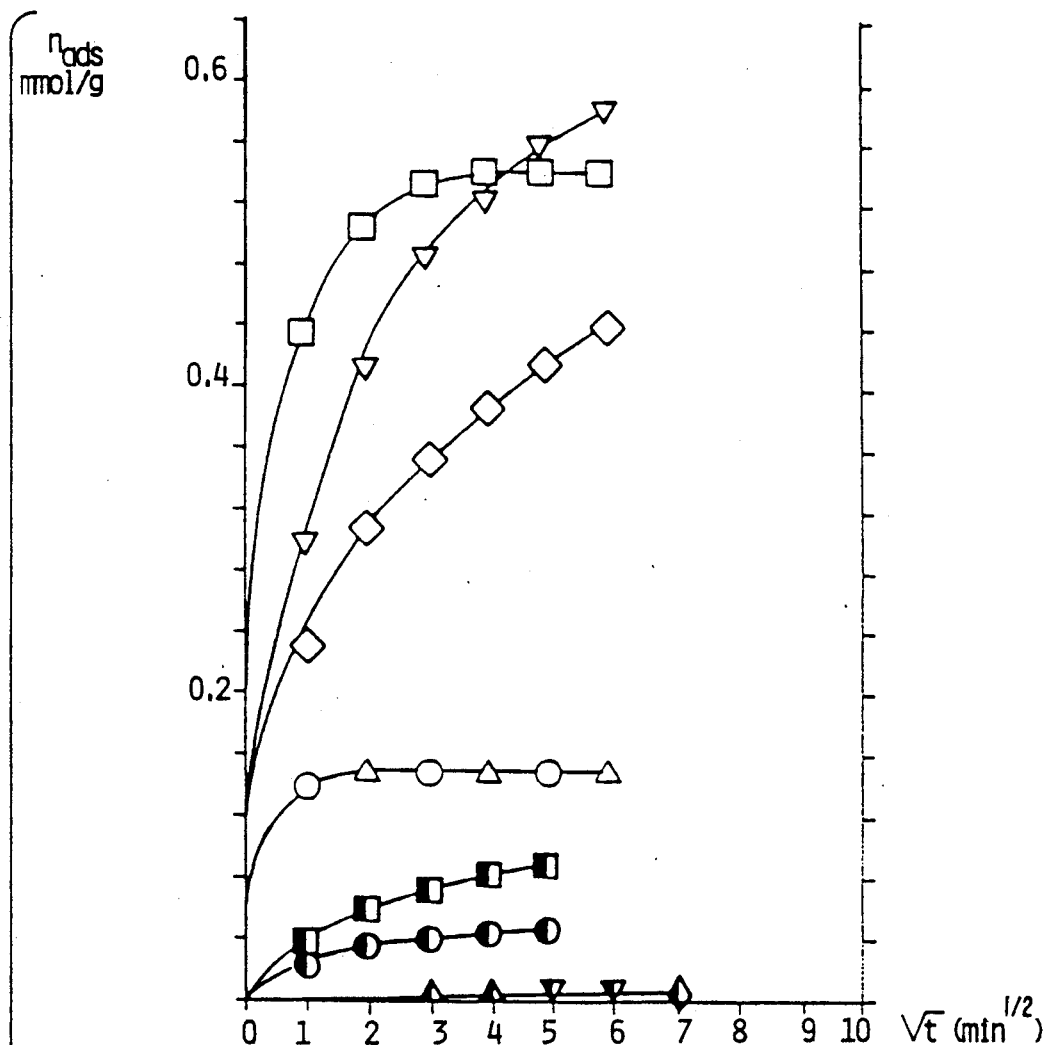

3 g of the sample E127NaM 543 (SCGP) were dehydrated at 420° C. in vacuum overnight in order to investigate the sorption characteristics for Xe, Kr, Ar, $N_2$ and $O_2$ at 0° C. FIG. 13 shows the adsorption kinetics of these gases. Oxygen, nitrogen and argon have reached an equilibrium situation within 25 min while Kr and Xe are still being adsorbed.

5 g (fraction 250–800/$\mu m$) of this parent sample were treated with 25 ml of 4% $NaH_2PO_2$ solution. This mixture was heated to 90° C. to evaporate the water. Afterwards the sample was treated for 2 hours in an oven at a temperature of 500° C. in air. 2 g of this substrate were dehydrated overnight at 444° C. in vacuum. One observes an exclusion for Kr, Xe and Ar and an enormous capacity decrease for $N_2$ and $O_2$ at 0° C. (FIG. 13).

EXAMPLE 12

The parent sample used in this experiment is the same substrate as in Example 11. Its sorption characteristics for Xe and Kr are shown again in FIG. 14.

5 g (fraction 250–800/$\mu m$) were treated with 25 ml of a 4% $Na_4F_2O_7.10H_2O$ solution by evaporating the water at 90° C. The sample was afterwards heated for two hours at 500° C. in air.

Figure 14:
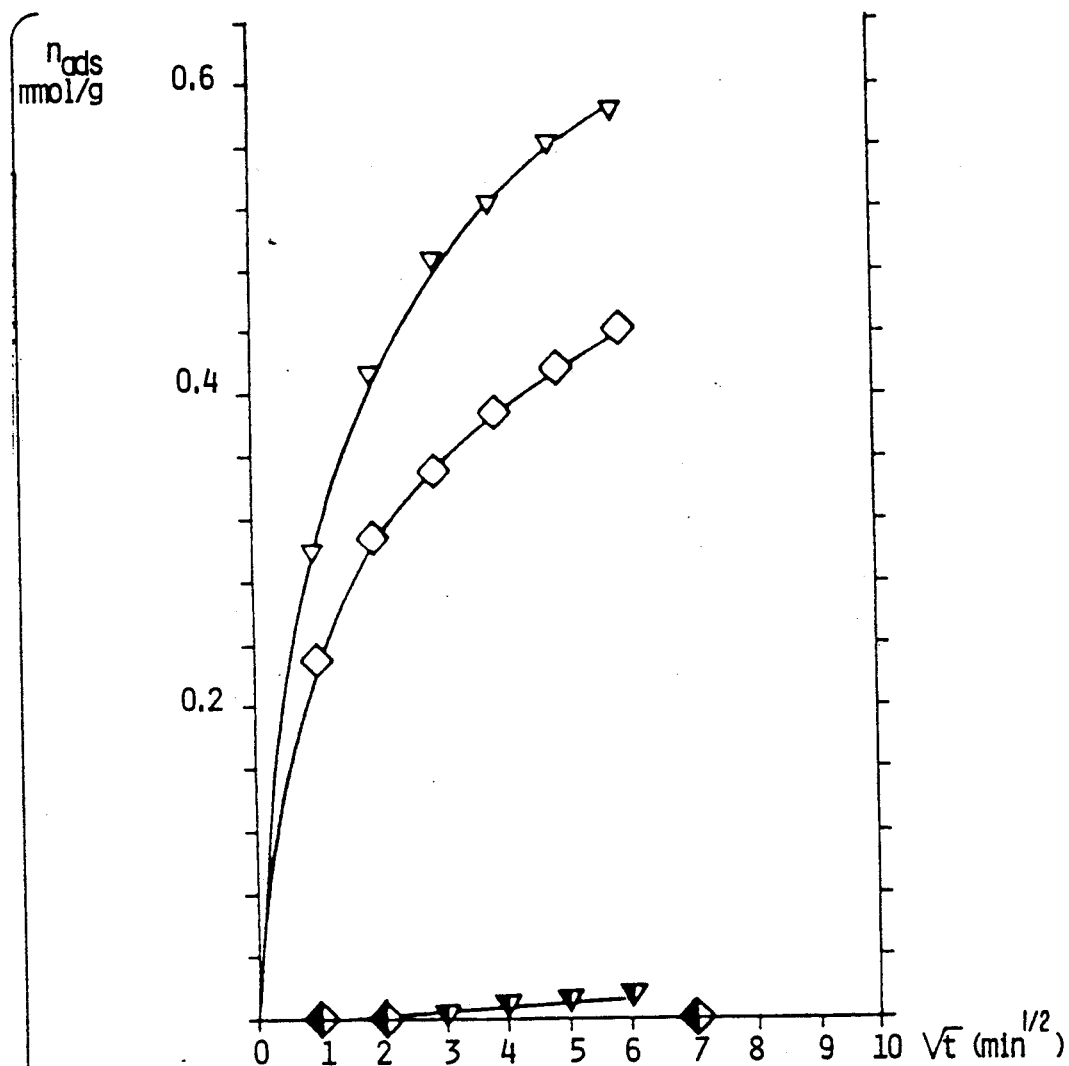

FIG. 14 shows the kinetic runs of Xe and Kr at 0° C. on this modified sample. Xe is completely excluded but Kr has a strong diffusion-controlled sorption kinetic run.

EXAMPLE 13

The parent sample used in this example was E127-NaM 543 treated with an aqueous $KNO_3$ solution. The $Na^+$-ions were exchanged for $K^+$-ions using 100 g $KNO_3$ and 50 g sample E127 in 0.5 l of H₂O for 1 night at room temperature.

Figure 15:
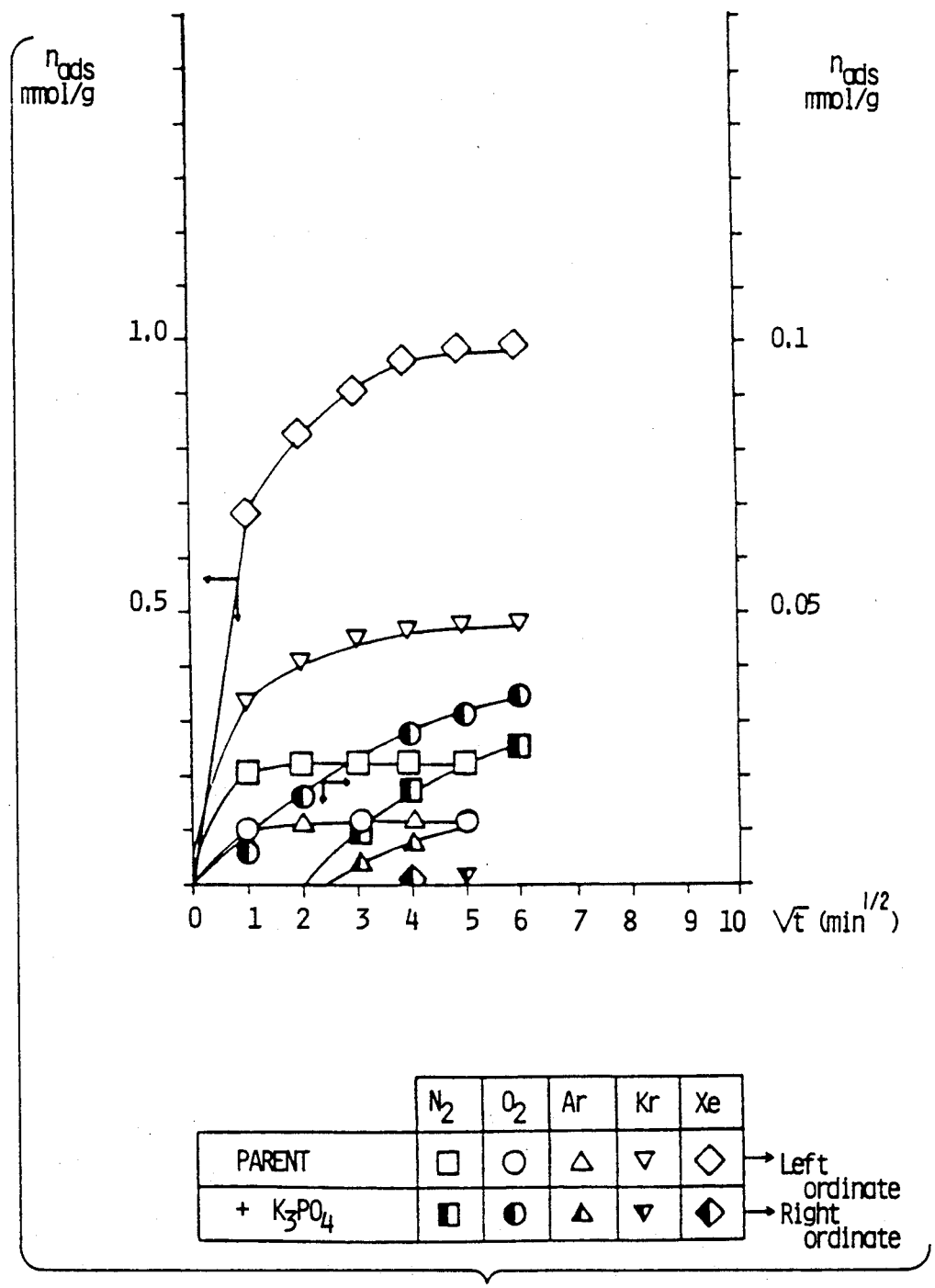

2 g of this exchanged sample (extrudates) were dehydrated in vacuum at 435° C. overnight. The adsorption behaviour was tested for Xe, Kr, Ar, $N_2$ and $O_2$ at 0° C. (FIG. 15). An equilibrium situation was reached for all gases after 36 min.

2 g of the parent sample (fraction 250–800/$\mu m$) were mixed with 0.2 g $K_3PO_4$ dry. Then 2 ml of H₂O were added and mixed. The sample was first dried during 1 hour at 100° C. in air and afterwards treated at 500° C. for 2 hours in air. After dehydration the adsorption characteristics were investigated (FIG. 15). Xe and Kr were excluded while $O_2$, $N_2$ and Ar show a strong diffusion-controlled adsorption with very low adsorption capacities.

EXAMPLE 14

Figure 16:
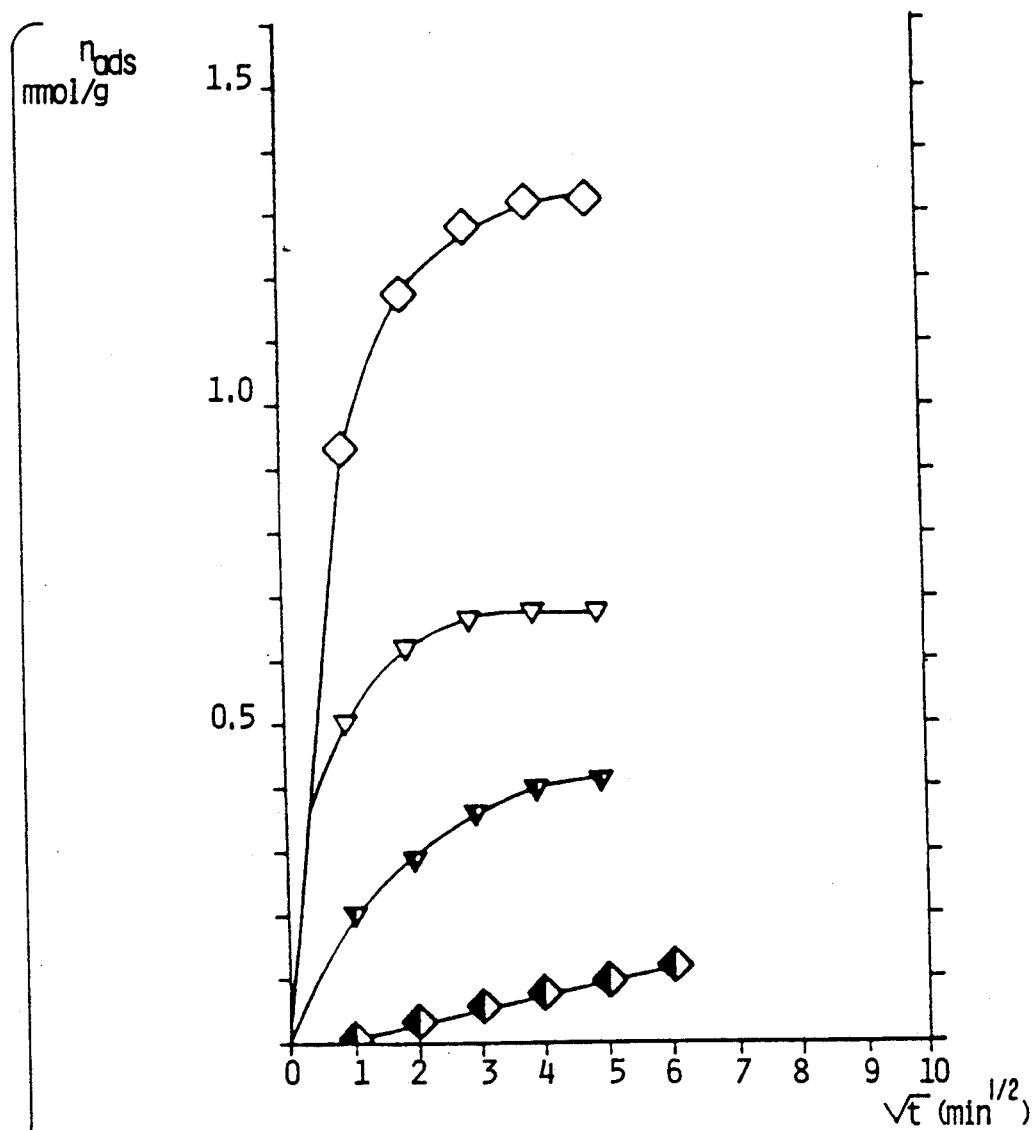

2 g of the parent sample, E126NaM 543, were dehydrated at 440° C. for one night in vacuum. The kinetic runs of Xe and Kr were investigated at 0° C. (FIG. 16). Both gases reach an equilibrium situation after 25 min and show a high adsorption capacity.

3.1 g of the parent sample (fraction $<150/\mu m$) were mixed with 0.3 g $(NH_4)_2HPO_4$. After mixing with 3 ml of H₂O the substrate was dried at 100° C. in air. A thermal treatment of 2 hours at 500° C. in air was the next experimental manipulation before dehydrating the sample in vacuum at 455° C. overnight. The adsorption of Xe and Kr was again investigated on this modified sample at 0° C. The modified sample shows a decrease in the adsorption capacity for both gases but especially a strong diffusion-controlled sorption process for Xe at 0° C. (FIG. 16).

EXAMPLE 15

Figure 17:
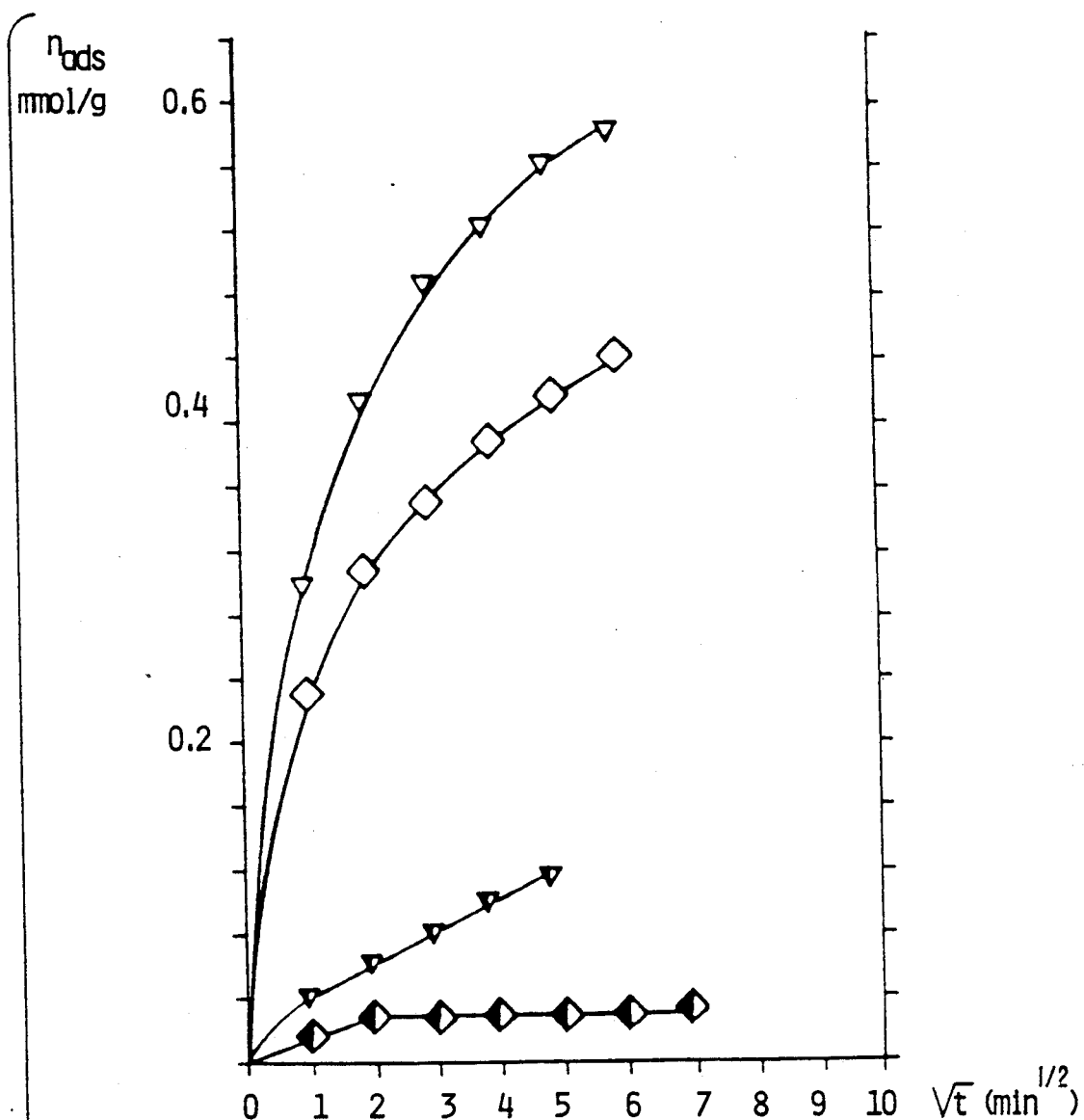

The parent sample used in this example is the same substrate as in Example 11. Its sorption characteristics for Xe and Kr are shown in FIG. 17.

5 g of the parent sample (fraction 250–800/$\mu m$) were treated with 25 ml of a 4% Borax solution. The sample was heated to evaporate the water and afterwards it was treated at 500° C. for 2 hours in air. After dehydration overnight at 463° C. in vacuum the sample was tested for Xe and Kr at 0° C. FIG. 17 shows the diffusion-controlled adsorption of Kr and the capacity decrease for Xe.

EXAMPLE 16

The parent sample used in this example was E127-NaM 543 (SCGF; extrudates) treated with a $CaCl_2$ solution. The $Na^+$-ions were exchanged for $Ca^{2+}$-ions, using 110 g $CaCl_2$ and 50 g sample E127 in 0.5 l of H₂O, overnight at room temperature.

Figure 18A:
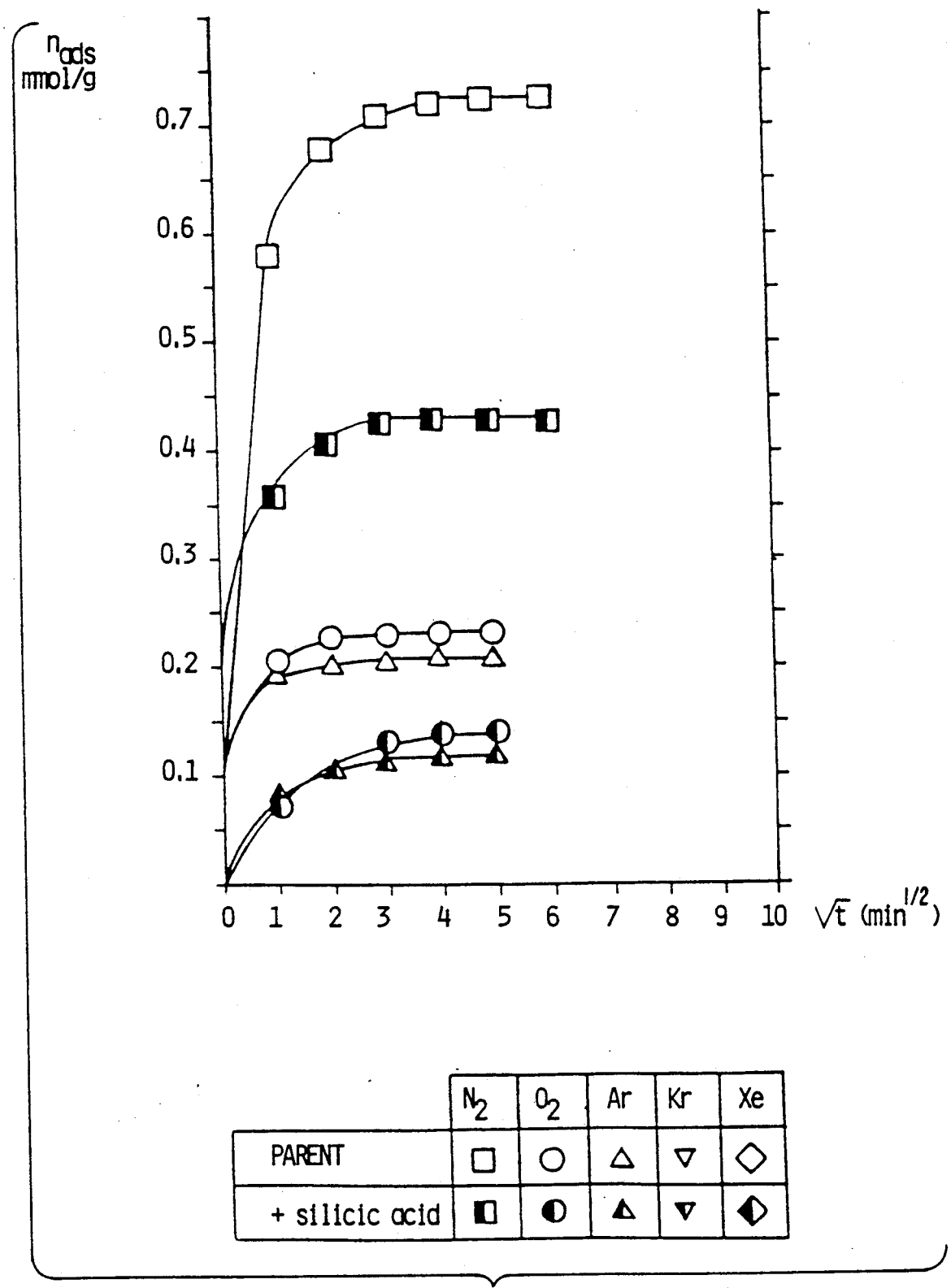

2 g of this exchanged sample were dehydrated overnight at 440° C. in vacuum. The adsorption behaviour was tested for $N_2$, $O_2$ and Ar at 0° C. FIG. 18a shows the kinetic runs of the test gases. All the gases have reached an equilibrium situation within 25 min.

2 g of the parent sample were treated with 10 ml of a colloidal silicic acid solution (contains ±15% of methanol). The solution was first evaporated and afterwards the sample was heated at 500° C. for 2 hours in air. After dehydration the sorption characteristics were investigated (FIG. 18a). One observes a capacity decrease for all gases and also a change of accessibility for $O_2$ and Ar.

EXAMPLE 17

The parent sample used in this example was CaM CM782 (SCGF; extrudates).

2 g of this sample were dehydrated overnight at 450° C. in vacuum. The adsorption behaviour was tested for Xe and $CH_4$ at 0° C. as shown in FIG. 18b.

2 g of the parent sample were treated with 10 ml of a colloidal silicic acid solution (contains ±15% of methanol). The solution was first evaporated at 80° C. in air and afterwards heated in air for 2 hours at 400° C. The modified sample was dehydrated at 451° C. overnight in vacuum.

Figure 18B:
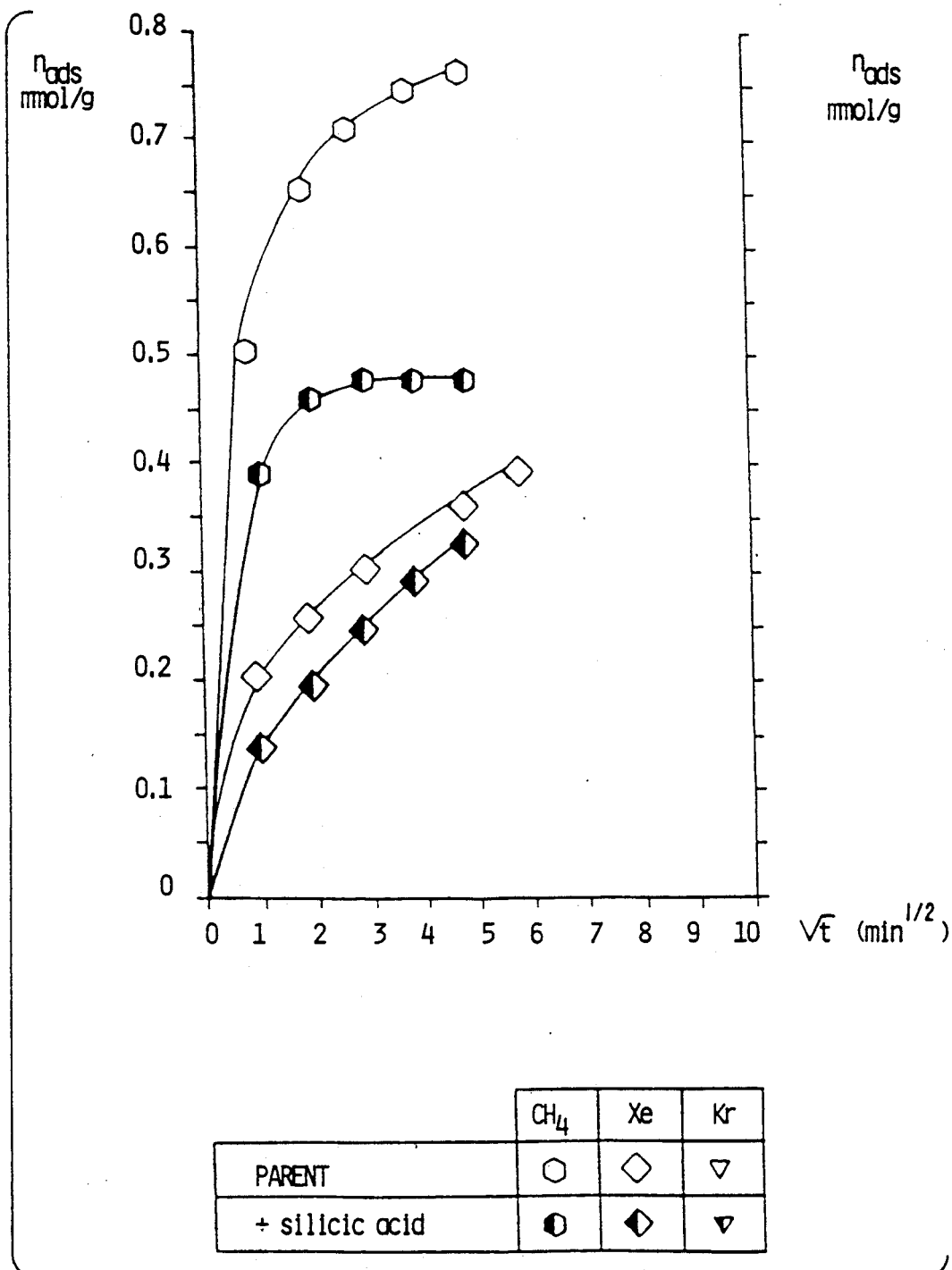

FIG. 18b shows the adsorption kinetics of Xe and $CH_4$ at 0° C. One observes a small capacity decrease for both gases.

EXAMPLE 18

Figure 19:
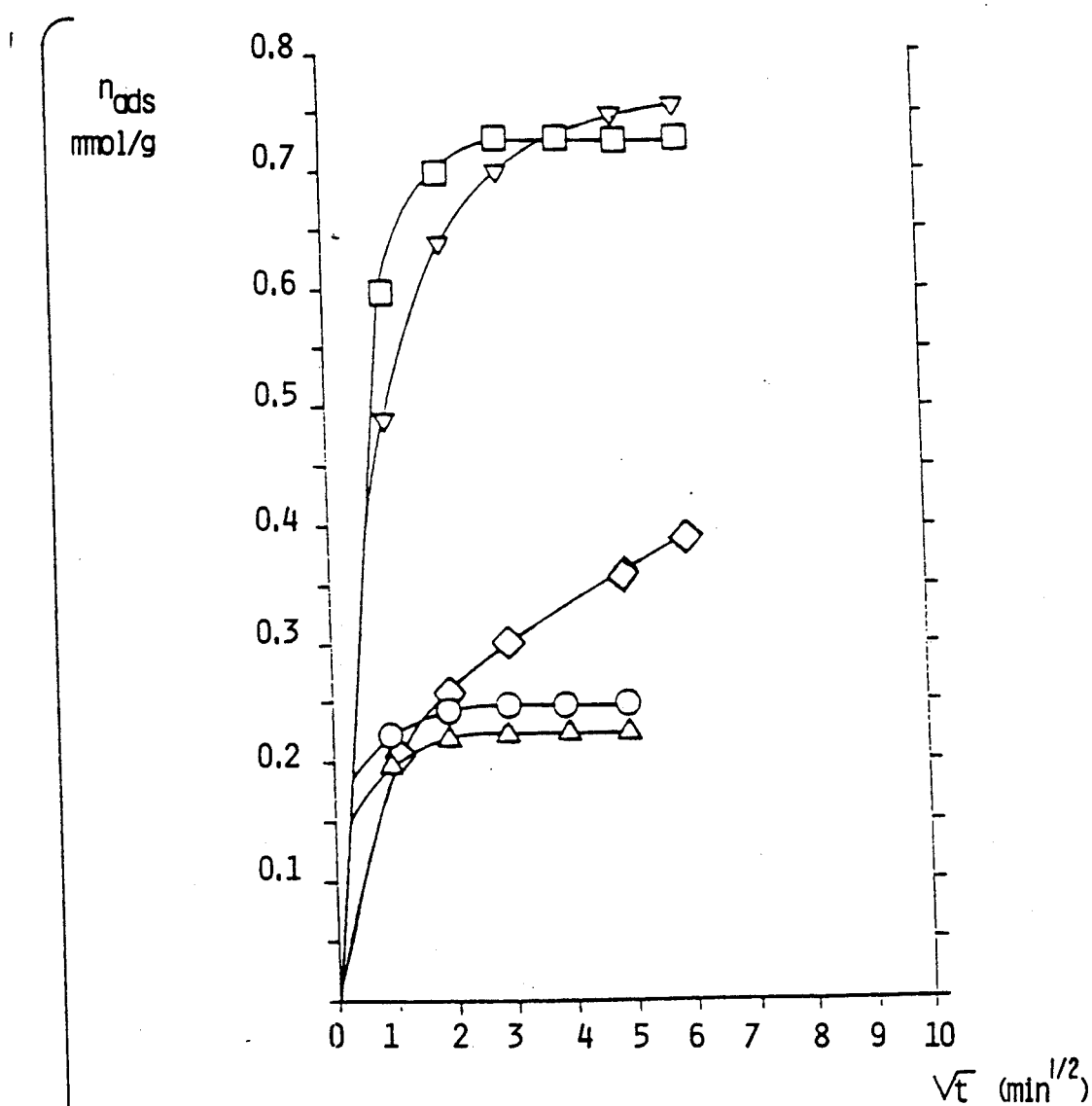

2 g of the parent sample, CaM CM782 (SCGP, extrudates) were dehydrated in vacuum overnight at 450° C. FIG. 19 shows the observed sorption characteristics for Xe, Kr, Ar, $N_2$ and $O_2$ at 0° C. Nitrogen, oxygen and argon reach an equilibrium situation after 16 min while Kr and Xe are still adsorbing.

EXAMPLE 19

3.1 g of the parent sample of Example 18 (fraction <150/μm) were mixed with 0.3 g $H_3BO_3$ (10% weight) and stirred with 3 ml $H_2O$ at room temperature. Afterwards the sample was thermally treated for 1 hour at 100° C. and for 3 hours at 400° C., both in air.

Figure 20:
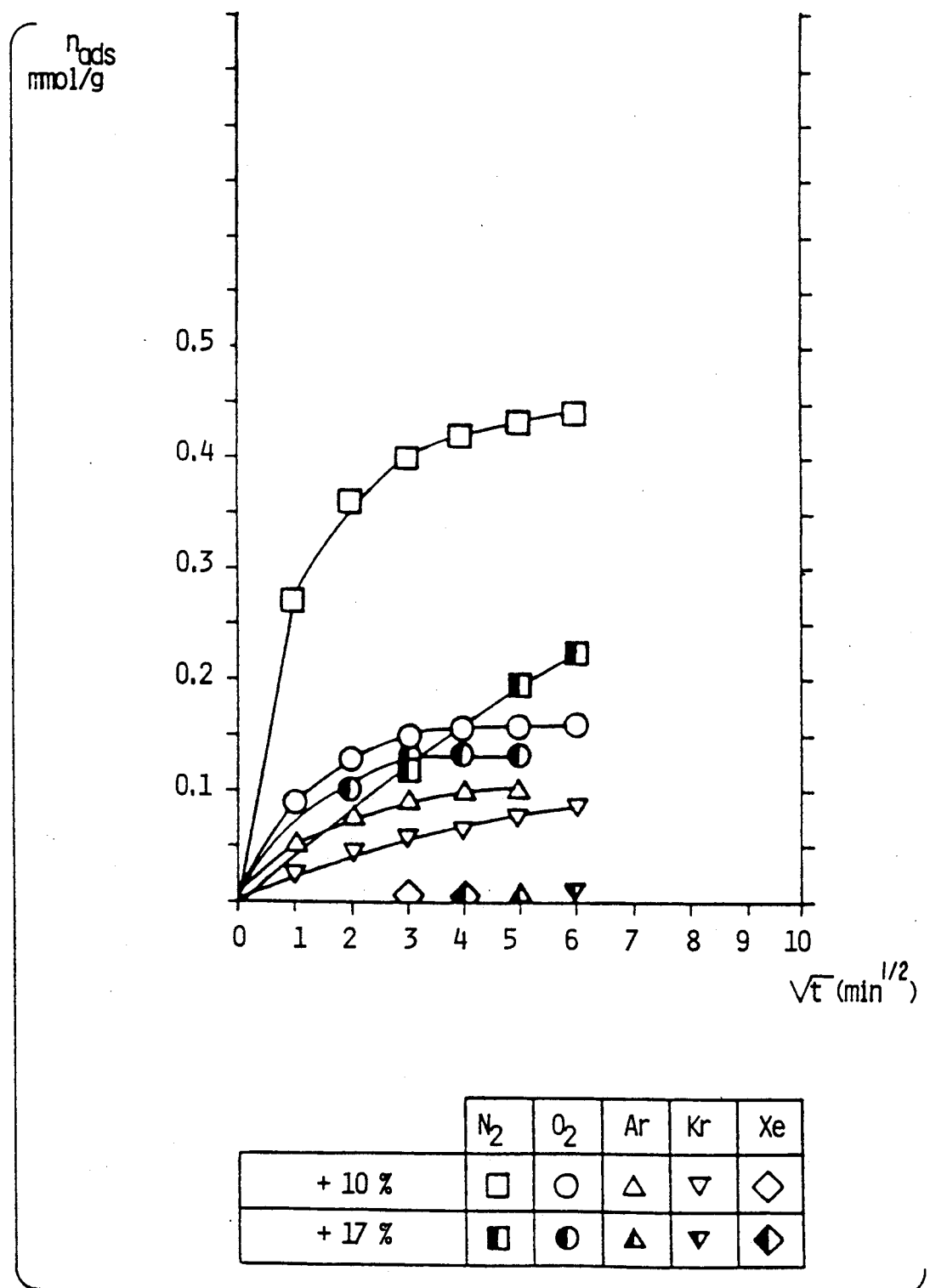

2 g of this treated sample were dehydrated overnight at 427° C. in vacuum. FIG. 20 shows a capacity decrease for all gases and an exclusion for Xe. The sample has a lower accessibility for the other adsorbing gases, especially for Kr which is strongly diffusion-controlled.

EXAMPLE 20

3 g of the parent sample of Example 18 (fraction <150/μm) were mixed with 0.5 g $H_3BO_3$ (17% weight) and stirred with 3 ml $H_2O$ at room temperature. Afterwards the sample was thermally treated for 1 hour at 100° C. and for 3 hours at 400° C., both in air.

2 g of the sample were dehydrated in vacuum at 446° C. overnight to investigate the obtained sorption behaviour. At this modification degree no adsorption of Xe, Kr and Ar at 0° C. was observed. The oxygen adsorption is almost identical as on the 10% weight sample of Example 19. Increasing the amount of boric acid for the modification results in a diffusion-controlled adsorption of nitrogen (FIG. 20).

EXAMPLE 21

3 g of the parent sample of Example 18 (fraction <150/μm) were mixed with 0.6 g $H_3BO_3$ (20% weight) and stirred with 3 ml $H_2O$ at room temperature. Afterwards the sample was thermally treated for 1 hour at 100° C. and for 3 hours at 400° C., both in air.

Figure 21:
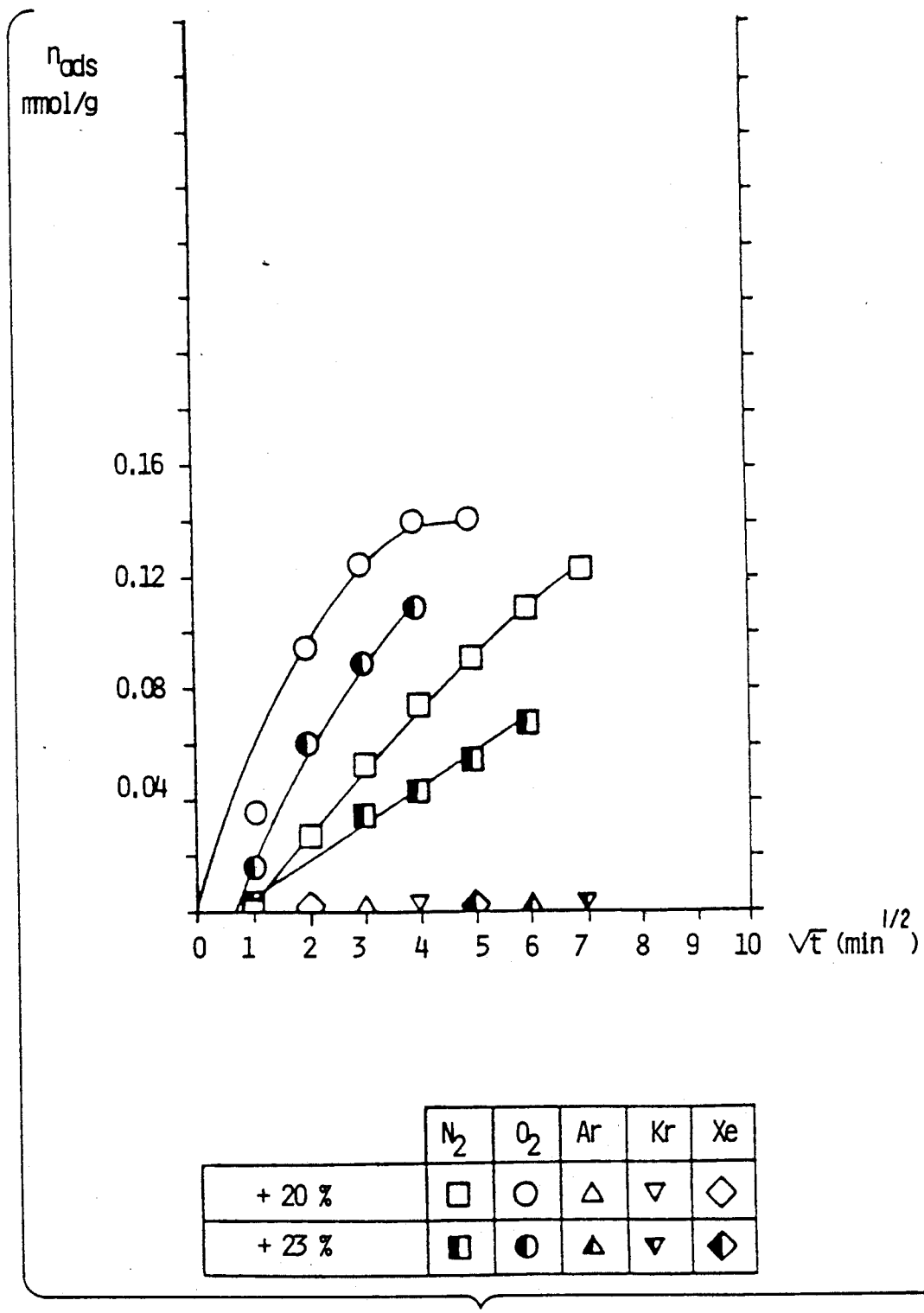

2 g of the sample were dehydrated overnight in vacuum at 436° C. in order to investigate the obtained sorption behaviour. The gases Xe, Kr and Ar are excluded and the adsorption of oxygen remains the same compared with the sample of Example 20. Nitrogen is also adsorbed but even more diffusion-controlled compared with the 17% $H_3BO_3$ sample (FIG. 21).

EXAMPLE 22

3 g of the parent sample of Example 18 (fraction <150/μm) were mixed with 0.69 g $H_3BO_3$ (23% weight) and stirred with 3 ml $H_2O$ at room temperature. Afterwards the sample was thermally treated for 1 hour at 100° C. and for 3 hours at 400° C., both in air.

2 g of the sample were dehydrated in vacuum at 454° C. overnight to investigate the obtained sorption characteristics. One observes no adsorption of Xe, Kr and Ar and also strong diffusion-controlled kinetic runs of $N_2$ and $O_2$. The adsorption values of these two gases are lower compared to the respective values of the samples with a lower $H_3BO_3$ modification degree (FIG. 21).

Figure 22:
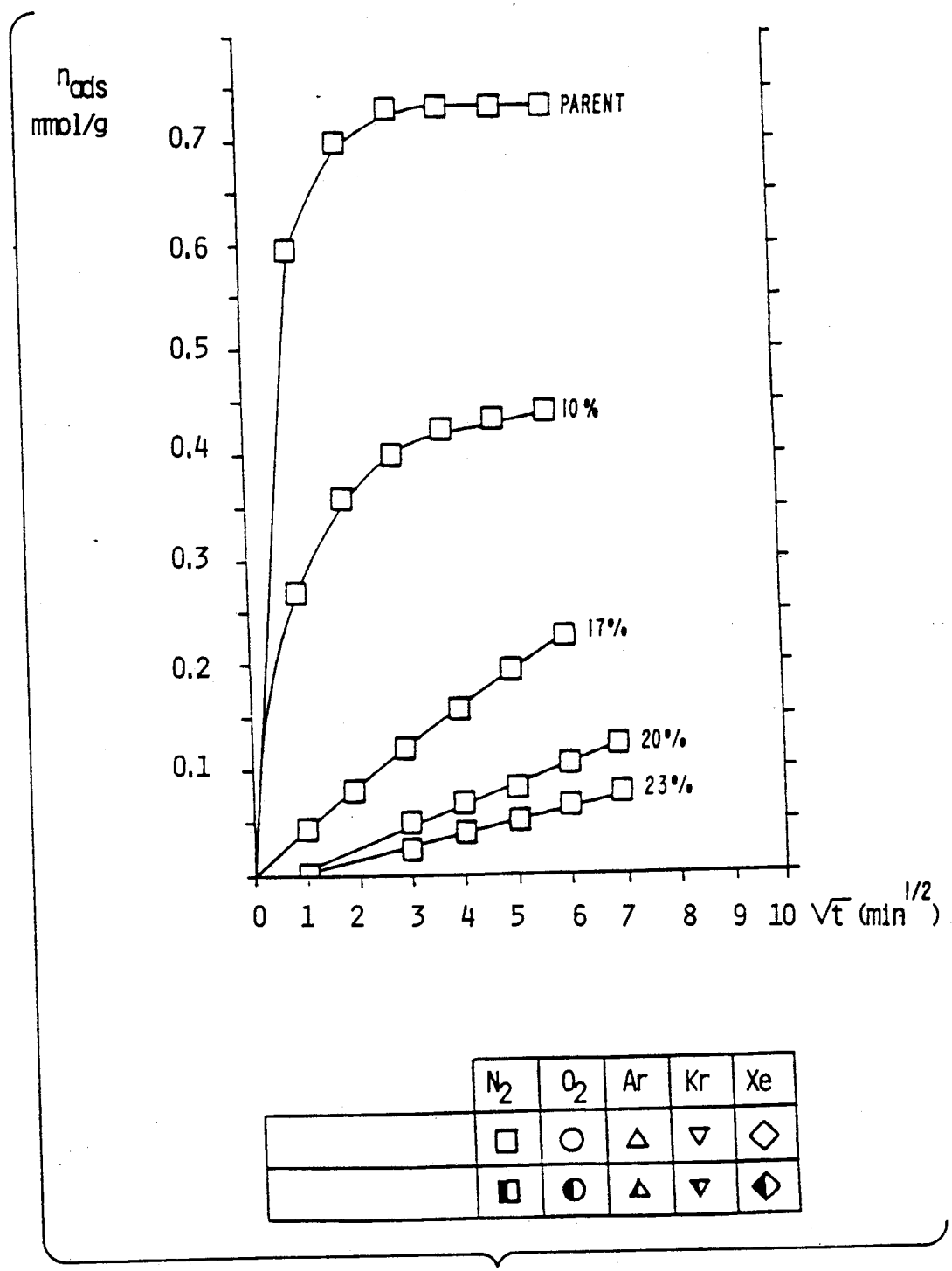

FIG. 22 shows the kinetic runs of nitrogen at 0° C. of the samples concerning the concentration parameter. The degree of modification, or the weight percent $H_3BO_3$ influences the adsorption capacity but especially the accessibility of the treated samples with increasing content.

EXAMPLE 23

Figure 23:
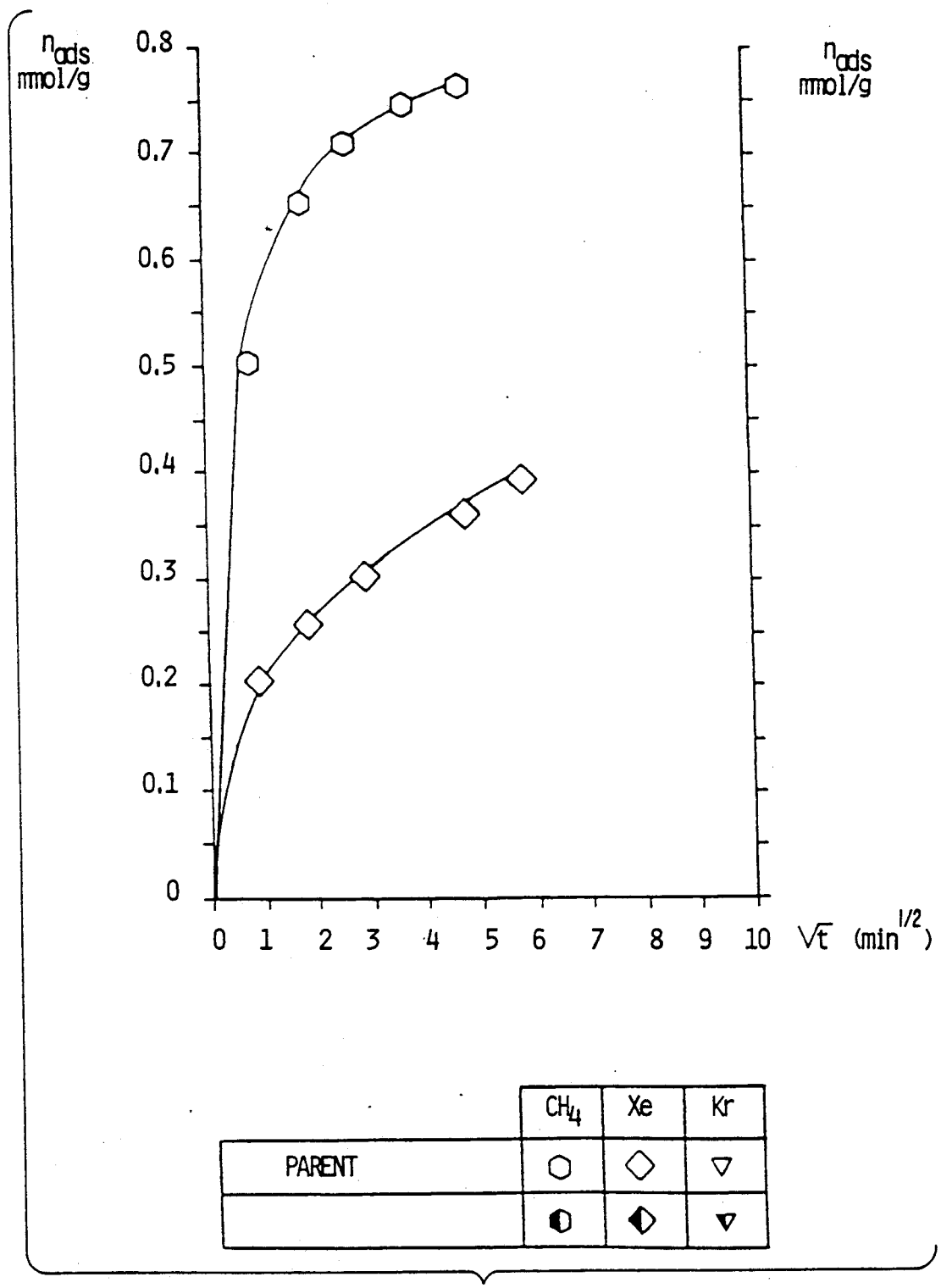

2 g of the parent sample CaM CM782 (SCGP, extrudates), were dehydrated in vacuum overnight at 450° C. FIG. 23 shows the observed sorption characteristics for Xe and $CH_4$ at 0° C., both gases are still adsorbing after 25 min.

3 g of the parent sample (fraction <150/μm) were mixed with 0.075 g $H_3BO_3$ (2.5% weight) and stirred with 3 ml of $H_2O$ at room temperature. Then the sample was evaporated for 1 hour at 100° C. in air and thermally treated for 2 hours at 400° C. also in air.

Figure 24:
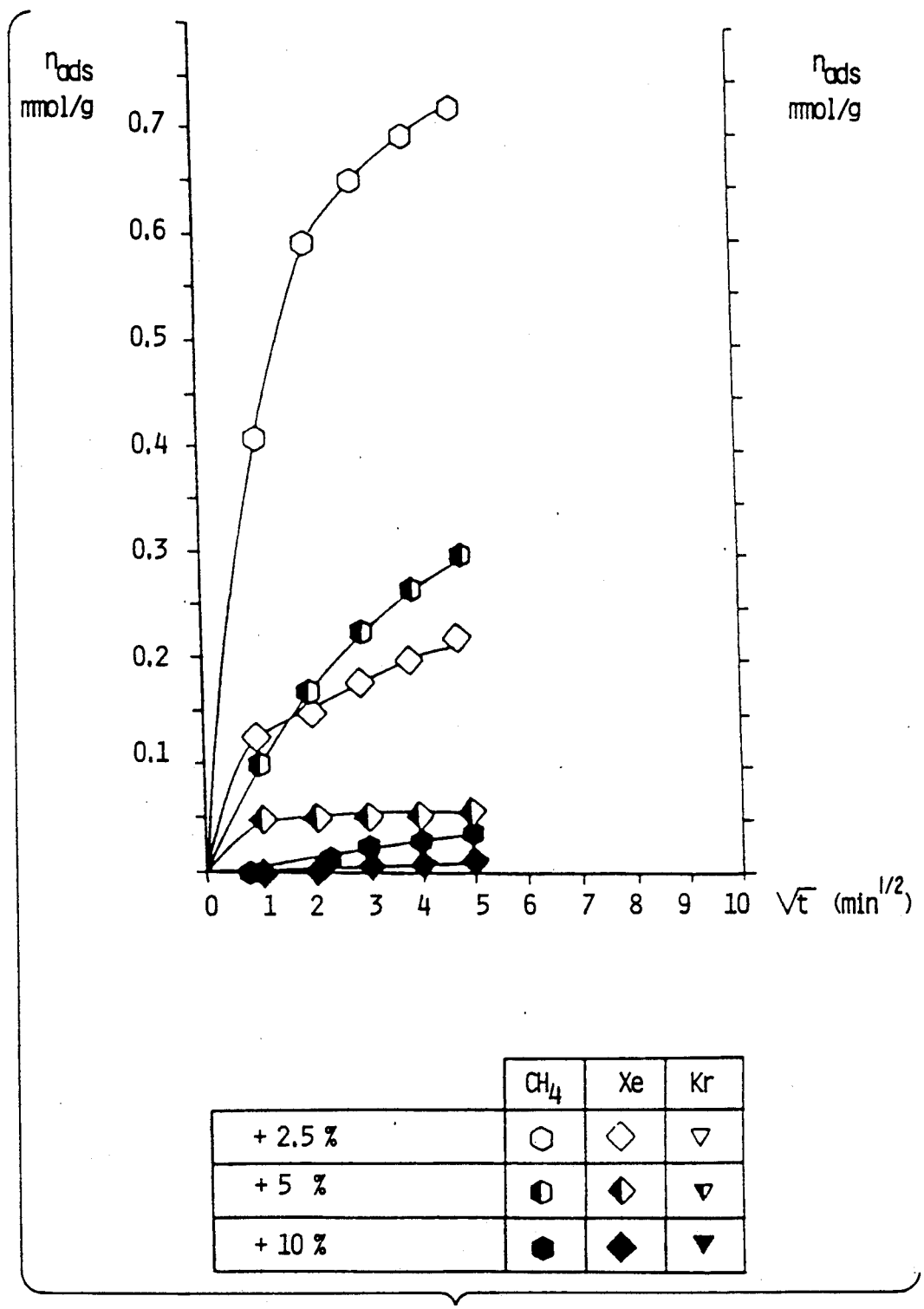

2 g of this modified sample were dehydrated overnight at 457° C. in vacuum. FIG. 24 shows a decrease in the adsorption of Xe and $CH_4$ at 0° C. after modification.

EXAMPLE 24

3 g of the parent sample (cf. Example.23) (fraction <150μm) were mixed with 0.15 g $H_3BO_3$ (5% weight) and stirred with 3 ml of $H_2O$ at room temperature. Afterwards the sample was thermally treated for 1 hour at 100° C. for 2 hours at 400° C. both in air. 2 g of this treated sample were dehydrated overnight at 454° C. in vacuum.

At this modification degree one observes for both gases, Xe and $CH_4$ a larger capacity decrease compared to that in Example 23.

EXAMPLE 25

3 g of the parent sample (cf. Example 23) (fraction <150/μm) were mixed with 0.3 g $H_3BO_3$ (10% weight) and stirred with 3 ml of $H_2O$ at room temperature. Afterwards, the sample was thermally treated for 1 hour at 100° C. and for 2 hours at 400° C., both in air. 2 g of this treated sample were dehydrated at 455° C. overnight, to investigate the kinetic runs of Xe and $CH_4$ at 0° C. (FIG. 24).

With this modification Xe is excluded at 0° C. and CH$_4$ shows at this adsorption temperature not only an enormous capacity decrease but the adsorption is also strongly diffusion-controlled.

EXAMPLE 26

Figure 25:
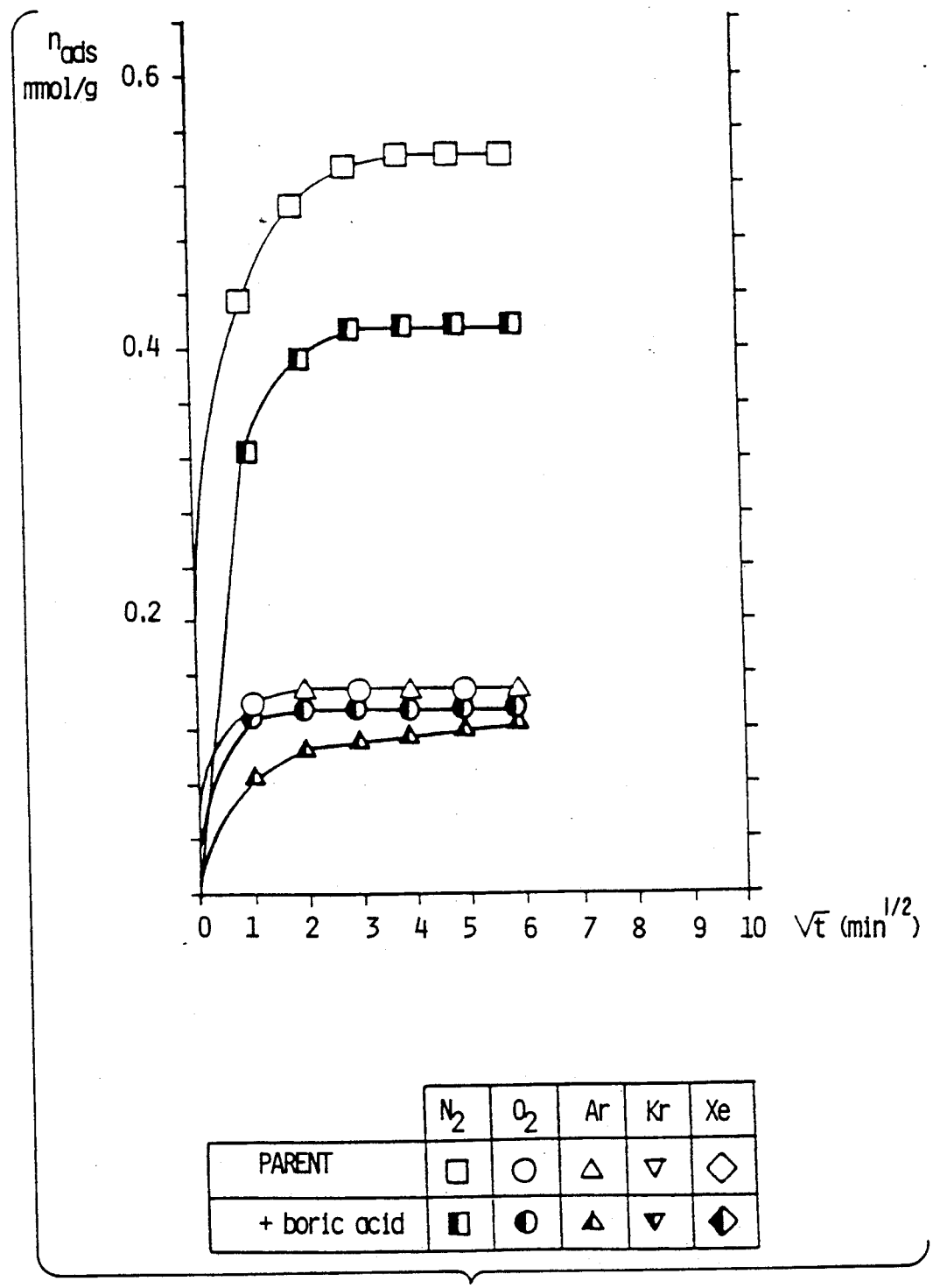

2 g of the parent sample (E127NaM 543) were dehydrated overnight at 420° C. in vacuum. The adsorption behaviour of this sample was tested for N$_2$, O$_2$ and Ar at 0° C.. All three gases reach an equilibrium situation after 25 min with the same kinetic runs for O$_2$ and Ar (FIG. 25). 5 g of the parent sample were treated for 3 hours at 80° C. in an H$_3$BO$_3$-solution (50 ml H$_2$O and 5 g H$_3$BO$_3$). After cooling to room temperature the residual solution was decanted and the sample was allowed to dry in air overnight at ambient temperature. The remaining boric acid crystals were removed from the zeolite sample by sieving. Then the substrate was heated for 3 hours at 500° C. in air. 2 g of the treated sample were dehydrated overnight at 410° C. in vacuum to study the kinetic runs of N$_2$, O$_2$ and Ar at the same experimental conditions as the E127 parent sample. One observes a capacity decrease for all gases and also a small change in the accessibility of the sample for Ar at 0° C. (FIG. 25).

EXAMPLE 27

Figure 26:
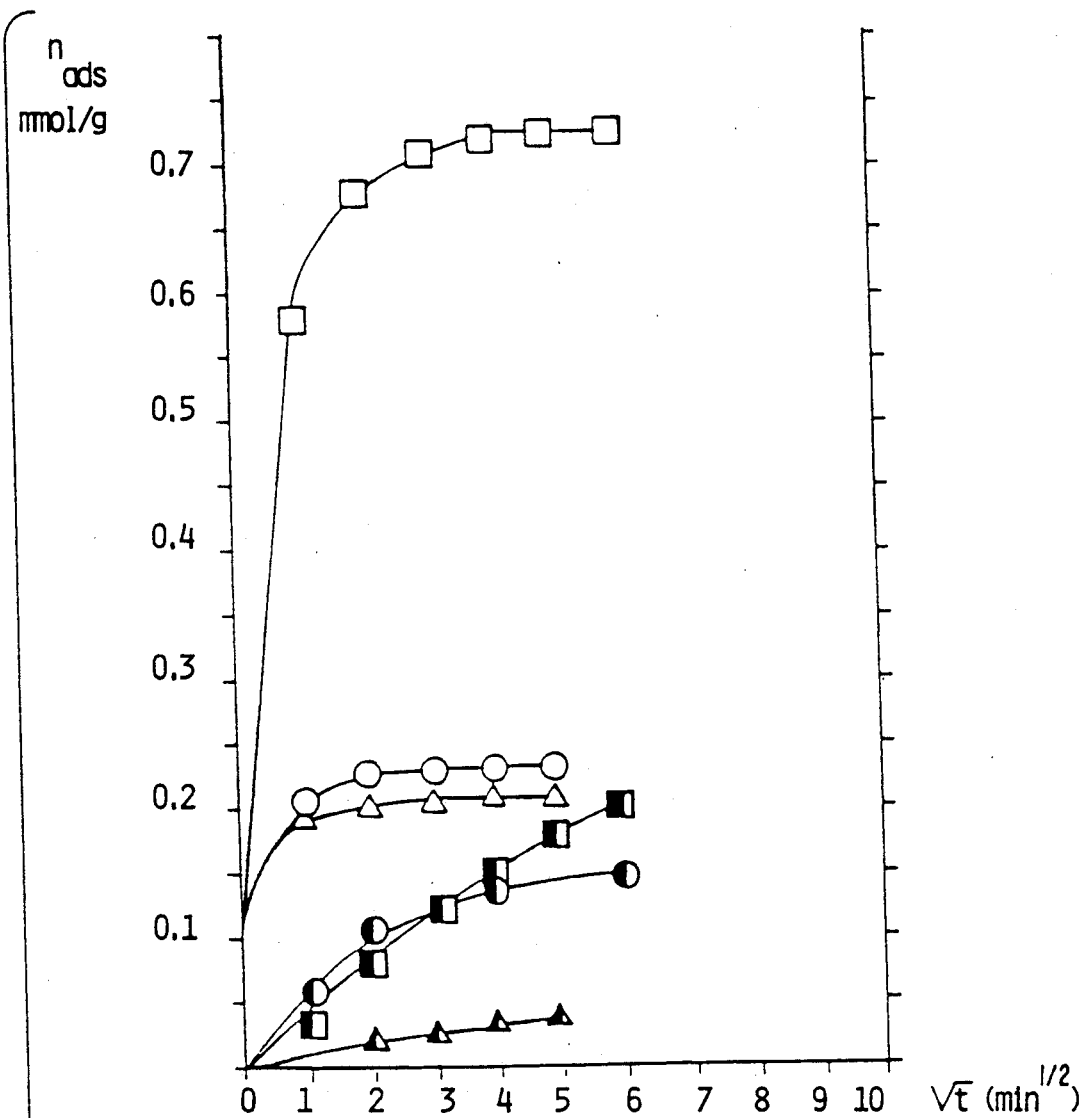

The parent sample was E127NaM 543 (SCGP; extrudates) treated with a CaCl$_2$ solution. The Na$^+$-ions were exchanged for Ca$^{2+}$-ions using 110 g of CaCl$_2$ and 50 g E127 sample in 0.5 l of H$_2$O overnight at room temperature. 2 g of this exchanged sample were dehydrated at 440° C. in vacuum overnight. The adsorption behaviour was tested for N$_2$, O$_2$ and Ar at 0° C. FIG. 26 shows the kinetic runs of these test gases. All the gases reach an equilibrium situation within 25 min. 5 g of the Ca-exchanged parent sample (fraction <150/μm) were treated with 25 ml of 4% boric acid (H$_3$BO$_3$) solution. The system was heated at 80° C. to evaporate the solution. Afterwards the dry substrate remained in an oven at 500° C. for 2 hours in air. 2 g of this modified sample were dehydrated overnight in vacuum at 458° C. to study the influence of the boric acid solution treatment on the adsorption characteristics. FIG. 26 illustrates the adsorption of the gases on the modified sample. The capacities of all the gases decrease and the accessibility of the sample changes introducing diffusion-controlled adsorption especially for N$_2$.

EXAMPLE 28

Figure 27:
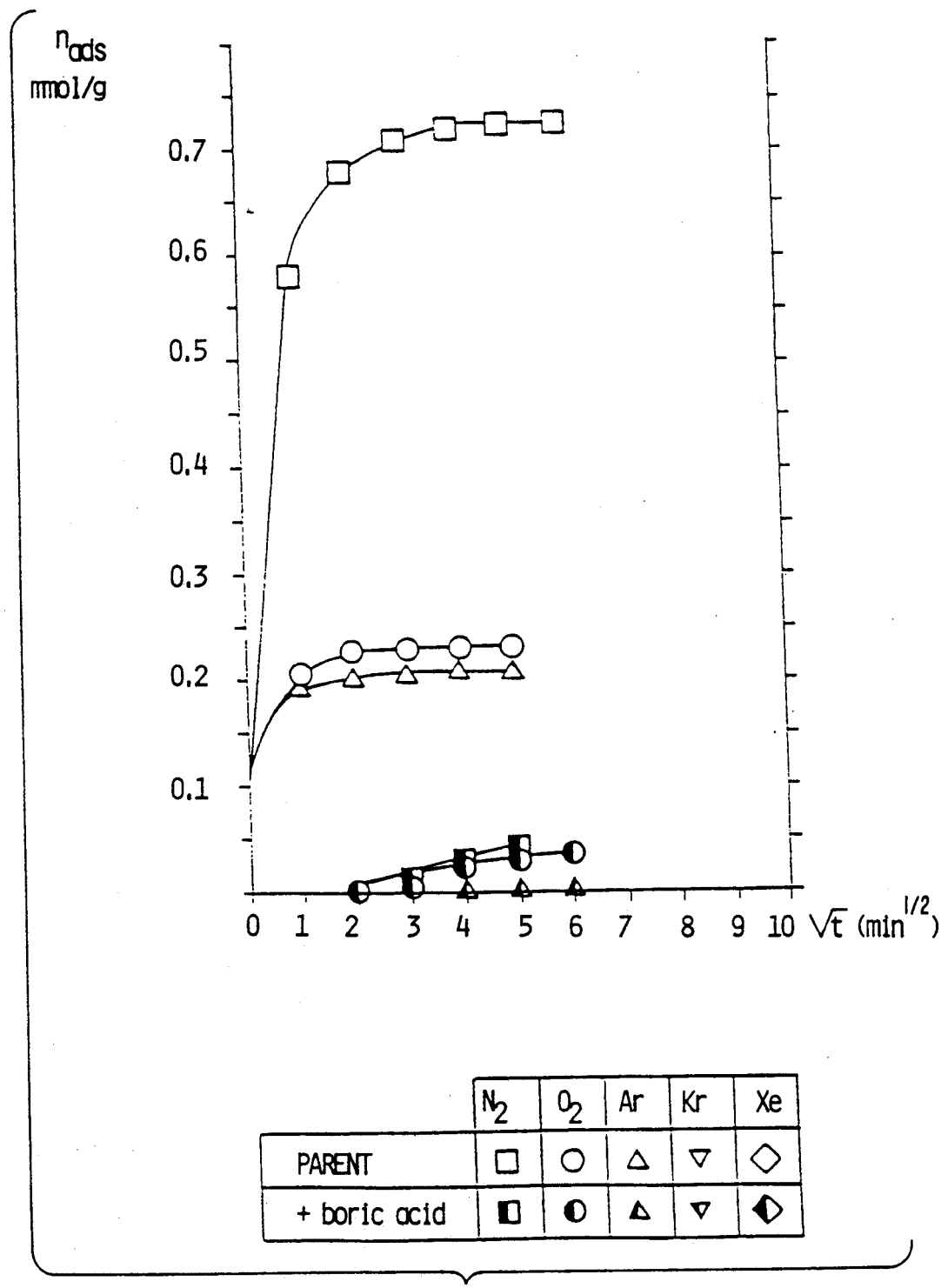

The parent sample was E127NaM 543 (SCGP; extrudates) treated with a CaCl$_2$ solution. The Na$^+$-ions were exchanged for Ca$^{2+}$-ions using 110 g CaCl$_2$ and 50 g E127 sample L in 0.5 l of H$_2$O overnight at room temperature. 2 g of this exchanged sample were dehydrated 440° C. in vacuum overnight. The adsorption behaviour was tested for N$_2$, O$_2$ and Ar at 0° C.. FIG. 27 shows the kinetic runs of these test gases. For all the gases, an equilibrium situation is reached within 25 min. 2 g of the Ca-exchanged parent sample (fraction <150/μm) were mixed with 0.4 g dry H$_3$BO$_3$-powder. Then 2 ml of H$_2$O was added and the obtained slurry was mixed again. The sample was first dried during 1 hour at 80° C. in air and afterwards treated at 500° C. for 2 hours in air. After dehydration (overnight, 440° C., vacuum) of the modified sample, the adsorption characteristics were investigated (FIG. 27). The Ar-molecule is excluded at 0° C. while N$_2$ and O$_2$ have a very strong diffusion-controlled adsorption with low sorption values. An equilibrium situation was not reached after 30 min.

EXAMPLE 29

Figure 28:
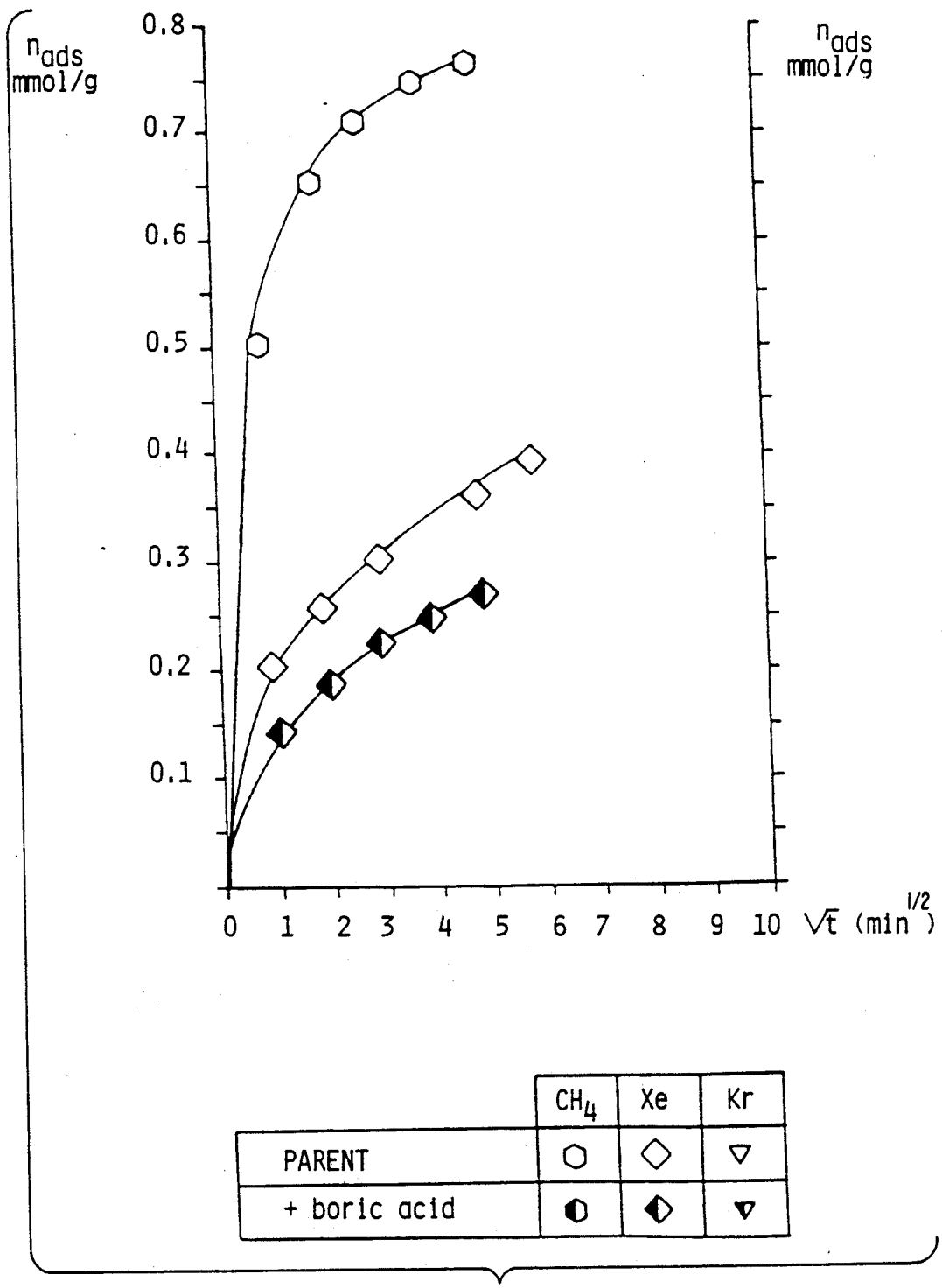

The parent sample used in this experiment was CaM CM782 (SCGP; extrudates). 2 g of the sample were dehydrated overnight at 450° C. in vacuum in order to investigate its adsorption behaviour. FIG. 28 shows the sorption kinetics of Xe and CH$_4$ at 0° C. 3 g CaM CM782 (fraction <150/μm) were treated for 1 hour and 30 min at 90° C. in a H$_3$BO$_3$-solution (0.15 g H3B03 in 40 ml H$_2$O). After cooling to room temperature the residual solution was decanted and the sample was dried at 60° C. in air. The dried material was thermally treated for 2 hours at 400° C. in air. 2 g of this modified substrate were dehydrated at 449° C. overnight in vacuum. The kinetic runs of Xe and CH$_4$ at 0° C. were investigated on the modified sample (FIG. 28). One observes only a small capacity decrease for Xe, while the sorption values of CH$_4$ remains the same as on the parent sample.

EXAMPLE 30

Figure 29:
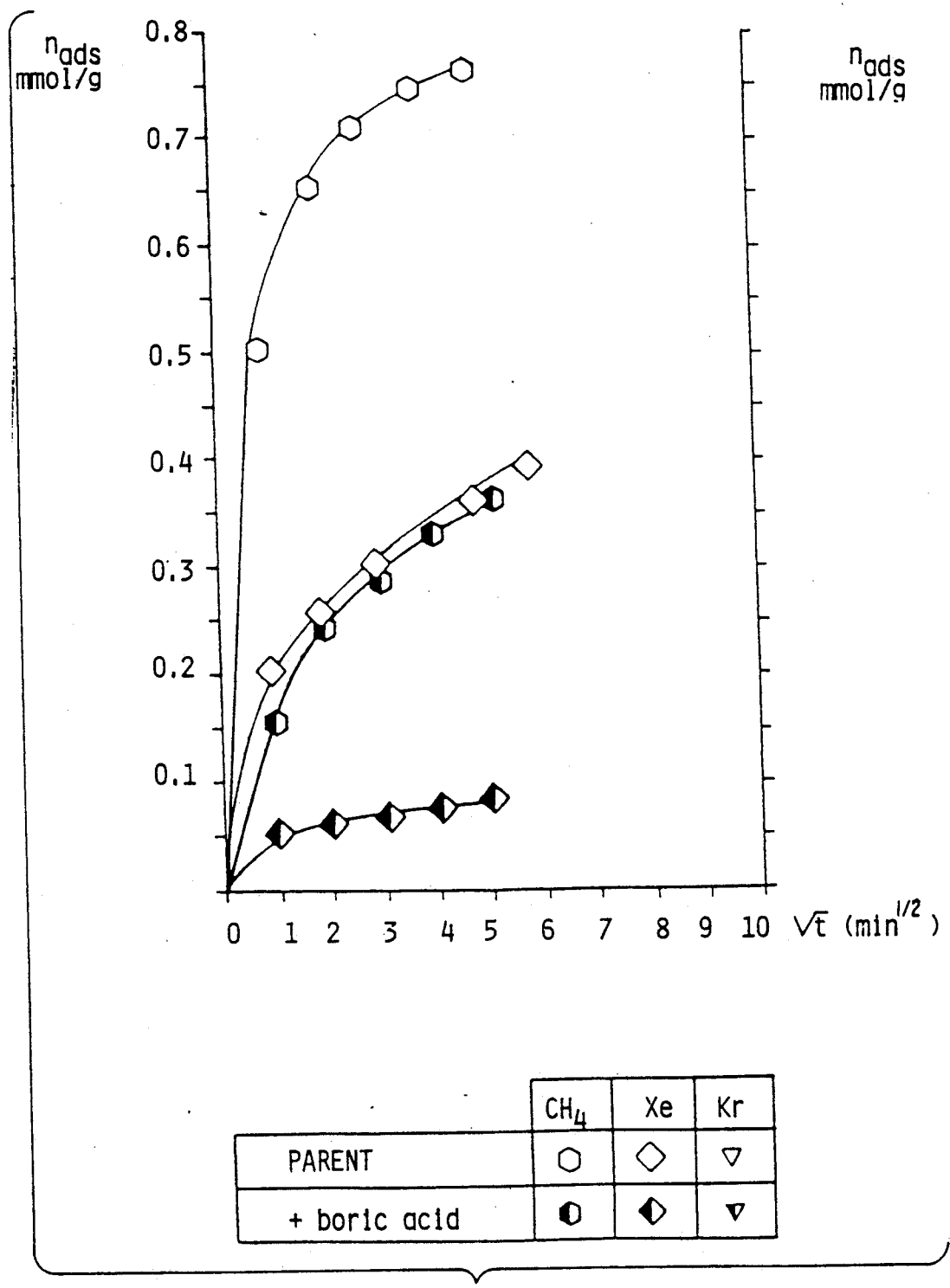

Parent sample: same as in Example 29. 3 g of the parent sample (fraction <150/μm) were treated with 20 ml of a 0.75% aqueous H$_3$BO$_3$-solution at 90° C. until complete evaporation of the solvent. The dried material was heated during 2 hours at 400° C. in air. 2 g of the modified sample were dehydrated at 445° C., overnight in vacuum to investigate the kinetic runs of Xe and CH$_4$ at 0° C. (FIG. 29). The modified sample shows a decrease in the adsorption capacity for both gases at 0° C.

EXAMPLE 31

Figure 30:
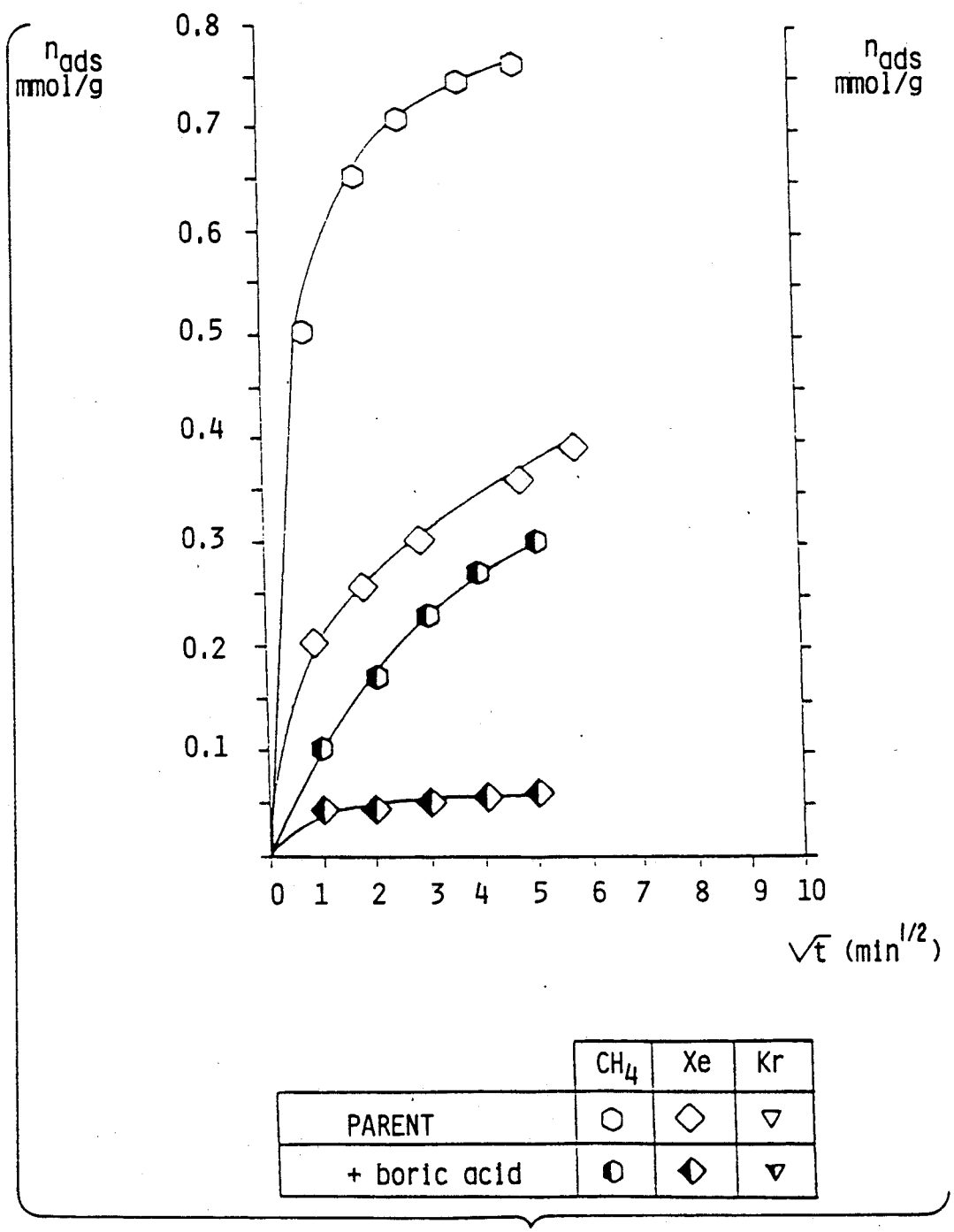

Parent sample: same as in Example 29. 3 g of the parent sample (fraction <150/μm) were mixed with 0.15 g H$_3$BO$_3$ and stirred with 3 ml of H$_2$O at room temperature. Afterwards the sample was thermally treated for 1 hour at 100° C. and for 2 hours at 400° C., both in air. 2 g of this treated sample were dehydrated overnight at 454° C. in vacuum. As shown in FIG. 30 the adsorption kinetics of Xe and CH$_4$ at 0° C. reveal a capacity decrease for both gases.

EXAMPLE 32

Figure 31:
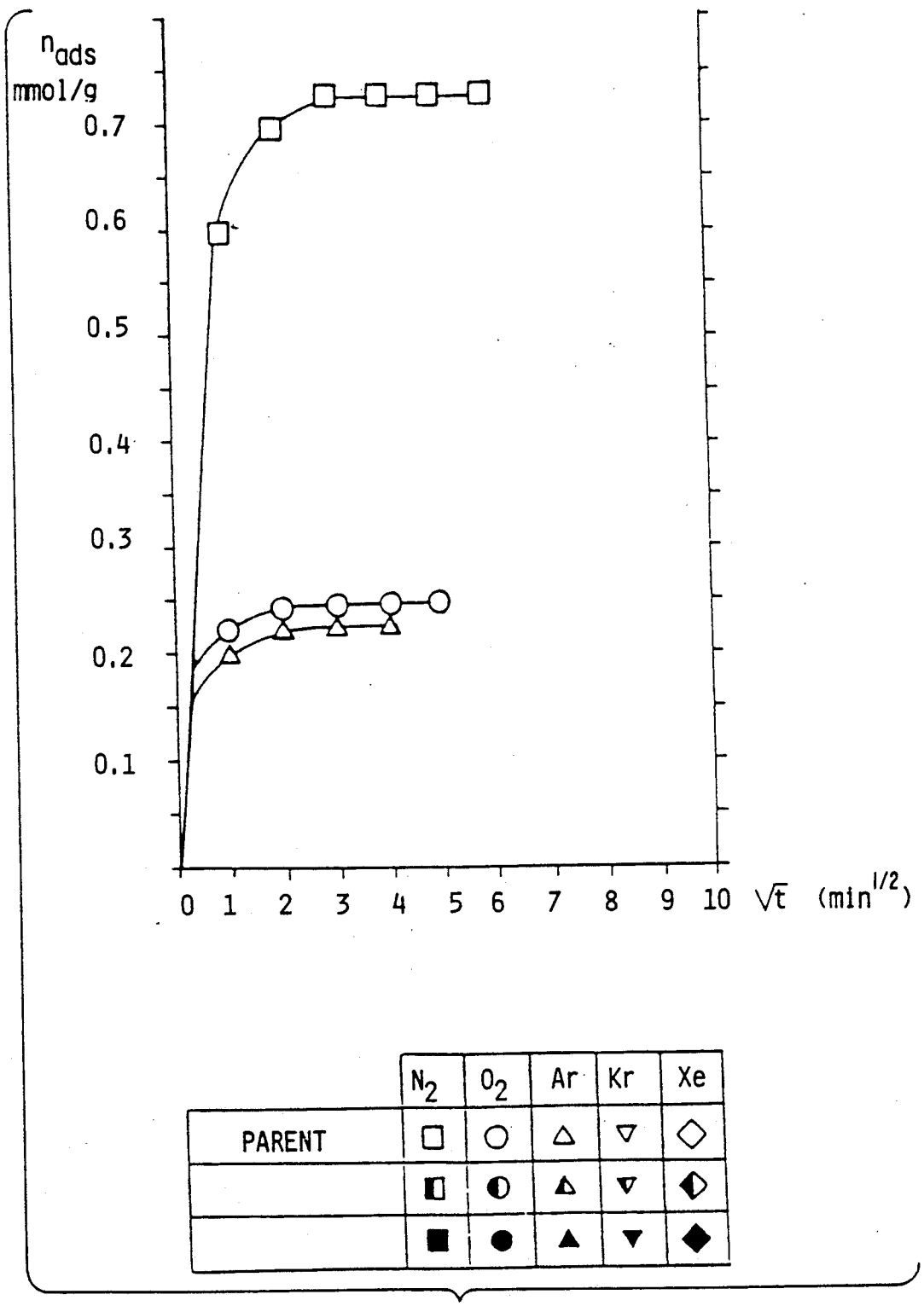

The parent sample used was a CaM CM782 (SCGP; extrudates). 2 g were dehydrated overnight at 450° C. in a vacuum in order to investigate its sorption properties (FIG. 31). Nitrogen, oxygen and argon reach an equilibrium situation after 16 min with a high capacity for N$_2$ at 0° C.

EXAMPLE 33

Figure 32:
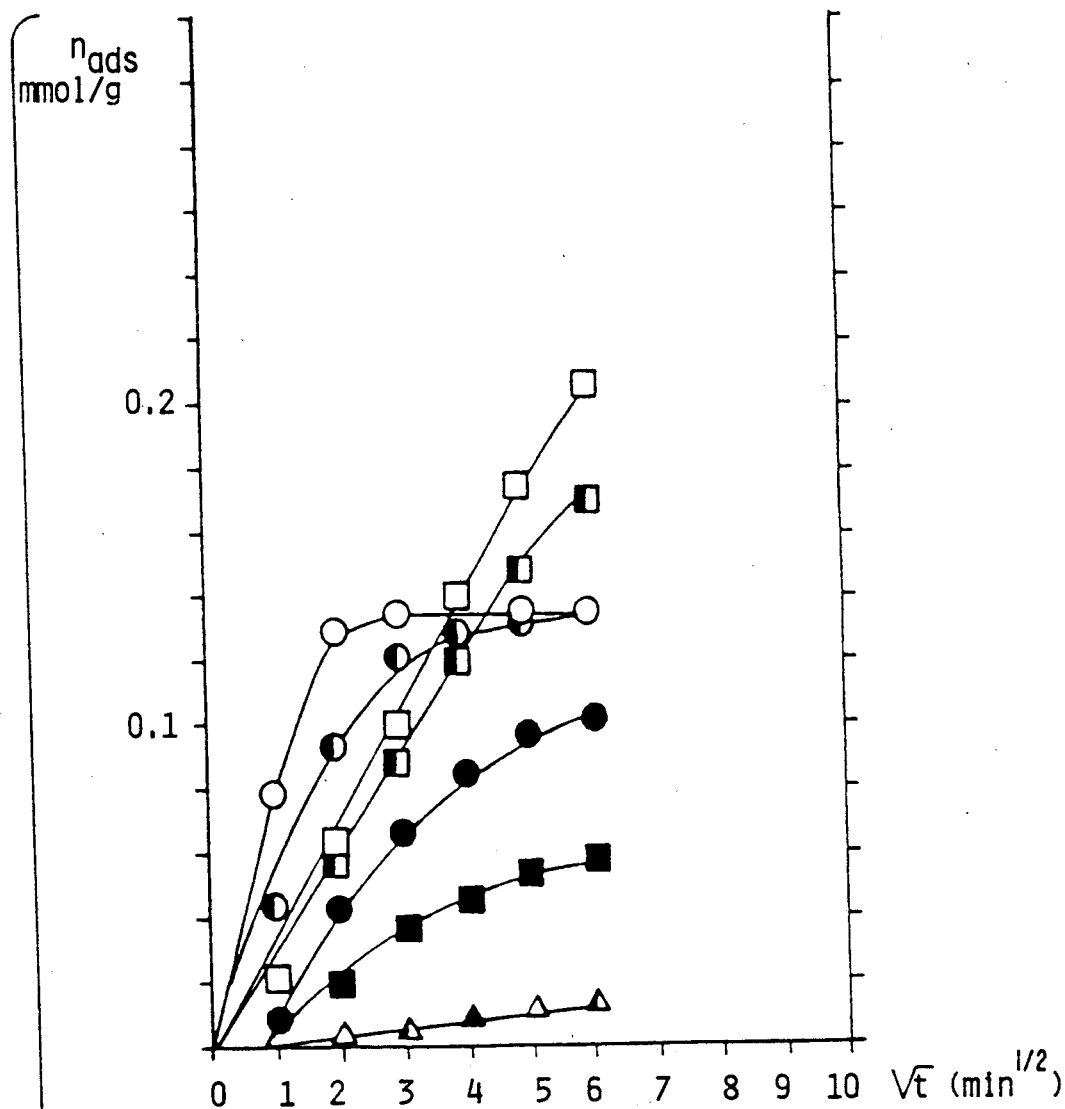

20 g of the parent sample (fraction <150/μm) were mixed with 4 g H$_3$BO$_3$ (20% weight) and stirred with 20 ml H$_2$O at room temperature. The slurry remained one night at ambient temperature without stirring. Afterwards the sample was thermally treated for 1 hour at 100° C. in air and ground again. Then 2 g were heated for 2 hours 45 min at 300° C. in air. These 2 g were dehydrated overnight at 428° C. in vacuum. FIG. 32 shows only a capacity decrease for O$_2$ and almost no adsorption for Ar, while nitrogen is adsorbed by a diffusion-controlled process caused by the boron-oxygen compounds, formed at 300° C. The N$_2$-sorption value is 0.2 mmol/g after 36 min.

EXAMPLE 34

20 g of the parent sample (Example 33) (fraction <150/μm) were mixed with 4 g $H_3BO_3$ (20% weight) and stirred with 20 ml $H_2O$ at room temperature. The slurry remained one night at ambient temperature without stirring. Afterwards the sample was thermally treated for 1 hour at 100° C. in air and ground again. Then 2 g of this batch were heated for 2 hours 45 min. at 400° C. in air and later dehydrated overnight at 446° C. in vacuum with this thermal pretreatment (400° C.) the sample has a smaller accessibility for $N_2$ and $O_2$ compared to the sample of 300° C. The sorption value of $N_2$ after 36 min is 0.175 mmol/g. The Ar-adsorption is still very low (FIG. 32).

EXAMPLE 35

20 g of the parent sample (Example 32) (fraction <150/μm) were mixed with 4 g $H_3BO_3$ (20% weight) and stirred with 20 ml $H_2O$ at room temperature. The slurry remained one night at ambient temperature without stirring. Afterwards the sample was thermally treated for 1 hour at 100° C. in air and ground again. Then 2 g of this sample were heated for 2 hours and 45 min at 500° C. in air and later dehydrated overnight at 442° C. in vacuum. The boron-oxygen compounds, formed using this thermal pretreatment, block the pores and induce a diffusion-controlled adsorption for the three test gases $N_2$, $O_2$ and Ar at 0° C. The sorption values of $O_2$ are higher than the ones of $N_2$ during the sorption experiment. The sorption value for $N_2$ is 0.06 mmol/g after 36 min. The Ar-molecule enters the zeolite pores very slowly with low sorption values (FIG. 32).

EXAMPLE 36

Figure 33:
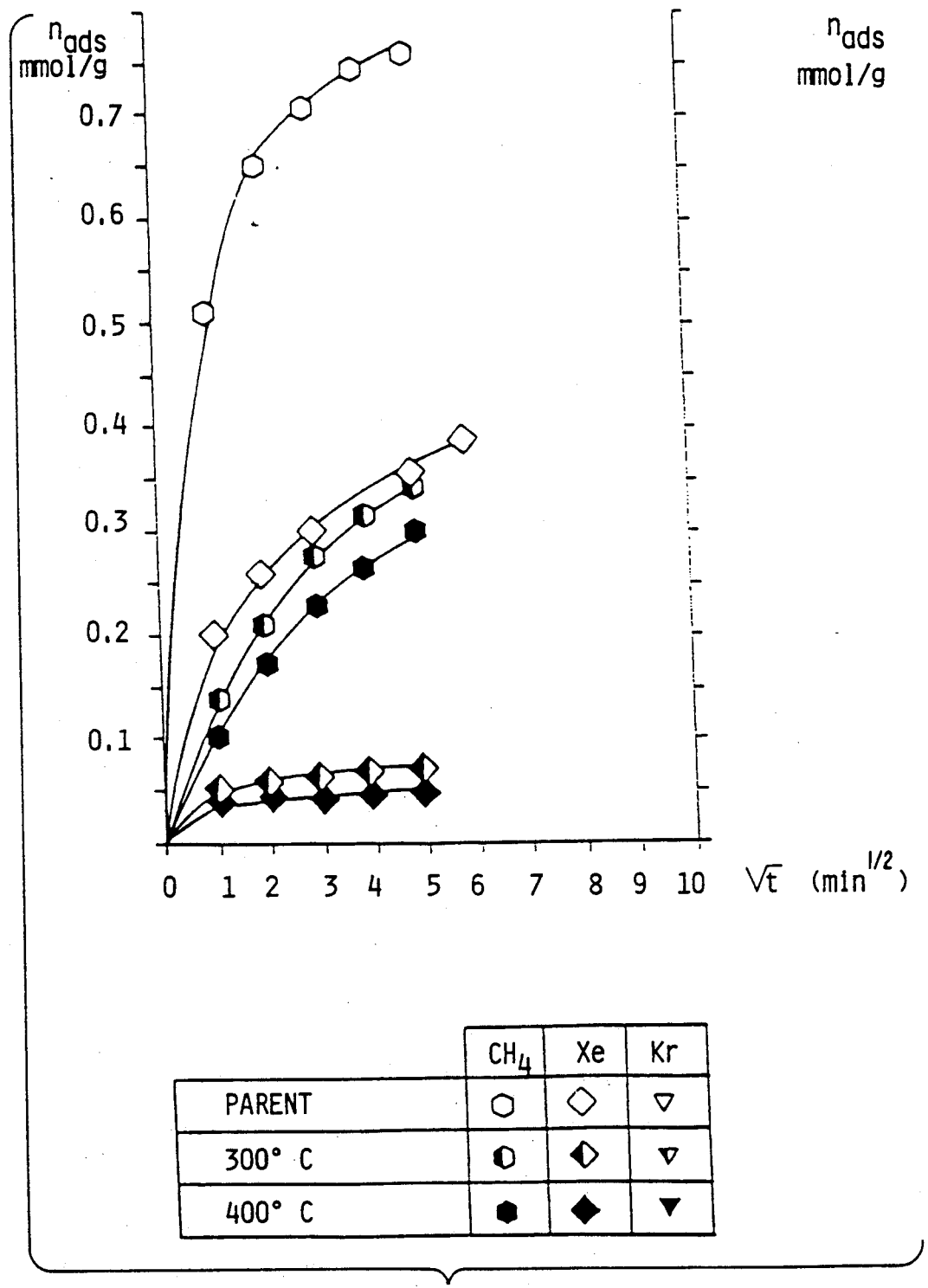

2 g of the parent sample CaM CM782 (SCGP; extrudates) were dehydrated overnight at 450° C. in vacuum. The kinetic runs of Xe and $CH_4$ at 0° C. were tested, both gases are still adsorbing after 25 min. The respective sorption values for Xe and $CH_4$ after 25 min are, 0.362 m-mol/g and 0.762 mmol/g (FIG. 33).

(a) 3 g of the parent sample (fraction <150/μm) were mixed with 0.15 g powdered $H_3BO_3$ and stirred with 3 ml of $H_2O$ at room temperature. Afterwards the substrate was thermally treated for 1 hour at 100° C. and for 2 hours at 300° C., both in air, 2 g of this modified sample were dehydrated overnight at 444° C. in vacuum to investigate the adsorption behaviour for Xe and $CH_4$ at 0° C. (FIG. 33). The sorption values of Xe and $CH_4$ after 25 min are respectively 0.072 mmol/g and 0.351 mmol/g.

(b) 3 g of the parent sample (fraction <150/μm) were mixed with 0.15 g $H_3BO_3$ powder and stirred with 3 ml of $H_2O$ at room temperature. Afterwards the substrate was thermally treated for 1 hour at 100° C. and for 2 hours at 400° C., both in air. 2 g of this modified sample were dehydrated overnight at 454° C. in vacuum. FIG. 33 shows a capacity decrease for Xe and $CH_4$ at 0° C. After modification the sorption value after 25 min of Xe is 0.054 mmol/g, the value of $CH_4$ is 0.303 mmol/g.

EXAMPLE 37

A CaM CM782 (SCGF; extrudates) zeolite was used to investigate the influence of the thermal treatment time. 2 g of zeolite were dehydrated overnight at 450° C. in vacuum to study its initial sorption properties (shown in FIG. 34) Nitrogen, oxygen and argon reach an equilibrium situation after 16 min with a high capacity for $N_2$ at 0° C.

EXAMPLE 38

Figure 34:
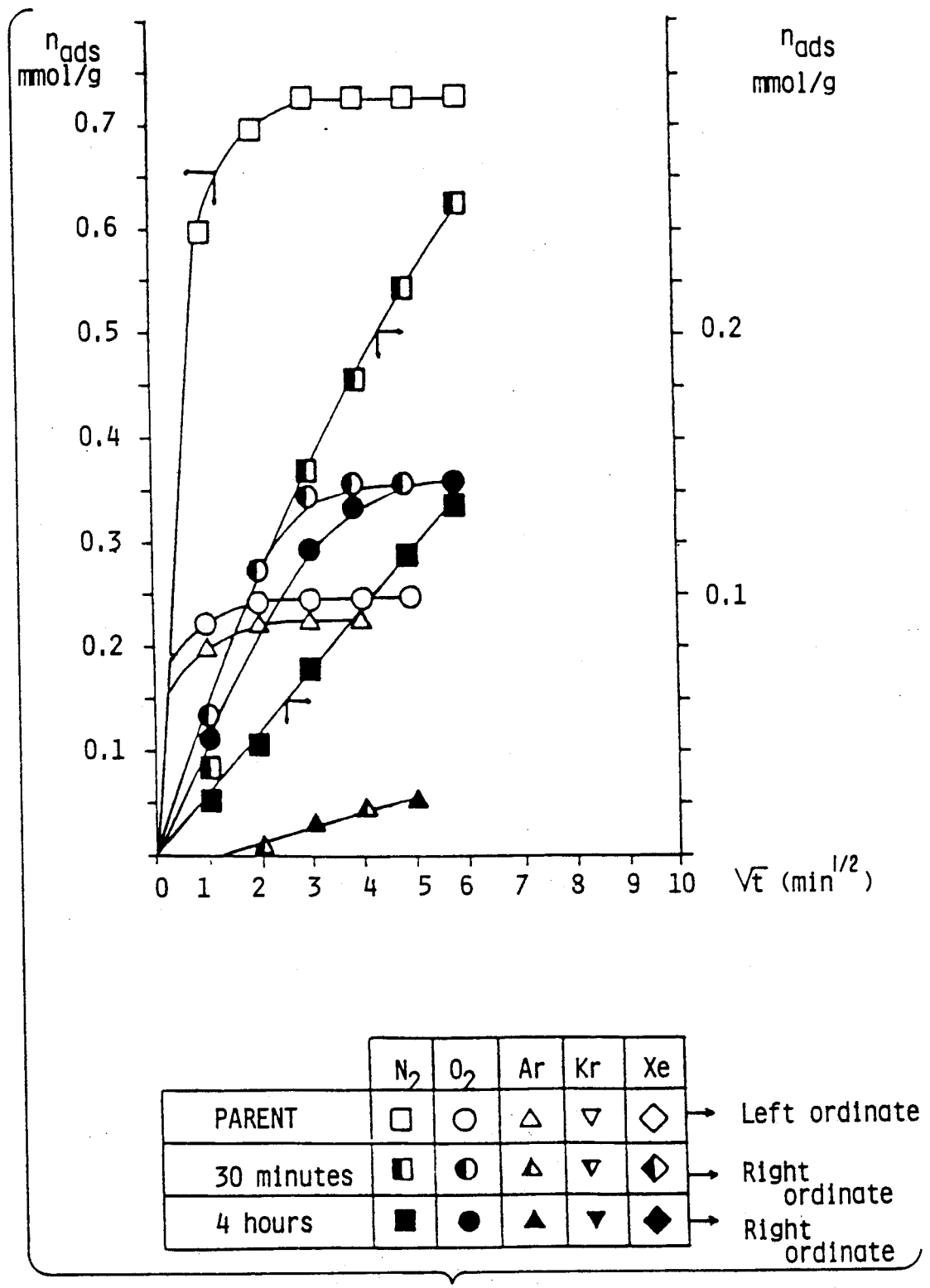

20 g of the parent sample of Example 37 (fraction <150/μm) were mxied with 4 g $H_3BO_3$ (20% weight) and stirred with 20 ml $H_2O$ at room temperature. The slurry remained one night at ambient temperature without stirring. Afterwards the sample was heated for 1 hour at 100° C. in air and ground again. Then 2 g were heated for 30 min at 400° C. in air. Afterwards the sample was dehydrated overnight at 446° C. in vacuum. FIG. 34 shows almost no adsorption for Ar and an equilibrium situation for $O_2$ after 16 min. However the sorption of $N_2$ is diffusion-controlled with a sorption value cf 0.25 mmol $N_2$/g after 36 min.

EXAMPLE 39

20 g of the parent sample of Example 37 (fraction <150/μm) were mixed with 4 g $H_3BO_3$ (20% weight) and stirred with 20 ml $H_2O$ at room temperature. The slurry remained overnight at ambient temperature without stirring. Afterwards the sample was thermally treated for 1 hour at 100° C. in air and ground again. Afterwards this batch was heated for 4 hours at 400° C. in air and later dehydrated overnight at 446° C. in vacuum. With this thermal treatment (4 hours) the sample has a smaller accessibility for $N_2$ compared to the sample of 30 min and a very strong diffusion-controlled sorption for Ar (FIG. 34). The $O_2$ adsorption is somewhat slower with an equilibrium situation after 36 min.

EXAMPLE 40

Figure 35:
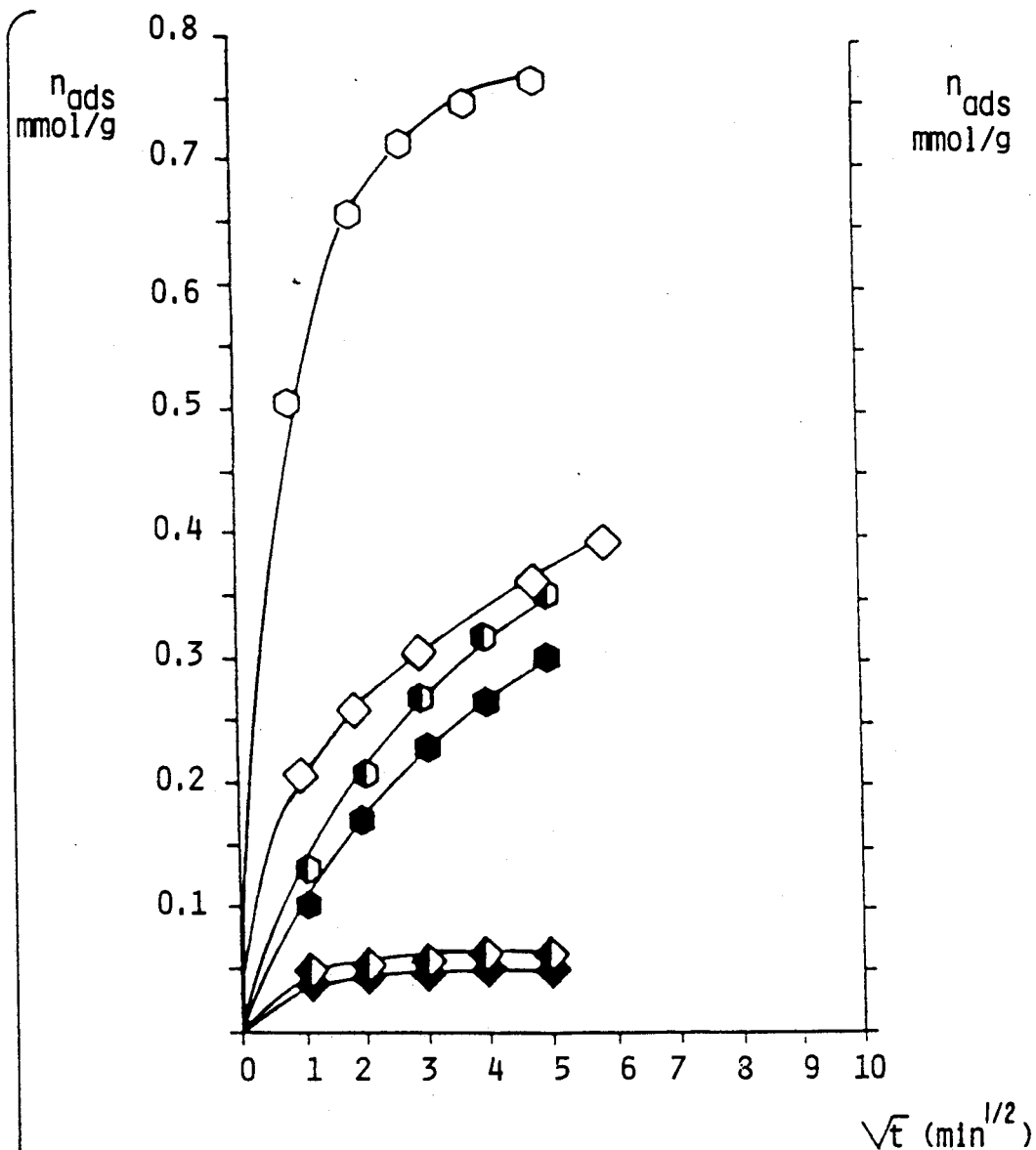

In this experiment the parent sample was CaM CM782 (SCGP, extrudates). 2 g of the parent sample were dehydrated overnight at 450° C. in vacuum to investigate its adsorption behaviour for Xe and $CH_4$ at 0° C. (FIG. 35).

(a) 3 g of the parent sample (fraction <150/μm) were mixed with 0.15 g $H_3BO_3$ and with 3 ml of water at room temperature. Afterwards the sample was thermally treated for 1 hour at 100° C. and for 30 min. at 400° C., both in air. After a dehydration (overnight, at 444° C., in vacuum) of the sample, the kinetic runs of Xe and $CH_4$ at 0° C. were investigated (FIG. 35). A decrease of sorption capacity for both gases after the modification is observed.

(b) 3 g of the parent sample (fraction <150/μm) were mixed with 0.15 g $H_3BO_3$ and stirred with 3 ml of $H_2O$ at room temperature. Then the sample was thermally treated for 1 hour at 100° C. and for 2 hours at 400° C., both in air. 2 g of this modified sample were dehydrated at 454° C. overnight in vacuum. FIG. 35 shows the adsorption kinetics of Xe and $CH_4$ at 0° C. after the modification. Comparing to part a) the sorption values of Xe and $CH_4$ are a little lower on this modified sample, due to the longer thermal treatment time.

EXAMPLE 41

Figure 36:
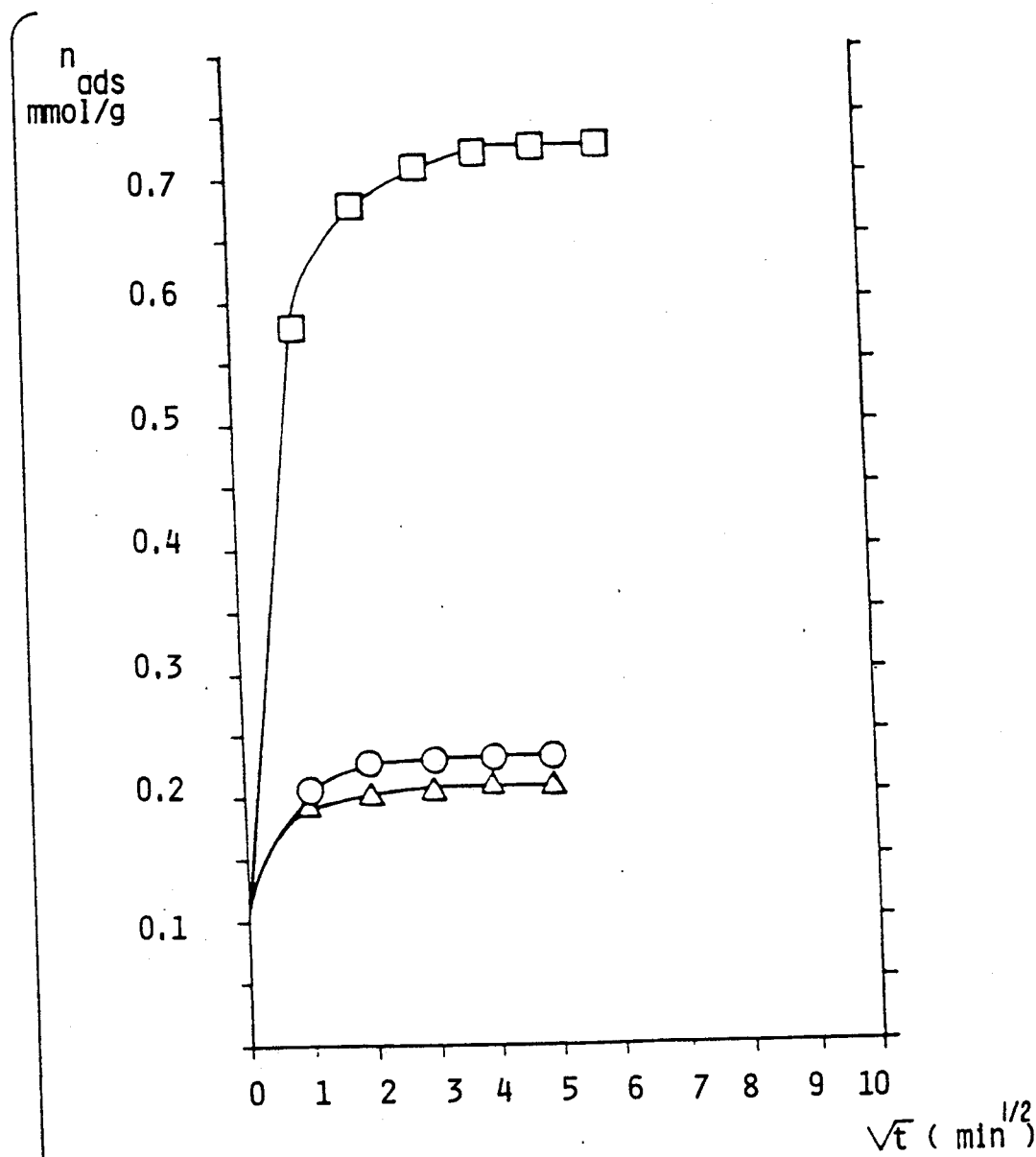
Figure 37:
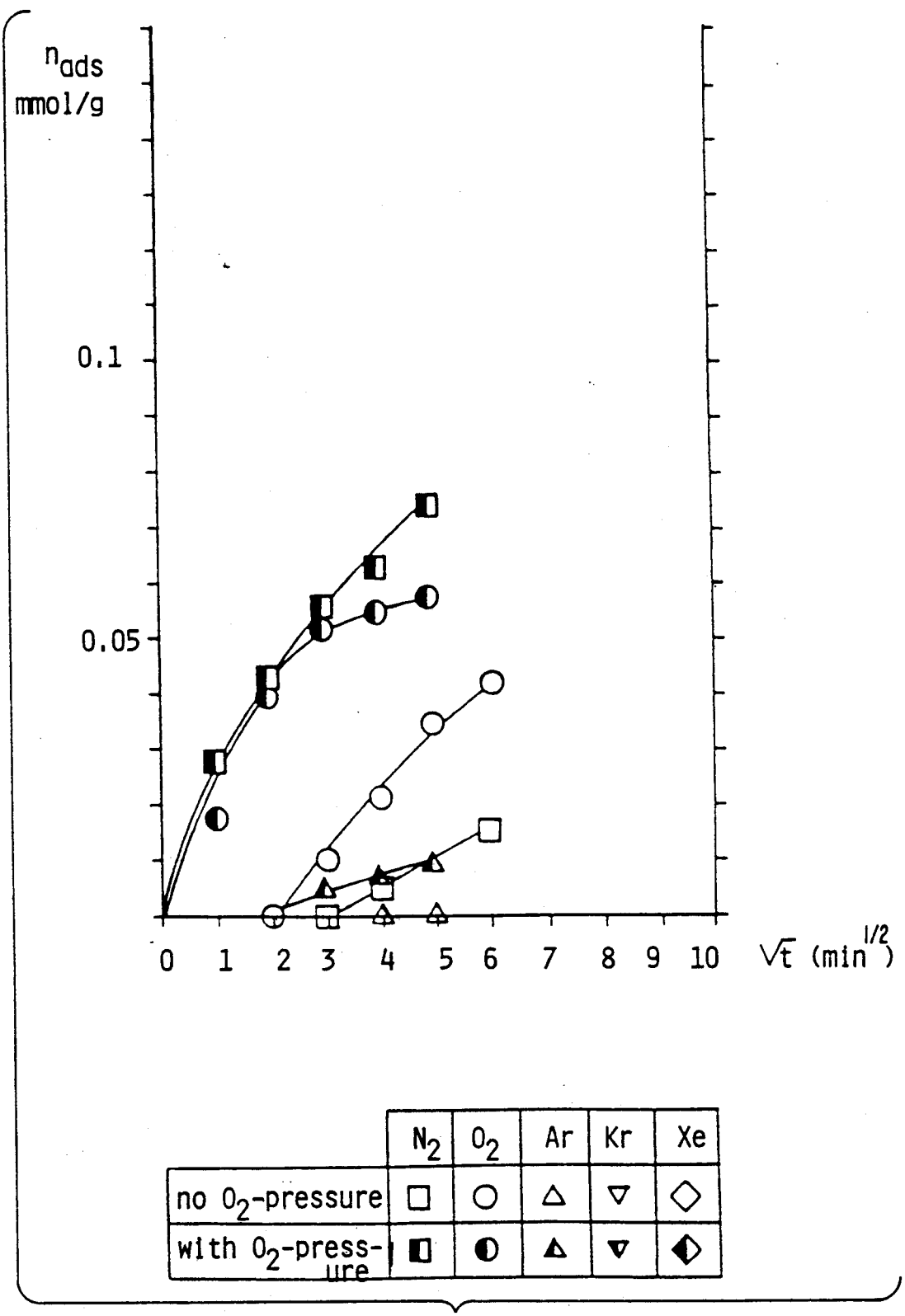

50 g of Na-mordenite (E127 NaM 543) from SCGP were exchanged for $Ca^{2+}$ with 110 g of $CaCl_2$ into 500 ml $H_2O$ at room temperature for 1 night. 2 g of this batch were outgassed in vacuum overnight at 440° C. and tested for its adsorption behaviour with $N_2$, $O_2$ and Ar at 0° C. (FIG. 36). The kinetics show fast adsorption rates for the three test gases. 4 g of the parent sample (particle size 250-800/μm) were heated with 20 ml of a 5% boric acid solution. The water was evaporated at 80° C. and then the sample was heated for 2 hours in air at 500° C. 2 g of this sample were outgassed overnight in vacuum at 450° C. in order to test the adsorption behaviour (FIG. 37). For $O_2$ no adsorption was observed within the first 4 min and for $N_2$ even within the first 9 min no adsorption could be observed. Afterwards a diffusion-controlled adsorption for $O_2$ and $N_2$ was observed. However, Ar was excluded. The same modification was carried out on another sample. After drying at 80° C. the sample was further outgassed in a column at 100° C. in a flow of $N_2$ for 1 night and for 30 min at 150° C. Then the sample was heated in an enclosed column at 500° C. in an atmosphere of $O_2$ at 5 bar. The adsorption kinetics, shown in FIG. 37 indicate an increased uptake for $N_2$ and $O_2$ ($N_2$ having a higher capacity than $O_2$). After 4 min there is also a very low adsorption of Ar.

EXAMPLE 42

Figure 38:
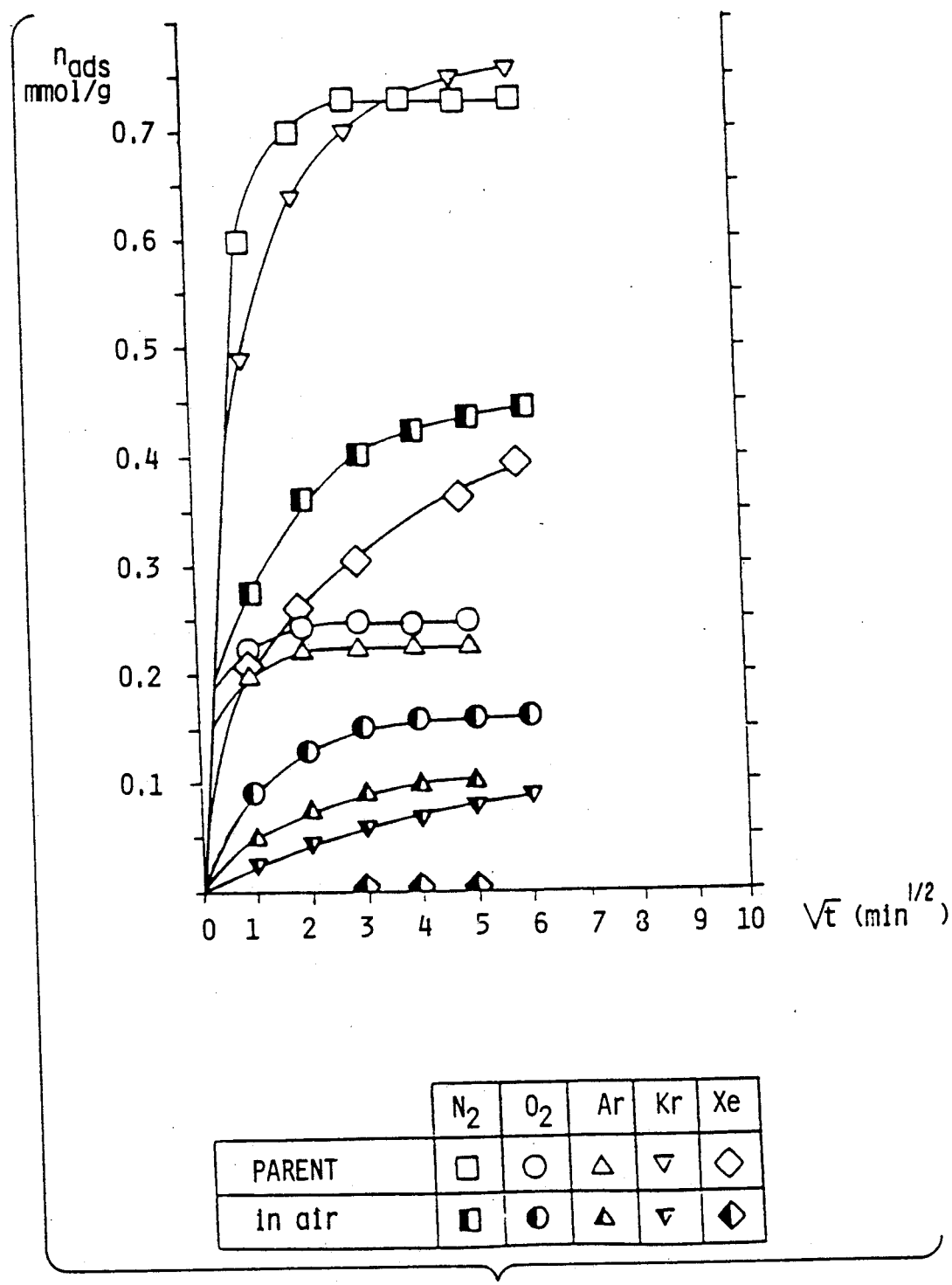

2 g of the parent sample, CaM CM 782 (SCGP; extrudates) were dehydrated overnight at 450° C. in vacuum. FIG. 38 shows the observed sorption characteristics for Xe, Kr, Ar, $N_2$ and $O_2$ at 0° C. Nitrogen, oxygen and argon reach an equilibrium situation after 16 min while Kr and Xe are still adsorbing. 3.1 g of the parent sample (fraction <150/μm) were mixed with 0.3 g $H_3BO_3$ (10% weight) and stirred with 3 ml $H_2O$ at room temperature. Afterwards the sample was thermally treated for 1 hour at 100° C. and for 3 hours at 400° C., both in air. 2 g of this sample were dehydrated overnight at 427° C. in vacuum. FIG. 38 shows a capacity decrease for all gases and an exclusion for Xe. The sample has a lower accessibility for the other adsorbing gases, especially for Kr where a strong diffusion-controlled adsorption was observed.

EXAMPLE 43

Figure 39:
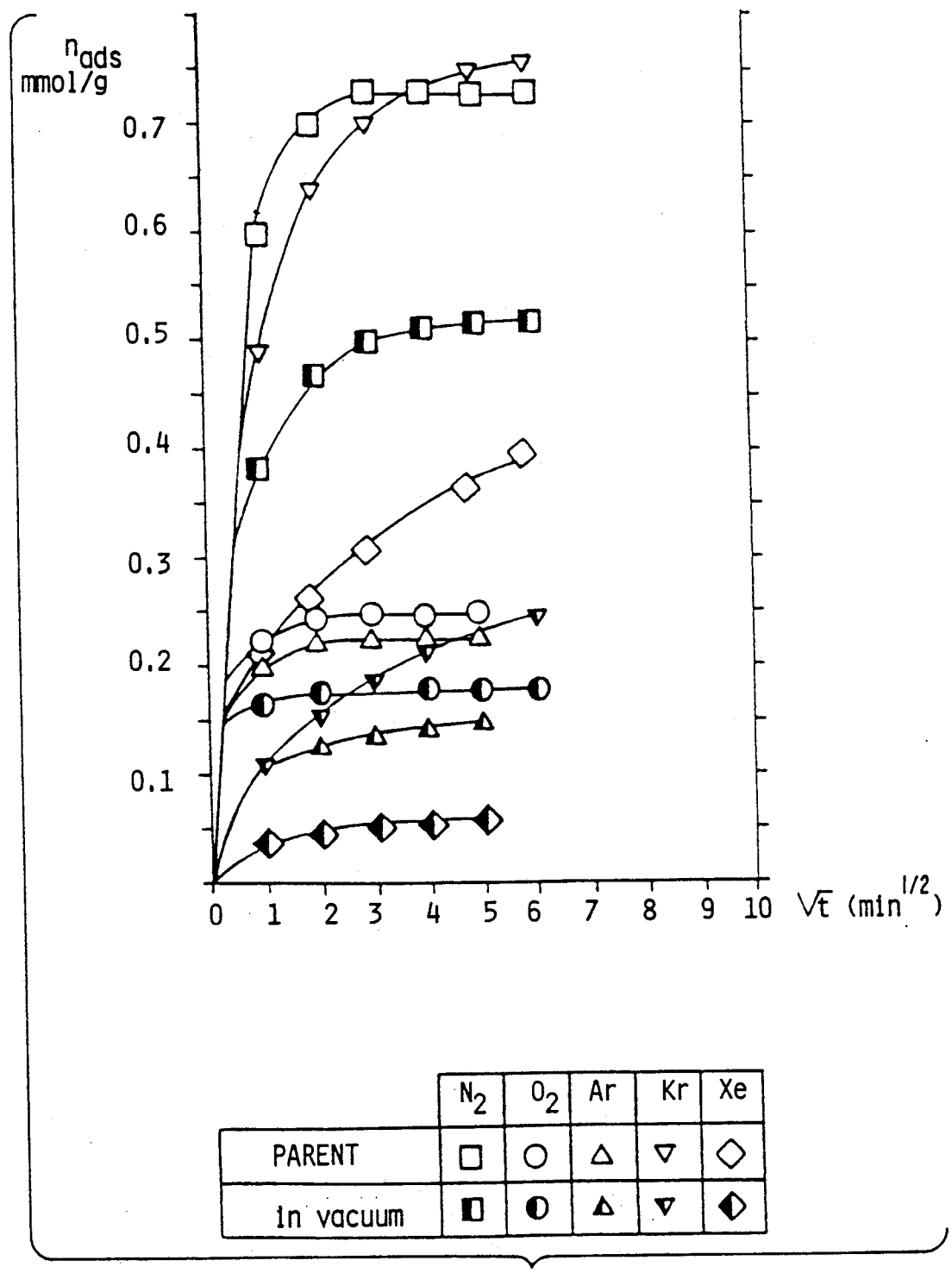

The parent sample, CaM CM 782 (SCGP; extrudates), was dehydrated overnight at 450° C. in vacuum. FIG. 39 shows the observed sorption characteristics for Xe, Kr, Ar, $N_2$ and $O_2$ at 0° C. Nitrogen, oxygen and argon reach an equilibrium situation after 16 min while Kr and Xe are still adsorbing. 3 g of the parent sample (fraction <150/μm) were mixed with 0.3 g $H_3BO_3$ (10% weight) and stirred with 3 ml $H_2O$ at room temperature. Afterwards the sample was thermally treated for 2 hours at 100° C. in air. The thermal treatment at 455° C. was carried out overnight in vacuum. FIG. 39 shows the obtained adsorption behaviour. A capacity decrease occurs for all the gases with diffusion-controlled adsorption for Xe, Kr and Ar. The pore-narrowing of this sample is not so effective as the one in Example 44 although the same amount of boric acid was used.

EXAMPLE 44

Figure 40:
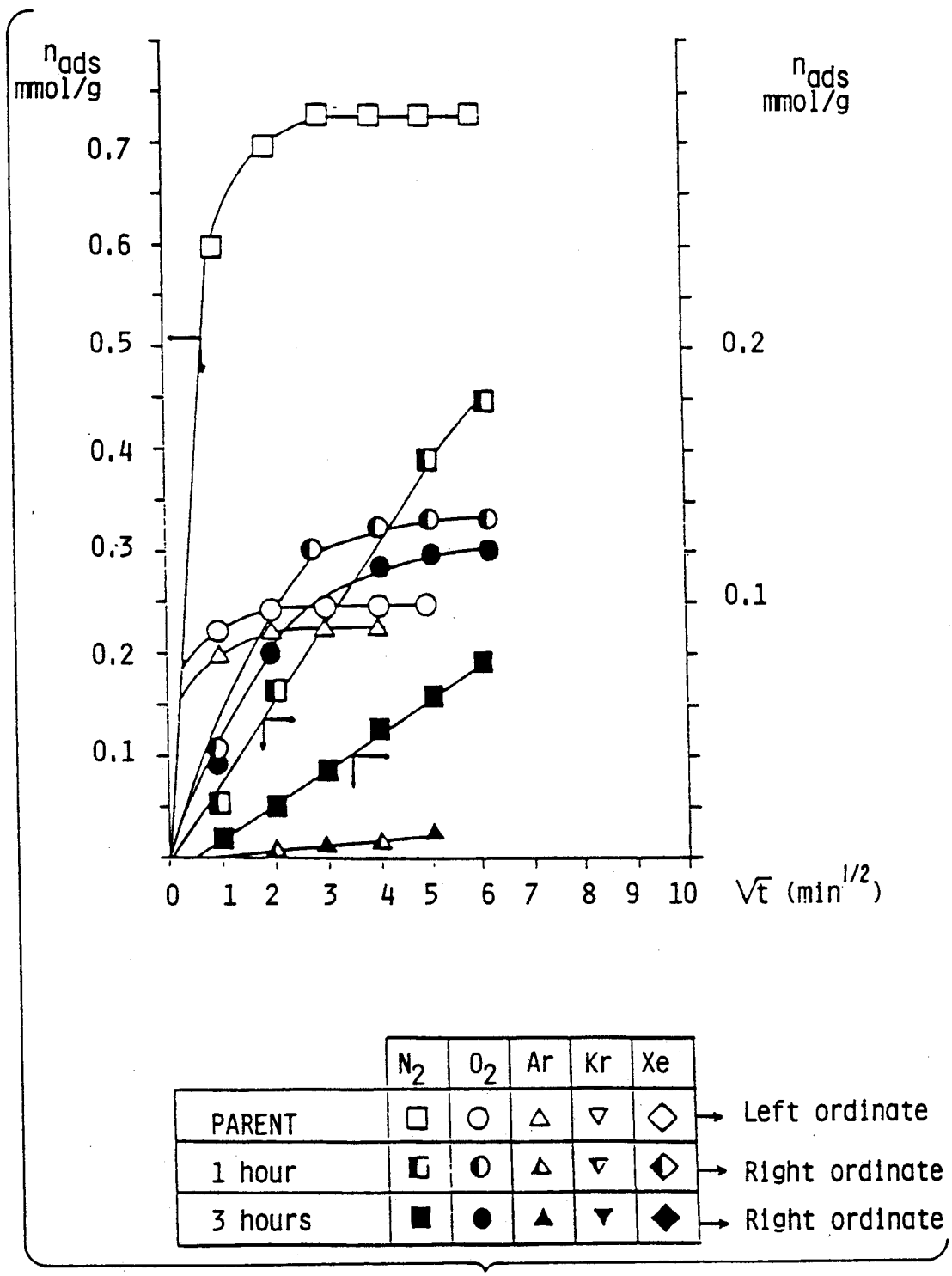

The original sample used to investigate the drying of a slurry, was a CaM CM 782 (SCGP; extrudates). 2 g of zeolite were dehydrated overnight at 450° C. in vacuum in order to study its sorption behaviour (shown in FIG. 40). $N_2$, $O_2$ and Ar reach an equilibrium situation after 16 min with a high capacity $N_2$ at 0° C.

EXAMPLE 45

20 g of the parent sample (of Example 44) (fraction <150/μm) were mixed with 4 g $H_3BO_3$ (20% weight) and stirred with 20 ml $H_2O$ at room temperature. The slurry remained one night at ambient temperature without stirring. Afterwards the sample was dried for 1 hour at 100° C. in air and ground again. Afterwards this sample was thermally treated for 3 hours at 400° C. in air and later dehydrated overnight at 446° C. in vacuum. With this drying procedure the sample adsorbs almost no Ar and has a capacity decrease for $O_2$ compared with the parent sample. However, the pores are open for $O_2$ and an equilibrium situation has been reached until 25 min. On the other hand one observes a diffusion-controlled adsorption of $N_2$ with a sorption value of 0.175 mmol/g after 36 min (FIG. 40).

EXAMPLE 46

1103 g of the parent sample of Example 44 (fraction <150/μm) were mixed with 220.6 g $H_3BO_3$ (20% weight) and stirred with 1000 ml $H_2O$ at room temperature. The slurry remained one night at ambient temperature without stirring. Afterwards the sample was dried for 3 hours at 110° C. in air and ground again. After a thermal treatment of 3 hours at 400° C. in air, 2 g were dehydrated overnight at 436° C. in vacuum and tested for its adsorption bahaviour. The drying procedure of 3 hours results in the same adsorption kinetics for $O_2$ and Ar but the pores are more blocked by the B-0 compounds resulting in a very strong diffusion-controlled adsorption of $N_2$. The sorption value of $N_2$ after 36 min is 0.075 mmol/g $N_2$/g (FIG. 40).

We claim:

1. Process for the separation of at least one gas from a mixture containing at least two gases, which process comprises contacting a pore containing molecular sieve with said mixture of gaseous components, selectively adsorbing at least one component of the mixture in the pores of the molecular sieve, separating the molecular sieve from the non-adsorbed component or components and optionally desorbing the adsorbed component or components, said molecular sieve having been modified at elevated temperature with a modifying agent containing at least one weak acid, a salt of a weak acid, or a derivative of a weak acid, of at least one element of the Groups III, IV and V of the Period Table of Elements.

2. Process according to claim 1, wherein the modifying agent contains at least one element of the Groups III, IV and V of the Periodic Table of Elements, which modifying agent has the ability to polymerize at said elevated temperature.

3. Process according to claim 1, wherein the modifying agent is $H_3BO_3$, $NaH_2PO_2$, $Na_4P_2O_7.10H_2O$, $K_3PO_4$, $(NH_4)_2HPO_2$, $Na_2B_4O_7.10H_2O$ or $Si(OH)_4$.

4. Process according to claim 1, wherein the molecular sieve is a natural or syntehtic zeolite in the H-form, the cation form, or a mixture of H- and cation forms.

5. The process according to claim 4 wherein the molecular sieve is mordenite SP, mordenite LP, zeolite X, zeolite A, zeolite Y, clinoptilolite, ferrieriete, erionite, chabazite, ZSM-5 or silicalite.

6. Process according to claim 1, wherein the molecular sieve has been modified by making a suspension of the molecular sieve in a solution of the modifying agent, followed by thermal treatment.

7. Process according to claim 1, wherein the molecular sieve has been modified by mixing a powder of the modifying agent and the molecular sieve optionally wetting the powder followed by thermal treatment.

8. Process according to claim 1, wherein the treatment at elevated temperature occurs at least at 250° C.

9. Process according to claim 1, wherein the gas mixture contains at least one gas that is preferentially not adsorbed on the zeolite.

10. Process according to claim 1, wherein the desorption of the adsorbed component or components is accomplished by lowering the pressure.

11. Process according to claim 1, wherein the desorption is accomplished by applying heat.

12. Process according to claim 1, wherein the said gas mixture is air, or a gas mixture obtained by treating air.

13. Process according to claim 1, wherein said gas mixture is a gas mixture containing at least one noble gas.

14. Process according to claim 1, wherein said gas mixture contains at least one lower hydrocarbon.

15. Process according to claim 1, wherein the gas mixture contains at least one oxide selected from the group consisting of oxides of nitrogen and oxides of carbon.

* * * * *

UNITED STATES PATENT AND TRADEMARK OFFICE
CERTIFICATE OF CORRECTION

Page 1 of 2

PATENT NO. : 5,032,152
DATED : June 16, 1991
INVENTOR(S) : Vansant, et. al.

It is certified that error appears in the above-indentified patent and that said Letters Patent is hereby corrected as shown below:

Title page, item [76], "Emile Gebruersstraat 31, 20200" should read -- Emile Gebruersstraat 31, 2200--.

Title page, item [76], between item [21] Assignee, should read-- L'Air Liquide, Paris, France --.

Title page, item [30], line 2, should read -- 88200248.8--.

Column 1, line 19, "Encyklopädie" should read --Encyklopädie--.

Column 4, line 36, "fullfilled" should read --fulfilled--.

Column 4, line 64, "gases ($N_2$, $O2$)" should read --$N_2$, $O_2$--.

Column 6, line 52, "absorption" should read --adsorption--.

Column 7, line 65-67, "FIG. 7b shows" should read --FIG. 7b and shows--.

Column 9, line 15, "400oC" should read --400°C--.

Column 13, line 54, "sample L in" should read --sample in--.

Column 13, line 56, "dehydrated 440°C" should read -- dehydrated at 440°C--.

UNITED STATES PATENT AND TRADEMARK OFFICE
CERTIFICATE OF CORRECTION

Page 2 of 2

PATENT NO. : 5,032,152

DATED : June 16, 1991

INVENTOR(S) : Vansant, et al.

It is certified that error appears in the above-identified patent and that said Letters Patent is hereby corrected as shown below:

Column 15, line 11, "C. in vacuum with this" should read --C in vacuum. With this--.

Column 15, line 68, "(shown in Fig. 34) Nitrogen," should read --(shown in Fig. 34). Nitrogen--.

Column 17, line 60, "$N_2$, O2" should read --$N_2$, $O_2$--.

Column 18, line 50, "syntehtic" should read --synthetic--.

Signed and Sealed this

Eleventh Day of January, 1994

Attest:

BRUCE LEHMAN

Attesting Officer    Commissioner of Patents and Trademarks

UNITED STATES PATENT AND TRADEMARK OFFICE
CERTIFICATE OF CORRECTION

PATENT NO. : 5,032,152
DATED : June 16, 1991
INVENTOR(S) : Vansant, et al.

It is certified that error appears in the above-indentified patent and that said Letters Patent is hereby corrected as shown below:

Title page, item [76], "Emile Gebruersstraat 31, 20200" should read --Emile Gebruersstraat 31, 2200--.

Title page, item [30], line 2, should read -- 88200248.8--.

Column 1, line 19, "Encyklopädie" should read --Encyklopädie--.

Column 4, line 36, "fullfilled" should read --fulfilled--.

Column 4, line 64, "gases ($N_2$, $O2$)" should read --$N_2$, $O_2$--.

Column 6, line 52, "absorption" should read --adsorption--.

Column 7, line 65-67, "FIG. 7b shows" should read --FIG. 7b and shows--.

Column 9, line 15, "400oC" should read --400°C--.

Column 13, line 54, "sample L in" should read --sample in--.

Column 13, line 56, "dehydrated 440°C" should read --dehydrated at 440°C--.

UNITED STATES PATENT AND TRADEMARK OFFICE
CERTIFICATE OF CORRECTION

PATENT NO. : 5,032,152
DATED : June 16, 1991
INVENTOR(S) : Vansant, et al.

It is certified that error appears in the above-indentified patent and that said Letters Patent is hereby corrected as shown below:

Column 15, line 11, "C. in vacuum with this" should read --C in vacuum.  With this--.

Column 15, line 68, "(shown in Fig. 34) Nitrogen," should read --(shown in Fig. 34).  Nitrogen--.

Column 17, line 60, "$N_2$, O2" should read --$N_2$, $O_2$--.

Column 18, line 50, "syntehtic" should read --synthetic--.

This certificate supersedes Certificate of Correction issued Jan. 11, 1994.

Signed and Sealed this

Twenty-ninth Day of March, 1994

BRUCE LEHMAN

*Attest:*

*Attesting Officer*     Commissioner of Patents and Trademarks

UNITED STATES PATENT AND TRADEMARK OFFICE
CERTIFICATE OF CORRECTION

PATENT NO. : 5,032,152
DATED : June 16, 1991
INVENTOR(S) : Vansant, et al

It is certified that error appears in the above-indentified patent and that said Letters Patent is hereby corrected as shown below:

On the title page, item [76], between item [21] Assignee, should read -- L'Air Liquide, Paris, France --.

Signed and Sealed this

Twenty-seventh Day of September, 1994

Attest:

BRUCE LEHMAN

Attesting Officer

Commissioner of Patents and Trademarks